United States Patent
Liang et al.

(10) Patent No.: US 12,473,352 B2
(45) Date of Patent: Nov. 18, 2025

(54) DIAGNOSIS AND TREATMENT FOR CHRONIC INFLAMMATION AND VIRUS INFECTION

(71) Applicant: GUANGZHOU ENMAI BIOTECHNOLOGY CO., LTD., Guangzhou (CN)

(72) Inventors: Huanhuan Liang, Guangzhou (CN); Yingfang Liu, Guangzhou (CN); Yang Yu, Guangzhou (CN)

(73) Assignee: GUANGZHOU ENMAI BIOTECHNOLOGY CO., LTD., Guangzhou (CN)

( * ) Notice: Subject to any disclaimer, the term of this patent is extended or adjusted under 35 U.S.C. 154(b) by 1065 days.

(21) Appl. No.: 17/600,842

(22) PCT Filed: Mar. 31, 2020

(86) PCT No.: PCT/CN2020/082296
§ 371 (c)(1),
(2) Date: Oct. 1, 2021

(87) PCT Pub. No.: WO2020/200186
PCT Pub. Date: Oct. 8, 2020

(65) Prior Publication Data
US 2024/0043511 A1    Feb. 8, 2024

(30) Foreign Application Priority Data

Apr. 1, 2019   (CN) .......................... 201910256220.3
Feb. 27, 2020  (CN) .......................... 202010122554.4

(51) Int. Cl.
| | | |
|---|---|---|
| *A61K 39/395* | (2006.01) | |
| *A61P 31/16* | (2006.01) | |
| *C07K 16/00* | (2006.01) | |
| *C07K 16/18* | (2006.01) | |
| *C12N 15/113* | (2010.01) | |
| *G01N 33/68* | (2006.01) | |
| *A61K 39/00* | (2006.01) | |

(52) U.S. Cl.
CPC .............. *C07K 16/18* (2013.01); *A61P 31/16* (2018.01); *C12N 15/113* (2013.01); *G01N 33/6893* (2013.01); *A61K 39/395* (2013.01); *A61K 2039/505* (2013.01); *G01N 2800/7095* (2013.01)

(58) Field of Classification Search
None
See application file for complete search history.

(56) References Cited

U.S. PATENT DOCUMENTS

2018/0037617 A1   2/2018  Liu et al.

FOREIGN PATENT DOCUMENTS

| | | | | |
|---|---|---|---|---|
| CN | 107427552 A | * | 12/2017 | ......... A61K 39/0011 |
| CN | 113311164 A | | 8/2021 | |
| CN | 114025785 A | | 2/2022 | |
| CN | 118767136 A | | 10/2024 | |
| CN | 118767137 A | | 10/2024 | |
| CN | 118777611 A | | 10/2024 | |
| EP | 0921192 A1 | | 6/1999 | |
| EP | 3949978 A1 | | 2/2022 | |
| JP | 2022531838 A | | 7/2022 | |
| WO | 2016026258 A1 | | 2/2016 | |

OTHER PUBLICATIONS

Gounder et al. Interferon induced protein 35 exacerbates H5N1 influenza disease through the expression of IL-12p40 homodimer. PLOS Pathogens 14(4):e1007001:, pp. 1-25; Apr. 26, 2018. (Year: 2018).*
Justice et al. Using the mouse to model human disease: increasing validity and reproducibility, Disease, Models & Mechanisms 9: 101-103, (2016). (Year: 2016).*
Aspizua et al. The importance of immunity in the development of reliable animal models for psoriasis and atopic dermatitis. Immunology & Cell Biology vol. 98: 626-638; (2020). (Year: 2020).*
Edwards et al. The remarkable flexibility of the human antibody repertoire; isolation of over one thousand different antibodies to a single protein, BLyS. Journal of Molecular Biology 334:103-118; (2003). (Year: 2003).*
Lloyd et al. Modelling the human immune response: performance of a 10(11) human antibody repertoire against a broad panel of therapeutically relevant antigens. Protein Engineering, Eng. Design & Selection 22(3): 159-168; (2009). (Year: 2009).*
Goel et al. Plasticity within the antigen-combining site may manifest as molecular mimicry in the humoral immune response. J. Immunol. 173: 7358-7367; (2004). (Year: 2004).*
Khan et al. Adjustable locks and flexible keys: plasticity of epitope-paratope interactions in germline antibodies. J. Immunol. 192: 5398-5405; (2014). (Year: 2014).*

(Continued)

*Primary Examiner* — Elizabeth C. Kemmerer
*Assistant Examiner* — Regina M DeBerry
(74) *Attorney, Agent, or Firm* — Raphael Bellum PLLC

(57) ABSTRACT

The present application provides a diagnosis and treatment method for chronic inflammation. The technical solution provided by the present application is an application of a reagent in preparing a product for preventing and/or treating chronic inflammation diseases: the reagent is a substance for inhibiting the activity of an abnormal content of IFP35 and/or NMI which is secreted outside the cell as an inflammatory factor. Experiments prove that using antibodies and the like to inhibit the activity of an abnormal content of IFP35 and/or NMI which is secreted outside the cell as an inflammatory factor can effectively treat chronic inflammation diseases. In the present application, IFP35 and/or NMI are also used as a target spot, providing a diagnosis/auxiliary diagnosis and treatment method and tool for infection of viruses, particularly novel coronavirus-19 (COVID-19).

6 Claims, 14 Drawing Sheets

Specification includes a Sequence Listing.

(56) References Cited

OTHER PUBLICATIONS

Poosarla et al. Computational De Novo Design of Antibodies Binding to a Peptide With High Affinity. Biotechn. Bioeng. 114(6): 1331-1342; (2017). (Year: 2017).*

Al Qaraghuli et al. Antibody-protein binding and conformational changes: identifying allosteric signalling pathways to engineer a better effector response. Nature Scientific Reports 10:13969, (2020). (Year: 2020).*

Strausberg, R.L., et al. "interferon-induced protein 35{*Homo sapiens*}", Genbank: AAH01356.1, Jul. 15, 2006.

Strausberg, R.L., et al., "Nmi [*Homo sapiens*]", GENBANK:AAC12949.1, Apr. 9, 1998.

International Search Report of PCTCN/2020/082296 mailed on Jul. 2, 2020 with English translation (12 pages).

Written Opinion of the International Searching Authority of PCT/CN2020/082296 issued Jul. 2, 2020 with English translation (13 pages).

Strausberg. R. L., et. "interferon-induced protein 35 [*Homo sapiens*]", GENBANK:AAH01356.1, Jul. 15, 2006 (2 pages).

Bao J. et al. "Nmi [*Homo sapiens*]" GenBank: AAC12949.1, Apr. 9, 1998. (2 pages).

\* cited by examiner

DIAGNOSIS AND TREATMENT FOR CHRONIC INFLAMMATION AND VIRUS INFECTION

CROSS-REFERENCE TO RELATED APPLICATIONS

The present application is a national phase of International Patent Application No. PCT/CN2020/082296 filed on Mar. 31, 2020, which claims the priorities of Chinese patent application No. 201910256220.3 filed on Apr. 1, 2019 and Chinese patent application No. 202010122554.4 filed on Feb. 27, 2020, which are incorporated by reference herein in their entireties for all purposes.

SEQUENCE LISTING

The Sequence Listing submitted herewith is an ASCII text file (2023-12-04_Corrected sequence listing_ST25.txt, created on Oct. 25, 2023; 25,127 bytes), is filed via Patent Center, and is hereby incorporated by reference.

TECHNICAL FIELD

The present application relates to the field of biomedicine, in particular to methods and products for diagnosing and treating a chronic inflammation and a viral infection.

BACKGROUND

After infected with microorganisms or subjected to tissue damage, various cytokines are rapidly and massively produced in body fluids of an organism, such as TNF, IL-6, IL-8, IL-12, IFN-γ and MCP-1, and it may even be possible to cause cytokine storm and multiple serious clinical diseases such as acute respiratory distress syndrome, multiple organ failure and the like. Inflammatory factors are closely related to various acute and chronic inflammatory diseases. However, so far, there is no clinically effective treatment for these diseases.

Cells under pressure to survive will release endogenous cytokines which can initiate an immune response and play a role in effectively eliminating damaged or infected cells. A type of cytokines called damage-associated molecular patterns (DAMPs) are released and activate neighboring phagocytes to eventually eliminate cells that have lost their normal functions when tissues are infected or damaged. DAMP can initiate a native immune response and aggravate the inflammatory response, thereby fighting against infection and cell damage. Therefore, it is important to the identify DAMP and reveal its function. In the past, the present inventors discovered two proteins that can function as DAMPs, namely N-myc and STAT interacting protein (NMI) and interferon-induced protein 35 (IFP35). Studies have shown that IFP35 and NMI can be secreted to the outside of cells by monocytes and macrophages within one hour after being activated by LPS or interferon, and can be released by activated macrophages in a lipopolysaccharide-induced sepsis model or acetaminophen-induced liver injury model. Extracellular NMI and IFP35 can activate NF-κB through Toll-like receptor 4 (TLR4), which in turns activates macrophages which would release pro-inflammatory cytokines. In addition, the level of NMI was significantly increased in the serum of patients who died of severe inflammatory response. Loss of the NMI can reduce inflammatory response and decrease the mortality of mice in sepsis models and liver injury models. Antibodies against IFP35 can reduce the expression level of inflammatory factors, thereby effectively improving the survival rate of mice with septicemia.

Take multiple sclerosis (MS) as an example. Multiple sclerosis is one of the chronic inflammatory diseases. MS can cause sensory, mental, motor, physical activity and cognitive dysfunction in patients, and is one of the main causes of disability in the young and middle-aged population.

The IFP35 protein family comprises two homologous proteins: N-myc and STAT interacting protein (NMI) and interferon-induced protein 35 (IFP35), both of which are encoded by interferon-stimulated genes (ISGs), and the expression levels of which will increase after the human body and immune cells are stimulated by interferon. In addition, they are also damage-associated molecular patterns (DAMPs). In the presence of infection or organ damage, NMI and IFP35 can be released by activated macrophages, and activate NF-κB through the TLR4 receptor signaling pathway to promote macrophages to release pro-inflammatory cytokines. Knockout of the genes encoding NMI and IFP35 can reduce the mortality in mouse models with sepsis and liver injury caused by bacterial or viral infection. In mouse models with sepsis induced by LPS, pathogenic bacteria such as *Salmonella* and viruses and mouse models into which toxic substances (such as acetaminophen (APAP)) invade, NMI and IFP35 can be quickly released from the cells into body fluids such as serum. Injection of a protective antibody for IFP35 can protect mice from damage caused by LPS, *Salmonella* and APAP.

For a long time, viral infectious diseases have caused a great threat in China and the entire human society. Where it is difficult to develop effective specific antiviral drugs, controlling the excessive inflammatory response in patients infected with a virus is particularly important for reducing the body's inflammatory damage and decreasing mortality. It is necessary to find the key cytokines that cause the inflammatory factor storm and develop new diagnostic and therapeutic drugs to deal with sudden viral diseases.

Similar to SARS virus, influenza virus and other respiratory viruses, the target organ of COVID-19 virus is the lung, and it can cause lung failure and lead to acute respiratory distress syndrome in infected patients. After hosts are infected by the virus, it often leads to a strong or unregulated inflammatory response in the patients. Unregulated inflammatory response and excessive inflammatory response are considered to be important causes of death from SARS and other viruses, and it is speculated that they are also important causes of death from COVID-19 virus infection. Therefore, viral infections need to be treated from two aspects: one is direct antiviral drug treatment; and the other is to balance the body's immune response and suppress excessive immunity. In the absence of targeted antiviral drugs, regulating the body's inflammatory response is particularly important for reducing the degree of disease damage and decreasing mortality. There is an urgent clinical need to develop drugs that accurately regulate the inflammatory response.

The inflammatory response involves various immune cells and a large number of inflammation-related cytokines, and is a precisely regulated process. The inflammatory response is a double-edged sword. On the one hand, it is an important way for the body's immune defense to eliminate infection. On the other hand, unregulated inflammatory response is an important cause of many diseases, such as sepsis, chronic inflammatory diseases, autoimmune diseases and the like. In the case of pathogen infection, the host's immune system produces an endogenous damage-associated molecular pattern (DAMP). At present, several DAMP-type inflammatory factors have been found in the human body, including HMGB1, IL1b, IL33, S100A and so on. DAMP, as an inflammatory factor, is further recognized by cell pattern recognition receptors (such as TLR4 and the like) to activate downstream signaling pathways (including JAK-STAT pathway and the like) of native immune cells, activate inflammation-related transcription factors in cells, such as NF—KB and IRF3/7 and the like, induce the transcription and expression of a large number of inflammation-related genes, and activate an immune response. Therefore, DAMP inflammatory factors are an important class of inflammatory response molecules in the immune system. These DAMP-type inflammatory factors are widely used in clinical testing and as targets for drug development such as antibodies and small molecule chemicals.

Currently, there is still a lack of clinically determined and effective vaccines and antiviral drugs for the outbreak of COVID-19 virus infection. According to reports, some anti-HIV and anti-SARS/MERS drugs, such as lopinavir, remdesivir and the like, may have therapeutic effects in cases having COVID-19 virus infection. Clinically, the measures taken in the previous treatment of critical patients with SARS virus infection and those taken in the current treatment of critical patients with COVID-19 virus infection include the use of high-dose hormone drugs to control excessive inflammatory responses. However, the use of high-dose hormones often brings serious side effects, and excessive immunosuppression does not facilitate the elimination of viruses. Therefore, it is an effective therapeutic means for new and sudden infectious diseases to look for key cytokines that regulate inflammatory responses and screen cytokine drugs that can effectively inhibit the host's excessive inflammatory response, which can be used for clinical and prognostic precision interventions. This is not only of great significance for the current prevention and treatment of COVID-19 virus, but also of universal significance for coping with various sudden infectious diseases without targeted drugs in the future.

SUMMARY OF THE INVENTION

One of the technical problems solved by the present application is to provide a method, a product and a related antibody for preventing and/or treating a chronic inflammatory disease, as well as a method, a product and a related antibody for diagnosing a chronic inflammatory disease.

The present application provides technical solutions relating to use of a reagent in the manufacture of a product for preventing and/or treating a chronic inflammatory disease.

The technical solutions are as follows:

Use of a reagent in the manufacture of a medication for preventing and/or treating a chronic inflammatory disease, wherein the reagent is at least one of (1) a substance that inhibits an activity of an abnormal amount of IFP35 and/or NMI which is secreted to the outside of cells as an inflammatory factor;
(2) a substance that inhibits an amount and/or an activity of IFP35 and/or NMI which is secreted to the outside of cells as an inflammatory factor;
(3) a substance that inhibits IFP35 and/or NMI from being secreted to the outside of cells as an inflammatory factor;
(4) a substance that inhibits an abnormal increase in an amount and/or an activity of IFP35 and/or NMI;
(5) a substance that inhibits IFP35 and/or NMI from being secreted to the outside of cells;
(6) a substance that inhibits IFP35 and/or NMI as an inflammatory factor to cause a chronic inflammatory disease or a substance that inhibits IFP35 and/or NMI as DAMPs to cause a chronic inflammatory disease;
(7) a substance that inhibits IFP35 and/or NMI from up-regulating the expression and secretion of some inflammatory factors, wherein some inflammatory factors are interferon, TNF, IL1 and/or IL6; and
(8) a substance that inhibits IFP35 and/or NMI from interacting with TLR4 to activate NF-κB through TLR4/MD2.

The present application provides a method for preventing and/or treating a chronic inflammatory disease.

The method for preventing and/or treating a chronic inflammatory disease provided in the present application comprises a step of administering an effective amount of the following reagent to an organism to achieve the purpose of preventing and/or treating the chronic inflammatory disease, wherein the reagent is at least one of (1) a substance that inhibits an activity of an abnormal amount of IFP35 and/or NMI which is secreted to the outside of cells as an inflammatory factor;
(2) a substance that inhibits an amount and/or an activity of IFP35 and/or NMI which is secreted to the outside of cells as an inflammatory factor;
(3) a substance that inhibits IFP35 and/or NMI from being secreted to the outside of cells as an inflammatory factor;
(4) a substance that inhibits an abnormal increase in an amount and/or an activity of IFP35 and/or NMI;
(5) a substance that inhibits IFP35 and/or NMI from being secreted to the outside of cells;
(6) a substance that inhibits IFP35 and/or NMI as an inflammatory factor to cause a chronic inflammatory disease or a substance that inhibits IFP35 and/or NMI as DAMPs to cause a chronic inflammatory disease;
(7) a substance that inhibits IFP35 and/or NMI from up-regulating the expression and secretion of some inflammatory factors, wherein some inflammatory factors are interferon, TNF, IL1 and/or IL6; and
(8) a substance that inhibits IFP35 and/or NMI from interacting with TLR4 to activate NF-κB through TLR4/MD2.

Use of any reagent in the prior art that can achieve any of the functions of the above (1) to (8) in the manufacture of a product for preventing and/or treating a chronic inflammatory disease falls into the scope of the present application.

The inhibition of the above (1)-(5) can be a direct inhibition, for example a direct inhibition of an abnormal increase in an amount and/or an activity of IFP35 and/or NMI, or a direct inhibition of an activity of an abnormal amount of IFP35 and/or NMI which is secreted to the outside of cells as an inflammatory factor, such as a direct inhibition of a secretion of IFP35 and/or NMI to the outside of cells as an inflammatory factor, such as an inhibition of an amount and/or an activity of IFP35 and/or NMI which is secreted to the outside of cells as an inflammatory factor; or can be an indirect inhibition of IFP35 and/or NMI by inhibiting an expression and/or an activity of an interferon.

In an embodiment of the above therapeutic method and use, the reagent is at least one of:

an antibody, a polypeptide, or an antigen-binding fragment thereof, which specifically binds to IFP35 and/or NMI, and has at least one of the functions of the above (1) to (8); a small molecule compound, which has at least one of the functions of the above (1) to (8); and a nucleic acid reagent, which has at least one of the functions of the above (1) to (8).

The nucleic acid molecule can be siRNA, shRNA or miRNA, which can target the genes encoding IFP35 and/or NMI.

The small molecule compound can be a small molecule compound which inhibits the secretion, expression and/or activity of IFP35 and/or NMI.

The antibody, polypeptide or antigen-binding fragment thereof can be an antibody that specifically binds to the following antigenic epitopes: (1) the amino acid residues of the antigenic epitope are among the amino acid residues at positions 81-170, 177-268 or 136-216 of SEQ ID NO: 2; (2) the amino acid residues of the antigenic epitope are among the amino acid residues at positions 81-168, 175-266 or 134-214 of SEQ ID NO: 4; (3) the amino acid residues of the antigenic epitope are among the amino acid residues at positions 104-193, 202-293 or 151-250 of SEQ ID NO: 6; (4) the amino acid residues of the antigenic epitope are among the amino acid residues at positions 103-192, 201-292 or 151-240 of SEQ ID NO: 8.

In an embodiment of the above therapeutic method and use, the antibody can be an antibody as defined in A or B or C or D as follows:

A. an antibody, a polypeptide or an antigen-binding fragment thereof which specifically binds to an antigenic epitope of IFP35 and/or NMI, wherein the antigenic epitope is (1) or (2) as follows: (1) the antigenic epitope includes the following amino acid positions: Arg163, Asn164, Arg191, Gln194, Ile195, Gln197, Phe198, Thr199, Pro201, Gln206, Pro208 and Arg210 of IFP35 (SEQ ID NO: 2); (2) the antigenic epitope includes the following amino acid positions: Arg185, Asn186, Lys215, Lys218, Lys219, Glu221, Tyr222, Pro223, Tyr225, Cys230, Arg232 and Thr234 of NMI (SEQ ID NO: 8);

B. any antibodies, small molecules or polypeptides which are capable of binding to at least one amino acid residue in the antigenic epitope of the above (1) and inhibit an activity of IFP35;

C. any antibodies, small molecules or polypeptides which are capable of binding to at least one amino acid residue in the antigenic epitope of the above (2) and inhibit an activity of NMI;

D. a 35NIDmAb antibody comprising a light chain variable region and a heavy chain variable region, wherein the heavy chain variable region comprises CDR1, CDR2 and CDR3, with the sequence of CDR1 consisting of amino acid residues at positions 25-32 of SEQ ID NO: 9 (GYTFT<u>NY</u>G (SEQ ID NO: 13)), the sequence of CDR2 consisting of amino acid residues at positions 50-57 of SEQ ID NO: 9 (<u>INTYTGEP</u> (SEQ ID NO: 14)), and the sequence of CDR3 consisting of amino acid residues at positions 98-106 of SEQ ID NO: 9 (YG<u>YSW</u>AMDY (SEQ ID NO: 15)); and wherein the light chain variable region comprises CDR1, CDR2 and CDR3, with the sequence of CDR1 consisting of amino acid residues at positions 26-31 of SEQ ID NO: 10 (SSSV<u>SY</u> (SEQ ID NO: 16)), the sequence of CDR2 consisting of amino acid residues at positions 49-51 of SEQ ID NO: 10 (DTS (SEQ ID NO: 17)), and the sequence of CDR3 consisting of amino acid residues at positions 90-96 of SEQ ID NO: 10 (WS<u>SN</u>PPI (SEQ ID NO: 18)).

In an embodiment of the above-mentioned antibody, polypeptide or antigen-binding fragment thereof, the antibody is obtained by mutating the amino acid residues at the positions of 35NIDmAb except for CDRs; alternatively, the antibody is obtained by humanizing 35NIDmAb.

Those skilled in the art can mutate the other amino acid residues except for those in the CDR sequences in any of the above-mentioned antibodies according to the common knowledge and conventional technical means in the art. The resultant antibodies also fall into the scope of the present application.

The humanized antibody is at least one of: AE001-H1+L1, AE001-H2+L2 or AE001-H3+L3. These three antibodies all comprise a light chain variable region and a heavy chain variable region, wherein the heavy chain variable region comprises CDR1, CDR2 and CDR3, with sequence of CDR1 consisting of amino acid residues at positions 25-32 of SEQ ID NO: 9 (GYTFT<u>NY</u>G), the sequence of CDR2 consisting of amino acid residues at positions 50-57 of SEQ ID NO: 9 (<u>INTYTGEP</u>), and the sequence of CDR3 consisting of amino acid residues at positions 98-106 of SEQ ID NO: 9 (YG<u>YSW</u>AMDY); and wherein the light chain variable region comprises CDR1, CDR2 and CDR3, with the sequence of CDR1 consisting of amino acid residues at positions 26-31 of SEQ ID NO: 10 (SSSV<u>SY</u>), the sequence of CDR2 consisting of amino acid residues at positions 49-51 of SEQ ID NO: 10 (DTS), and the sequence of CDR3 consisting of amino acid residues at positions 90-96 of SEQ ID NO: 10 (WS<u>SN</u>PPI).

For AE001-H1+L1, the sequence of the heavy chain constant region is AE001H1 (SEQ ID NO: 1), and the sequence of the light chain constant region is AE001L1 (SEQ ID NO: 3).

For AE001-H2+L2, the sequence of the heavy chain constant regionis AE001H2 (SEQ ID NO: 5), and the sequence of the light chain constant region is AE001L2 (SEQ ID NO: 7).

For AE001-H3+L3, the sequence of the heavy chain constant region is AE001H3 (SEQ ID NO: 11), and the sequence of the light chain constant region is AE001L3 (SEQ ID NO: 12).

In an embodiment of the above-mentioned antibody, polypeptide or antigen-binding fragment thereof, the antibody is obtained by mutating an amino acid residue in at least one CDR of the 35NIDmAb or a humanized antibody thereof.

In an embodiment of the above-mentioned antibody, polypeptide or antigen-binding fragment thereof, the mutation of at least one CDR in the 35NIDmAb or the humanized antibody thereof is at least one of:

a mutation of amino acid residues at positions 25, 26, 27, 28, 29 and/or 32 of CDR1 in the heavy chain variable region of 35NIDmAb; that is, a mutation of other amino acid residues except for NY in (25 GYTFT<u>NY</u>G 32 (SEQ ID NO: 13));

a mutation of amino acid residues at positions 50, 52, 55, 56 and/or 57 of CDR2 in the heavy chain variable region of 35NIDmAb; that is, a mutation of other amino acid residues except for the underlined amino acid residues in (50 <u>IN</u>T<u>Y</u>TGEP 57 (SEQ ID NO: 14));

a mutation of amino acid residues at positions 98, 99, 101, 103, 104, 105 and/or 106 of CDR3 in the heavy chain variable region of 35NIDmAb; that is, a mutation of other amino acid residues except for the underlined amino acid residues in (98 YG<u>YSW</u>AMDY 106 (SEQ ID NO: 15));

a mutation of amino acid residues at positions 26, 27, 28 and/or 29 of CDR1 in the light chain variable region of 35NIDmAb; that is, a mutation of other amino acid residues except for the underlined amino acid residues in (26 SSSV<u>SY</u> 31 (SEQ ID NO: 16)); and a mutation of amino acid residues at positions 90, 91, 94, 95 and/or 96 of CDR3 in the light chain variable region of 35NIDmAb; that is, a mutation of other amino acid residues except for the underlined amino acid residues in (90 WS<u>S</u>NPPI 96 (SEQ ID NO: 18)).

In the CDR1 sequence of the heavy chain variable region of the 35NIDmAb (25 GYTFT<u>NY</u>G 32 (SEQ ID NO: 13)), the main amino acid residues that bind to an antigen are the two amino acid residues Asn30 and Tyr31. In the CDR2 sequence of the heavy chain variable region of the 35NIDmAb (50 <u>INTYT</u>GEP 57 (SEQ ID NO: 14)), the main amino acid residues that bind to an antigen are the three amino acid residues Asn51, Tyr53 and Thr54. In the CDR3 sequence of the heavy chain variable region of the 35NIDmAb (98 YG<u>YSW</u>AMDY 106 (SEQ ID NO: 15)), the main amino acid residues that bind to an antigen are the two amino acid residues Tyr100 and Trp102. The above-mentioned residues can be referred to as the residues of the heavy chain of the antibody interacting with an antigen. Other CDR residues do not or rarely bind to the antigen IFP35, so it is easier to change them to obtain antibodies that do not significantly affect an activity thereof. Therefore, changing any residues in the above CDRs that do not interact with an antigen can still maintain the ability of binding to the amino acid residues of the corresponding antigenic epitopes in the antigen-antibody complex structure of IFP35 or NMI, and such an antibody falls into the scope of the present application.

In the CDR1 sequence of the light chain variable region of the antibody (26 SSSV<u>SY</u> 31 (SEQ ID NO: 16)), the main amino acid residues that bind to an antigen are Ser30 and Tyr31. In the CDR2 sequence of the light chain variable region of the antibody (49 <u>D</u>TS 51 (SEQ ID NO: 17)), the main amino acid residue that binds to an antigen is Asp49. In the CDR3 sequence of the light chain variable region of the antibody (90 WS<u>S</u>NPPI 96 (SEQ ID NO: 18)), the main amino acid residues that bind to an antigen are Ser92 and Asn93. The above-mentioned residues can be referred to as the residues of the light chain of the antibody interacting with an antigen. Other CDR residues do not or rarely bind to the antigen IFP35, so it is easier to change them to obtain antibodies that do not significantly affect an activity thereof. Therefore, changing any residues in the above CDRs that do not interact with an antigen can still maintain the ability of binding to the amino acid residues of the corresponding antigenic epitopes in the antigen-antibody complex structure of IFP35 or NMI, and such an antibody falls into the scope of the present application.

In an embodiment of the above-mentioned antibody, polypeptide or antigen-binding fragment thereof, the mutation of at least one CDR in the 35NIDmAb or the humanized antibody thereof is at least one of:
 a mutation of amino acid residues at positions 30 and/or 31 of CDR1 in the heavy chain variable region of 35NIDmAb;
 a mutation of amino acid residues at positions 51, 53 and/or 54 of CDR2 in the heavy chain variable region of 35NIDmAb;
 a mutation of amino acid residues at positions 100 and/or 102 of CDR3 in the heavy chain variable region of 35NIDmAb;
 a mutation of amino acid residues at positions 30 and/or 31 of CDR1 in the light chain variable region of 35NIDmAb; and
 a mutation of amino acid residues at positions 92 and/or 93 of CDR3 in the light chain variable region of 35NIDmAb.

Two or more of the following amino acid residues in the antibody or antigen-binding fragment thereof are capable of being recognized: the amino acid residues at positions Asn30, Tyr31, Asn51, Tyr53, Thr54, Tyr100 and Trp102 in the heavy chain of the 35NIDmAb or the humanized antibody thereof which are involved in the recognition of antigens IFP35 and NMI.

Two or more of the following amino acid residues in the antibody or antigen-binding fragment thereof are capable of being recognized: the amino acid residues at positions Ser30, Tyr31, Asp49, Ser92 and Asn93 in the light chain of the 35NIDmAb or the humanized antibody thereof which are involved in the recognition of antigens IFP35 and NMI.

In the CDR1 sequence of the heavy chain variable region of the antibody (25 GYTFT<u>NY</u>G 32 (SEQ ID NO: 13)), the main amino acid residues that bind to an antigen are the two amino acid residues Asn30 and Tyr31. In the CDR2 sequence of the heavy chain variable region of the antibody (50 <u>INTYT</u>GEP 57 (SEQ ID NO: 14)), the main amino acid residues that bind to an antigen are the three amino acid residues Asn51, Tyr53 and Thr54.

In the CDR3 sequence of the heavy chain variable region of the antibody (98 YG<u>YSW</u>AMDY 106 (SEQ ID NO: 15)), the main amino acid residues that bind to an antigen are the two amino acid residues Tyr100 and Trp102. Therefore, changing some of the amino acid residues may be beneficial to the antigen-antibody binding ability. The above-mentioned residues can be referred to as the residues of the heavy chain of the antibody interacting with an antigen. Changing any one or two or three of these residues interacting with an antigen still maintains the ability of binding to the amino acid residues of the corresponding antigenic epitopes in the antigen-antibody complex structure of IFP35 or NMI, and such an antibody falls into the scope of the present application.

In the CDR1 sequence of the light chain variable region of the antibody (26 SSSV<u>SY</u> 31 (SEQ ID NO: 16)), the main amino acid residues that bind to an antigen are Ser30 and Tyr31. In the CDR2 sequence of the light chain variable region of the antibody (49 <u>D</u>TS 51 (SEQ ID NO: 17)), the main amino acid residue that binds to an antigen is Asp49. In the CDR3 sequence of the light chain variable region of the antibody (90 WS<u>S</u>NPPI 96 (SEQ ID NO: 18)), the main amino acid residues that bind to an antigen are Ser92 and Asn93. Therefore, changing some of the amino acid residues may be beneficial to the antigen-antibody binding ability. The above-mentioned residues can be referred to as the residues of the light chain of the antibody interacting with an antigen. Changing any one or two or three of these residues interacting with an antigen still maintains the ability of binding to the amino acid residues of the corresponding antigenic epitopes in the antigen-antibody complex structure of IFP35 or NMI, and such an antibody falls into the scope of the present application.

In an embodiment of the above-mentioned antibody, polypeptide or antigen-binding fragment thereof, the antibody obtained by mutating at least one CDR of the 35NIDmAb or the humanized antibody thereof is at least one of: AE001-5, AE001-6, AE001-7, AE001-8, AE001-9.

The CDRs of the heavy chain variable region and the light chain variable region of AE001-5, AE001-6, AE001-7, AE001-8, and AE001-9 are shown in the following tables.

The CDRs of the heavy chain variable regions:

| The CDR sequences of the heavy chains | | CDR1(25-32) | CDR2(50-57) | CDR3(98-106) |
|---|---|---|---|---|
| | Starting sequences (SEQ ID NO: 9) | GYTFTNYG (SEQ ID NO: 13) | INTYTGEP (SEQ ID NO: 14) | YGYSWAMDY (SEQ ID NO: 15) |
| AE001-5Hc + Lc | AE001-5 | GYTFPNYG SEQ ID NO: 19 | Unchanged | Unchanged |
| AE001-6Hc + Lc | AE001-6 | Unchanged | Unchanged | Unchanged |
| AE001-6Hc + 7Lc | AE001-7 | Unchanged | Unchanged | Unchanged |
| AE001-6Hc + 8Lc | AE001-8 | Unchanged | Unchanged | Unchanged |
| AE001-6Hc + 9Lc | AE001-9 | Unchanged | Unchanged | Unchanged |

The CDRs of the light chain variable regions:

| The CDR sequences of the light chains | | CDR1(26-31) | CDR2(49-51) | CDR3(90-96) |
|---|---|---|---|---|
| | Starting sequences (SEQ ID NO: 10) | SSSVSY (SEQ ID NO: 16) | DTS (SEQ ID NO: 17) | WSSNPPI (SEQ ID NO: 18) |
| AE001-5Hc + Lc | AE001-5 | Unchanged | Unchanged | Unchanged |
| AE001-6Hc + Lc | AE001-6 | Unchanged | Unchanged | WSPYPPI (SEQ ID NO: 20) |
| AE001-6Hc + 7Lc | AE001-7 | Unchanged | Unchanged | WSSNSWS (SEQ ID NO: 21) |
| AE001-6Hc + 8Lc | AE001-8 | Unchanged | Unchanged | WSPLPPI (SEQ ID NO: 22) |
| AE001-6Hc + 9Lc | AE001-9 | Unchanged | Unchanged | WSPRPPI (SEQ ID NO: 23) |

The sequences of the heavy chain variable regions and light chain variable regions of AE001-5, AE001-6, AE001-7, AE001-8 and AE001-9 except for the CDR sequences thereof can be modified by those skilled in the art as required. In a particular example, the sequences of the heavy chain variable regions and light chain variable regions of AE001-5, AE001-6, AE001-7, AE001-8 and AE001-9 except for the CDR sequences thereof can be the same as the corresponding sequences of the 35NIDmAb antibody.

The sequences of the constant regions of AE001-5, AE001-6, AE001-7, AE001-8 and AE001-9 can be modified by those skilled in the art as required. In a particular example, the sequences of the constant regions of AE001-5, AE001-6, AE001-7, AE001-8 and AE001-9 can be the same as those of the above-mentioned AE001-H1+L1, AE001-H2+L2 or AE001-H3+L3.

In an embodiment of the above therapeutic method and use, the chronic inflammatory disease is selected from the group consisting of multiple sclerosis, arthritis, rheumatoid arthritis, psoriasis, various enteritis (such as IBD), asthma, chronic obstructive pulmonary disease and systemic lupus erythematosus, chronic hepatitis, chronic nephritis, chronic pancreatitis, encephalitis, malignant tumors, leukemia, Alzheimer's disease, Parkinson's syndrome and the like.

In an embodiment of the above therapeutic method and use, the abnormal amount of the secreted inflammatory factor IFP35/NMI is involved in the chronic inflammatory diseases comprising rheumatoid arthritis (RA), osteoarthritis (OA), multiple sclerosis (MS), atherosclerosis, myocardial infarction, chronic obstructive pulmonary disease (COPD), chronic nephritis, chronic hepatitis, chronic pancreatitis, type 2 diabetes, systemic lupus erythematosus (SLE), Alzheimer's disease, Parkinson's disease (PD), malignant tumors, asthma, allergic diseases, cardiovascular diseases, musculoskeletal diseases, inflammatory bowel disease (IBD), obesity and diabetes, retinal inflammatory disease (AMD), periodontitis, uveitis and the like.

Many inflammatory factors are involved in the pathological process of the chronic inflammatory diseases. As inflammatory factors that can be secreted by immune cells into the extracellular matrix (such as blood, body fluids and the like) to promote an inflammatory response, IFP35 and/or NMI can also be secreted by cells into the extracellular matrix (such as blood, body fluids and the like) to play a role in activating an inflammatory response. Multiple sclerosis exemplified in the present application is a typical representative of chronic inflammatory diseases. The occurrence of multiple sclerosis is closely related to microglia. Microglia can function similar to the partial immune cells (macrophages) of the nervous system, namely releasing inflammatory factors, and promoting the occurrence of inflammatory response. This phenomenon is equivalent to an inflammatory response triggered by immune cells such as macrophages when the inflammatory response occurs in other tissues and organs of the body. The present inventors found that microglia secreted IFP35/NMI into the cell culture medium under the induction of LPS, and the amount of IFP35/NMI in the serum of animals with multiple sclerosis was also increased. It shows that IFP35/NMI is associated with multiple sclerosis. In general, immune cells such as macrophages and microglia release inflammatory factors to trigger an inflammatory response, which may lead to various chronic inflammatory diseases, in which IFP35/NMI serves as the inflammatory factor.

The present application also provides a method and use for diagnosing a chronic inflammatory disease, which includes the following technical solutions A, B, C or D:

Technical solution A is use of a substance for detecting IFP35 and/or NMI in the manufacture of a product for diagnosing a chronic inflammatory disease, the substance detecting IFP35 and/or NMI is at least one of:

(1) a substance for detecting whether the expression level of IFP35/NMI in the spinal cord tissue of the organism is significantly increased;
(2) a substance for detecting whether IFP35/NMI is secreted into blood or body fluid of the organism (such as cerebrospinal fluid);
(3) a substance for detecting whether IFP35 and/or NMI are present in blood or body fluid of the organism (such as cerebrospinal fluid), and/or a substance for detecting the amount of IFP35 and/or NMI in the blood or body fluid of the organism (such as cerebrospinal fluid);
(4) a substance for detecting the amounts of IFP35 and/or NMI that is secreted into blood or body fluid of the organism (such as cerebrospinal fluid) to assist in the medical diagnosis of a clinical inflammatory disease;
(5) a substance for detecting a difference and a correlation between the secretion of IFP35 and/or NMI and the increased expression of other inflammatory factors (such as TNF, IL1, IL6 and the like) and biomarkers (such as procalcitonin (PCT) and C-reactive protein (CRP)) in the organism as well as the increased amount of the inflammatory factors and the biomarkers secreted into the blood.

Technical solution B is use of a clinical test product for diagnosing a disease to detect IFP35 and/or NMI secreted into serum and body fluids.

The clinical test product for detecting IFP35 and/or NMI secreted into serum and body fluids comprises at least one of: a fluorescence/luminescence clinical detection reagent (kit), a chemiluminescence clinical detection reagent (kit), an ELISA detection reagent (kit), a PCR clinical detection reagent (kit) and the like.

The detection comprises detecting a difference and a correlation between the secretion of IFP35 and/or NMI and the increased expression of other inflammatory factors (such as TNF, IL1, IL6 and the like) and biomarkers (such as procalcitonin (PCT) and C-reactive protein (CRP)) in the organism as well as the increased amount of the inflammatory factors and the biomarkers secreted into the blood.

Technical solution C is use of a clinical test product for diagnosing a chronic inflammatory disease to detect IFP35 and/or NMI secreted into serum and body fluids.

The clinical test product for detecting IFP35 and/or NMI secreted into serum and body fluids comprises at least one of: a fluorescence/luminescence clinical detection reagent (kit), a chemiluminescence clinical detection reagent (kit), an ELISA detection reagent (kit), a PCR clinical detection reagent (kit) and the like.

The detection comprises detecting a difference and a correlation between the secretion of IFP35 and/or NMI and the increased expression of other inflammatory factors (such as TNF, IL1, IL6 and the like) and biomarkers (such as procalcitonin (PCT) and C-reactive protein (CRP)) in the organism as well as the increased amount of the inflammatory factors and the biomarkers secreted into the blood.

Technical solution D is a method for diagnosing whether an organism to be tested has a chronic inflammatory disease, including at least one of the following steps:

(1) detecting whether the expression level of IFP35/NMI in the tissue of the organism (such as spinal cord tissue) is significantly increased;
(2) detecting whether IFP35/NMI is secreted into blood or body fluid of the organism (such as cerebrospinal fluid);
(3) detecting whether IFP35 and/or NMI are present in blood or body fluid of the organism (such as cerebrospinal fluid), and/or detecting the amount of IFP35 and/or NMI in blood or body fluid of the organism (such as cerebrospinal fluid);
(4) detecting the amounts of IFP35 and/or NMI that are secreted into blood or body fluid of the organism (such as cerebrospinal fluid) to assist in the medical diagnosis of a clinical inflammatory disease;
(5) detecting a difference and a correlation between the secretion of IFP35 and/or NMI and the increased expression of other inflammatory factors (such as TNF, IL1, IL6 and the like) and biomarkers (such as procalcitonin (PCT) and C-reactive protein (CRP)) in the organism as well as the increased amount of the inflammatory factors and the biomarkers secreted into the blood.

In an embodiment of the above diagnostic method and use, whether the organism to be tested has a chronic inflammatory disease can be diagnosed according to at least one of the following criteria:

(1) If the expression level of IFP35/NMI in the tissue of the organism to be tested (such as spinal cord tissue) is significantly increased, it is determined that the organism to be tested has a chronic inflammatory disease;
(2) If IFP35/NMI is detected to be secreted into the blood or body fluids of the organism (such as cerebrospinal fluid), it is determined that the organism to be tested has chronic inflammatory diseases;
(3) If IFP35/NMI is detected to be present in the blood or body fluid of the organism (such as cerebrospinal fluid), it is determined that the organism to be tested has a chronic inflammatory disease.
(4) If the increased expression of IFP35/NMI is consistent with the expression of other inflammatory factors in the organism (such as interferon, TNF, IL1, IL6 and the like) and the secretion of the inflammatory factors into the blood or body fluids, or if the organism has clinical symptoms, it is determined that the organism to be tested has a chronic inflammatory disease.

In an embodiment of the above diagnostic method and use, the clinical test product for detecting IFP35 and/or NMI secreted into serum and body fluids comprises at least one of: a fluorescence/luminescence clinical detection reagent (kit), a chemiluminescence clinical detection reagent (kit), an ELISA detection reagent (kit), a PCR clinical detection reagent (kit) and the like.

In an embodiment of the above diagnostic method and use, the detection of an amount and/or an activity of IFP35 and/or NMI can be performed at a DNA, RNA or protein level.

In an embodiment of the above diagnostic method and use, specific nucleic acid probes can be used to detect the level of DNA and/or RNA. A PCR primer or chip can also be used to detect the level of DNA and/or RNA.

In an embodiment of the above diagnostic method and use, an antibody is used to detect the level of a protein.

In an embodiment of the above diagnostic method and use, currently, the commonly used clinical indicators for detecting an inflammatory disease include procalcitonin (PCT), C-reactive protein (CRP), TNF, IL6 and the like. However, these indicators for detection have limitations. For example, PCT cannot be used to indicate infection caused by a virus. In addition, for different diseases, different inflammatory factors can cause different manifestations in different patients. Therefore, on the one hand, it is necessary to develop other suitable indicators for detection; and on the other hand, it is necessary to generally test all of the known inflammatory factors. For a chronic inflammatory disease, IFP35 and NMI can be tested clinically and compared with other indicators.

In an embodiment of the above diagnostic method and use, diagnosing whether the mice have MS can be assisted by detecting whether the expression level of IFP35/NMI in the spinal cord tissue of mice is significantly increased, detecting whether IFP35/NMI is secreted into blood or body fluid of mice (such as cerebrospinal fluid), or detecting a correlation between the secretion of IFP35 and/or NMI and the increased expression of other inflammatory factors (such as TNF, IL1, IL6 and the like) in mice as well as the increased amount of the inflammatory factors secreted into the blood. If the expression level of IFP35/NMI in the tissue of mice is significantly increased, IFP35/NMI is abnormally secreted into the blood or body fluid of mice (such as in the cerebrospinal fluid), or the increased expression of IFP35/NMI is consistent with the expression of other inflammatory factors (such as interferon, TNF, IL1, IL6 and the like) in mice and the secretion of other inflammatory factors into the blood, which causes obvious external symptoms such as changes in the gait and paralysis of the limbs in mice, it can be substantially determined that the mice has MS.

In an embodiment of the above diagnostic method and use, the substance for detection is an antibody, a polypeptide, or an antigen-binding fragment thereof as defined in A or B or C or D:

A. an antibody, a polypeptide or an antigen-binding fragment thereof which specifically binds to an antigenic epitope of IFP35/NMI, wherein the antigenic epitope is (1) or (2) as follows: (1) the antigenic epitope includes the following amino acid positions: Arg163, Asn164, Arg191, Gln194, Ile195, Gln197, Phe198, Thr199, Pro201, Gln206, Pro208 and Arg210 of IFP35; (2) the antigenic epitope includes the following amino acid positions: Arg185, Asn186, Lys215, Lys218, Lys219, Glu221, Tyr222, Pro223, Tyr225, Cys230, Arg232 and Thr234 of NMI;

B. any antibodies, small molecules or polypeptides which are capable of binding to at least one amino acid residue in the antigenic epitope of the above (1) and inhibit an activity of IFP35;

C. any antibodies, small molecules or polypeptides which are capable of binding to at least one amino acid residue in the antigenic epitope of the above (2) and inhibit an activity of NMI;

D. a 35NIDmAb antibody comprising a light chain variable region and a heavy chain variable region, wherein the heavy chain variable region comprises CDR1, CDR2 and CDR3, with the sequence of CDR1 consisting of amino acid residues at positions 25-32 of SEQ ID NO: 9 (GYTFTNYG), the sequence of CDR2 consisting of amino acid residues at positions 50-57 of SEQ ID NO: 9 (INTYTGEP), and the sequence of CDR3 consisting of amino acid residues at positions 98-106 of SEQ ID NO: 9 (YGYSWAMDY); and wherein the light chain variable region comprises CDR1, CDR2 and CDR3, with the sequence of CDR1 consisting of amino acid residues at positions 26-31 of SEQ ID NO: 10 (SSSVSY), the sequence of CDR2 consisting of amino acid residues at positions 49-51 of SEQ ID NO: 10 (DTS), and the sequence of CDR3 consisting of amino acid residues at positions 90-96 of SEQ ID NO: 10 (WSSNPPI).

In an embodiment of the above-mentioned antibody, polypeptide or antigen-binding fragment thereof for diagnosis, the antibody is obtained by mutating the amino acid residues at the positions of 35NIDmAb except for CDRs; alternatively, the antibody is obtained by humanizing 35NIDmAb.

Those skilled in the art can mutate the other amino acid residues except for those in the CDR sequences in any of the above-mentioned antibodies according to the common knowledge and conventional technical means in the art. The resultant antibodies also fall into the scope of the present application.

The humanized antibody is at least one of: AE001-H1+L1, AE001-H2+L2 or AE001-H3+L3. These three antibodies all comprise a light chain variable region and a heavy chain variable region, wherein the heavy chain variable region comprises CDR1, CDR2 and CDR3, with sequence of CDR1 consisting of amino acid residues at positions 25-32 of SEQ ID NO: 9 (GYTFTNYG), the sequence of CDR2 consisting of amino acid residues at positions 50-57 of SEQ ID NO: 9 (INTYTGEP), and the sequence of CDR3 consisting of amino acid residues at positions 98-106 of SEQ ID NO: 9 (YGYSWAMDY); and wherein the light chain variable region comprises CDR1, CDR2 and CDR3, with the sequence of CDR1 consisting of amino acid residues at positions 26-31 of SEQ ID NO: 10 (SSSVSY), the sequence of CDR2 consisting of amino acid residues at positions 49-51 of SEQ ID NO: 10 (DTS), and the sequence of CDR3 consisting of amino acid residues at positions 90-96 of SEQ ID NO: 10 (WSSNPPI).

For AE001-H1+L1, the sequence of the heavy chain constant region is AE001H1 (SEQ ID NO: 1), and the sequence of the light chain constant region is AE001L1 (SEQ ID NO: 3).

For AE001-H2+L2, the sequence of the heavy chain constant region is AE001H2 (SEQ ID NO: 5), and the sequence of the light chain constant region is AE001L2 (SEQ ID NO: 7).

For AE001-H3+L3, the sequence of the heavy chain constant region is AE001H3 (SEQ ID NO: 11), and the sequence of the light chain constant region is AE001L3 (SEQ ID NO: 12).

In an embodiment of the above-mentioned antibody, polypeptide or antigen-binding fragment thereof for diagnosis, the antibody is obtained by mutating an amino acid residue in at least one CDR of the 35NIDmAb or a humanized antibody thereof.

In an embodiment of the above-mentioned antibody, polypeptide or antigen-binding fragment thereof for diagnosis, the mutation of at least one CDR in the 35NIDmAb or the humanized antibody thereof is at least one of:

a mutation of amino acid residues at positions 25, 26, 27, 28, 29 and/or 32 of CDR1 in the heavy chain variable region of 35NIDmAb; that is, a mutation of other amino acid residues except for NY in (25 GYTFTNYG 32 (SEQ ID NO: 13));

a mutation of amino acid residues at positions 50, 52, 55, 56 and/or 57 of CDR2 in the heavy chain variable region of 35NIDmAb; that is, a mutation of other amino acid residues except for the underlined amino acid residues in (50 INTYTGEP 57 (SEQ ID NO: 14));

a mutation of amino acid residues at positions 98, 99, 101, 103, 104, 105 and/or 106 of CDR3 in the heavy chain variable region of 35NIDmAb; that is, a mutation of other amino acid residues except for the underlined amino acid residues in (98 YGYSWAMDY 106 (SEQ ID NO: 15));

a mutation of amino acid residues at positions 26, 27, 28 and/or 29 of CDR1 in the light chain variable region of 35NIDmAb; that is, a mutation of other amino acid residues except for the underlined amino acid residues in (26 SSSVSY 31 (SEQ ID NO: 16)); and a mutation of amino acid residues at positions 90, 91, 94, 95 and/or 96 of CDR3 in the light chain variable region of 35NIDmAb; that is, a mutation of other amino acid residues except for the underlined amino acid residues in (90 WSSNPPI 96 (SEQ ID NO: 18)).

In the CDR1 sequence of the heavy chain variable region of the 35NIDmAb (25 GYTFTNYG 32 (SEQ ID NO: 13)), the main amino acid residues that bind to an antigen are the two amino acid residues Asn30 and Tyr31. In the CDR2 sequence of the heavy chain variable region of the 35NIDmAb (50 INTYTGEP 57 (SEQ ID NO: 14)), the main amino acid residues that bind to an antigen are the three amino acid residues Asn51, Tyr53 and Thr54. In the CDR3 sequence of the heavy chain variable region of the 35NIDmAb (98 YGYSWAMDY 106 (SEQ ID NO: 15)), the main amino acid residues that bind to an antigen are the two amino acid residues Tyr100 and Trp102. The above-mentioned residues can be referred to as the residues of the heavy chain of the antibody interacting with an antigen. Other CDR residues do not or rarely bind to the antigen IFP35, so it is easier to change them to obtain antibodies that do not significantly affect an activity thereof. Therefore, changing any residues in the above CDRs that do not interact with an antigen can still maintain the ability of binding to the amino acid residues of the corresponding antigenic epitopes in the antigen-antibody complex structure of IFP35 or NMI, and such an antibody falls into the scope of the present application.

In the CDR1 sequence of the light chain variable region of the antibody (26 SSSVSY 31 (SEQ ID NO: 16)), the main amino acid residues that bind to an antigen are Ser30 and Tyr31. In the CDR2 sequence of the light chain variable region of the antibody (49 DTS 51 (SEQ ID NO: 17)), the main amino acid residue that binds to an antigen is Asp49. In the CDR3 sequence of the light chain variable region of the antibody (90 WSSNPPI 96 (SEQ ID NO: 18)), the main amino acid residues that bind to an antigen are Ser92 and Asn93. The above-mentioned residues can be referred to as the residues of the light chain of the antibody interacting with an antigen. Other CDR residues do not or rarely bind to the antigen IFP35, so it is easier to change them to obtain antibodies that do not significantly affect an activity thereof. Therefore, changing any residues in the above CDRs that do not interact with an antigen can still maintain the ability of binding to the amino acid residues of the corresponding antigenic epitopes in the antigen-antibody complex structure of IFP35 or NMI, and such an antibody falls into the scope of the present application.

In an embodiment of the above-mentioned antibody, polypeptide or antigen-binding fragment thereof for diagnosis, the mutation of at least one CDR in the 35NIDmAb or the humanized antibody thereof is at least one of:

a mutation of amino acid residues at positions 30 and/or 31 of CDR1 in the heavy chain variable region of 35NIDmAb;

a mutation of amino acid residues at positions 51, 53 and/or 54 of CDR2 in the heavy chain variable region of 35NIDmAb;

a mutation of amino acid residues at positions 100 and/or 102 of CDR3 in the heavy chain variable region of 35NIDmAb;

a mutation of amino acid residues at positions 30 and/or 31 of CDR1 in the light chain variable region of 35NIDmAb; and a mutation of amino acid residues at positions 92 and/or 93 of CDR3 in the light chain variable region of 35NIDmAb.

Two or more of the following amino acid residues in the antibody or antigen-binding fragment thereof for diagnosis are capable of being recognized: the amino acid residues at positions Asn30, Tyr31, Asn51, Tyr53, Thr54, Tyr100 and Trp102 in the heavy chain of the 35NIDmAb or the humanized antibody thereof which are involved in the recognition of antigens IFP35 and NMI.

Two or more of the following amino acid residues in the antibody or antigen-binding fragment thereof for diagnosis are capable of being recognized: the amino acid residues at positions Ser30, Tyr31, Asp49, Ser92 and Asn93 in the light chain of the 35NIDmAb or the humanized antibody thereof which are involved in the recognition of antigens IFP35 and NMI.

In the CDR1 sequence of the heavy chain variable region of the antibody (25 GYTFTNYG 32 (SEQ ID NO: 13)), the main amino acid residues that bind to an antigen are the two amino acid residues Asn30 and Tyr31. In the CDR2 sequence of the heavy chain variable region of the antibody (50 INTYTGEP 57 (SEQ ID NO: 14)), the main amino acid residues that bind to an antigen are the three amino acid residues Asn51, Tyr53 and Thr54. In the CDR3 sequence of the heavy chain variable region of the antibody (98 YGYSWAMDY 106 (SEQ ID NO: 15)), the main amino acid residues that bind to an antigen are the two amino acid residues Tyr100 and Trp102. Therefore, changing some of the amino acid residues may be beneficial to the antigen-antibody binding ability. The above-mentioned residues can be referred to as the residues of the heavy chain of the antibody interacting with an antigen. Changing any one or two or three of these residues interacting with an antigen still maintains the ability of binding to the amino acid residues of the corresponding antigenic epitopes in the antigen-antibody complex structure of IFP35 or NMI, and such an antibody falls into the scope of the present application.

In the CDR1 sequence of the light chain variable region of the antibody (26 SSSVSY 31 (SEQ ID NO: 16)), the main amino acid residues that bind to an antigen are Ser30 and Tyr31. In the CDR2 sequence of the light chain variable region of the antibody (49 DTS 51 (SEQ ID NO: 17)), the main amino acid residue that binds to an antigen is Asp49. In the CDR3 sequence of the light chain variable region of the antibody (90 WSSNPPI 96 (SEQ ID NO: 18)), the main amino acid residues that bind to an antigen are Ser92 and Asn93. Therefore, changing some of the amino acid residues may be beneficial to the antigen-antibody binding ability. The above-mentioned residues can be referred to as the residues of the light chain of the antibody interacting with an antigen. Changing any one or two or three of these residues interacting with an antigen still maintains the ability of binding to the amino acid residues of the corresponding antigenic epitopes in the antigen-antibody complex structure of IFP35 or NMI, and such an antibody falls into the scope of the present application.

In an embodiment of the above-mentioned antibody, polypeptide or antigen-binding fragment thereof for diagnosis, the antibody obtained by mutating at least one CDR of the 35NIDmAb or the humanized antibody thereof is at least one of: AE001-5, AE001-6, AE001-7, AE001-8, and AE001-9, the CDRs of the heavy chain variable regions and the light chain variable regions of which are shown in the following tables.

The CDRs of the heavy chain variable regions:

| | The CDR sequences of the heavy chains | CDR1(25-32) | CDR2(50-57) | CDR3(98-106) |
|---|---|---|---|---|
| | Starting sequences (SEQ ID NO: 9) | GYTFTNYG (SEQ ID NO: 13) | INTYTGEP (SEQ ID NO: 14) | YGYSWAMDY (SEQ ID NO: 15) |
| AE001-5Hc + Lc | AE001-5 | GYTFPNYG (SEQ ID NO: 19) | Unchanged | Unchanged |
| AE001-6Hc + Lc | AE001-6 | Unchanged | Unchanged | Unchanged |
| AE001-6Hc + 7Lc | AE001-7 | Unchanged | Unchanged | Unchanged |
| AE001-6Hc + 8Lc | AE001-8 | Unchanged | Unchanged | Unchanged |
| AE001-6Hc + 9Lc | AE001-9 | Unchanged | Unchanged | Unchanged |

| | The CDR sequences of the light chains | CDR1(26-31) | CDR2(49-51) | CDR3(90-96) |
|---|---|---|---|---|
| | Starting sequences (SEQ ID NO: 10) | SSSVSY (SEQ ID NO: 16) | DTS (SEQ ID NO: 17) | WSSNPPI (SEQ ID NO: 18) |
| AE001-5Hc + Lc | AE001-5 | Unchanged | Unchanged | Unchanged |
| AE001-6Hc + Lc | AE001-6 | Unchanged | Unchanged | WSPYPPI (SEQ ID NO: 20) |
| AE001-6Hc + 7Lc | AE001-7 | Unchanged | Unchanged | WSSNSWS (SEQ ID NO: 21) |
| AE001-6Hc + 8Lc | AE001-8 | Unchanged | Unchanged | WSPLPPI (SEQ ID NO: 22) |
| AE001-6Hc + 9Lc | AE001-9 | Unchanged | Unchanged | WSPRPPI (SEQ ID NO: 23) |

The sequences of the heavy chain variable regions and light chain variable regions of AE001-5, AE001-6, AE001-7, AE001-8 and AE001-9 except for the CDR sequences thereof can be modified by those skilled in the art as required. In a particular example, the sequences of the heavy chain variable regions and light chain variable regions of AE001-5, AE001-6, AE001-7, AE001-8 and AE001-9 except for the CDR sequences thereof can be the same as the corresponding sequences of the 35NIDmAb antibody.

The sequences of the constant regions of AE001-5, AE001-6, AE001-7, AE001-8 and AE001-9 can be modified by those skilled in the art as required. In a particular example, the sequences of the constant regions of AE001-5, AE001-6, AE001-7, AE001-8 and AE001-9 can be the same as those of the above-mentioned AE001-H1+L1, AE001-H2+L2 or AE001-H3+L3.

In an embodiment of the above diagnostic method and use, the chronic inflammatory disease is related to an enhanced inflammatory response caused by abnormal secretion of IFP35/NMI into the blood or body fluids and comprises arthritis, rheumatoid arthritis, psoriasis, various enteritis (such as IBD), multiple sclerosis, asthma, chronic obstructive pulmonary disease, systemic lupus erythematosus, chronic hepatitis, chronic nephritis, chronic pancreatitis, encephalitis, malignant tumors, leukemia, Alzheimer's disease, Parkinson's syndrome, allergic diseases, cardiovascular diseases, musculoskeletal diseases, inflammatory bowel disease, obesity and diabetes, retinal inflammatory disease, periodontitis, uveitis and the like.

In an embodiment of the above diagnostic method and use, the chronic inflammatory disease is related to an enhanced inflammatory response caused by abnormal secretion of IFP35/NMI into the blood or body fluids and comprises arthritis, rheumatoid arthritis, psoriasis, various enteritis (such as IBD), multiple sclerosis, asthma, chronic obstructive pulmonary disease, systemic lupus erythematosus, chronic hepatitis, chronic nephritis, chronic pancreatitis, encephalitis, malignant tumors, leukemia, Alzheimer's disease, Parkinson's syndrome, allergic diseases, inflammatory bowel disease and the like. The above-mentioned chronic inflammations have been repeatedly proved to be related to a variety of inflammatory factors.

In an embodiment of the above diagnostic method and use, the diagnosis is early diagnosis, diagnosis of a condition and prognosis judgment.

The present application also provides an antigenic epitope of IFP35. The antigenic epitope of IFP35 is at least one of the following amino acid residues: Arg163, Asn164, Arg191, Gln194, Ile195, Gln197, Phe198, Thr199, Pro201, Gln206, Pro208, Arg210 of IFP35.

The present application also provides an antigenic epitope of NMI. The antigenic epitope of NMI is at least one of the following amino acid residues: Arg185, Asn186, Lys215, Lys218, Lys219, Glu221, Tyr222, Pro223, Tyr225, Cys230, Arg232, Thr234 of NMI.

The present application also provides a method for preparing an antibody based on the above-mentioned antigenic epitopes.

The present application also provides a method for preparing an antibody against IFP35 or NMI, which is prepared by using information about any of the above-mentioned antigenic epitopes.

The above-mentioned method for preparing the antibody against IFP35 or NMI comprises modifying the sequence of the antibody based on the following information of 35NIDmAb antibody-IFP35/NMI antigen complex structure and sequence, and then preparing the modified IFP35 or NMI antibody.

The structure information of the 35NIDmAb antibody-IFP35/NMI antigen complex is as follows: In the CDR1 sequence of the heavy chain variable region of the 35NIDmAb antibody (25 GYTFTNYG 32 (SEQ ID NO: 13)), the main amino acid residues that bind to an antigen are the two amino acid residues Asn30 and Tyr31. In the CDR2 sequence of the heavy chain variable region of the 35NIDmAb antibody (50 INTYTGEP 57 (SEQ ID NO: 14)), the main amino acid residues that bind to an antigen are the three amino acid residues Asn51, Tyr53 and Thr54. In the CDR3 sequence of the heavy chain variable region of the 35NIDmAb antibody (98 YGYSWAMDY 106 (SEQ ID NO: 15)), the main amino acid residues that bind to an antigen are the two amino acid residues Tyr100 and Trp102.

In the CDR1 sequence of the light chain variable region of the 35NIDmAb antibody (26 SSSVSY 31 (SEQ ID NO: 16)), the main amino acid residues that bind to an antigen are Ser30 and Tyr31. In the CDR2 sequence of the light chain variable region of the 35NIDmAb antibody (49 DTS 51 (SEQ ID NO: 17)), the main amino acid residue that binds to an antigen is Asp49. In the CDR3 sequence of the light chain variable region of the 35NIDmAb antibody (90 WSSNPPI 96 (SEQ ID NO: 18)), the main amino acid residues that bind to an antigen are Ser92 and Asn93.

It is well-known for those skilled in the art that a specific antigenic epitope structure can assist in designing and engineering the existing original antibody. The original antibody is generally obtained through various screening techniques. It is also possible to screen an antibody directly with known antigenic epitopes (antigenic determinants).

From the information of the structure and sequence alignment of the antibody-antigen complex described above, (1) it is possible to observe visually that the amino acid residues located on the surface of an antigen which are useful to search for the antigenic determinants as most of the antigenic determinants are distributed on the surface of the antigen; (2) it is possible to observe that the amino acid residues of an antigen interacting with an antibody, thereby analyzing the interaction characteristics between the amino acid residues of the antigen and those of the antibody to assist in engineering, designing and optimizing the antibody for the specific amino acid residues; (3) it is possible to direct the antibody engineering to obtain a new antibody against other homologous protein antigens.

A method for engineering an antibody gene involves universal gene site-directed mutagenesis technology, and expressing the engineered antibody gene or antibody gene fragments (such as variable regions of the antibody) in eukaryotic cells (such as mammalian cells) or prokaryotic cells, and purifying the antibody and the antibody fragments to obtain the purified engineered monoclonal antibody.

Antibodies prepared by any of the aforementioned methods also fall into the scope of the present application.

The 35NIDmAb antibody described herein has a light chain variable region and a heavy chain variable region, wherein the heavy chain variable region comprises CDR1, CDR2 and CDR3, with the sequence of CDR1 consisting of amino acid residues at positions 25-32 of SEQ ID NO: 9 (GYTFTNYG), the sequence of CDR2 consisting of amino acid residues at positions 50-57 of SEQ ID NO: 9 (INTYTGEP), and the sequence of CDR3 consisting of amino acid residues at positions 98-106 of SEQ ID NO: 9 (YGYSWAMDY); and wherein the light chain variable region comprises CDR1, CDR2 and CDR3, with the sequence of CDR1 consisting of amino acid residues at positions 26-31 of SEQ ID NO: 10 (SSSVSY), the sequence of CDR2 consisting of amino acid residues at positions 49-51 of SEQ ID NO: 10 (DTS), and the sequence of CDR3 consisting of amino acid residues at positions 90-96 of SEQ ID NO: 10 (WSSNPPI).

In the 35NIDmAb antibody described herein, the sequence of the light chain variable region is set forth in SEQ ID NO: 10, and the sequence of the heavy chain variable region is set forth in SEQ ID NO: 9.

The amino acid sequence of human IFP35 is set forth in SEQ ID NO:2.

The amino acid sequence of murine IFP35 is set forth in SEQ ID NO:4.

The amino acid sequence of murine NMI is set forth in SEQ ID NO: 6.

The amino acid sequence of human NMI is set forth in SEQ ID NO:8.

In the present application, the inventors have constructed some mouse models of inflammatory diseases, and detected the amounts of IFP35 and NMI in the serum of these animals having an inflammatory disease, in order to search for inflammatory diseases related to IFP35/NMI. The present inventors have found that IFP35 and NMI are closely related to some chronic inflammatory diseases, such as multiple sclerosis, and the high serum amounts of IFP35 and NMI are closely related to the onset of multiple sclerosis. Knockout of IFP35/NMI gene or use of a neutralizing antibody against IFP35/NMI can ameliorate the symptoms of multiple sclerosis. Therefore, the present inventors believe that inhibiting the activity of IFP35 or NMI can treat a chronic disease such as multiple sclerosis. Detection of the amounts of IFP35 and NMI in serum or body fluids (such as cerebrospinal fluid) can be used for the diagnosis of a chronic inflammatory disease.

Based on the above description, the present inventors have developed a neutralizing antibody that can inhibit IFP35. In order to more clearly reveal the inhibitory mechanism of the antibody, the present inventors further analyzed the three-dimensional crystal structure of a complex of the neutralizing antibody and a NID domain of the antigen IFP35. Through the complex structure, the present inventors have revealed the structures of the antibody and the antigen, an antibody recognition epitope, an antigen-antibody binding mode, the key interaction residues and the like, which can be used for directing the optimization of the antibody to improve the binding capacity, the recognition specificity and the neutralizing activity of the antibody. In addition, due to the high homology between IFP35 and NMI sequences, it is also possible to design and engineer an antibody to develop an antibody with the improved ability of recognizing NMI protein, a specific antibody against NMI and a bispecific antibody against both of IFP35 and NMI.

With respect to a chronic inflammation, the present inventors have tested whether there is an increased expression of IFP35 or NMI in some inflammatory diseases. The present inventors have found that the amount of NMI in the serum was significantly increased in a mouse model of multiple sclerosis (MS). After knocking out IFP35 and NMI genes, the symptoms of multiple sclerosis in mice were significantly ameliorated. The use of the neutralizing antibody against IFP35 can ameliorate the symptoms of MS and achieve the purpose of treating or alleviating the disease.

In another aspect of the present application, the present inventors discovered anew type of IFP35 family proteins (including IFP35 and NMI) belonging to the DAMP class of inflammatory factors in the human body when studying influenza virus and host immune mechanism. The level of this type of factors in normal human and mouse serum is very low or below the detectable level (i.e. the level below the detection line). In the case of pathogen infection, the factors can be quickly released from immune cells (such as macrophages) into the blood. They can quickly promote immune cells to secrete inflammatory factors such as TNF and IL6 to activate the body's inflammatory response. Their amounts in the serum is positively correlated with the degree of inflammatory response. When detecting the samples from patients with sepsis, it was found that the patient's mortality rate is higher upon the amounts of IFP35 and NMI in the blood reached the high level (for example, the amount of IFP reaches hundreds of picograms per milliliter).

The present inventors used influenza virus as a model and have found that the loss of weight of the mice with the knockout of IFP35 and/or NMI family protein genes has been greatly relieved, the clinical symptoms of the mice and the lung damage caused by influenza virus infection have been significantly ameliorated, and the survival rate has been significantly improved compared with wild-type mice after studying the relationship between such inflammatory factors and viral infection. A treatment using a neutralizing antibody against IFP35 and/or NMI can achieve an effect equivalent to that achieved by gene knockout, namely greatly ameliorating the symptoms of diseased mice, and significantly decreasing the mortality rate caused by influenza virus infection.

Based on the above research results, under the current situation that an effective therapy for fighting against the novel coronavirus (COVID-19) pneumonia is being developed worldwide including China, the present inventors have explored that such inflammatory factors can be used as a marker for detecting COVID-19 infection in blood which can be used to assist the medical staffs in determining the severity and prognosis of the patient's disease, and can be used as a target for inhibiting an excessive inflammatory response in the treatment of the excessive inflammatory response (or sepsis) caused by viruses. The present inventors have thus established one or more inventions of the present application.

The research results show that the levels of IFP35 and NMI in the serum of severe/critical diseased patients infected with the novel coronavirus COVID-19 have been significantly increased, indicating that IFP35 and NMI can be used as diagnostic or auxiliary diagnostic indicators for severe/critical diseased patients, thereby providing the medical staffs with warnings. In addition, in combination of the results of influenza virus research targeting IFP35 and NMI, the inhibitor drugs against IFP35 and NMI (such as antibody drugs) are expected to be used in the treatment of an excessive inflammatory response disease caused by COVID-19. Whether it is the influenza virus or the novel coronavirus COVID-19, it will cause IFP35 and NMI to be secreted into the blood and body fluids after infecting the human body. When either gene of these two inflammatory factors (IFP35 and NMI genes) is knocked out or one of the genes is inhibited by a neutralizing antibody, the inflammatory response and the mortality rate of the infected organism are reduced. These results indicate that the secretion of IFP35 and NMI is related to the severity of virus (such as the influenza virus or the novel coronavirus COVID-19) infection. The secretion of IFP35 and NMI can be used as an indicator of an organism's inflammatory response caused by the viruses. IFP35 and NMI can be the therapeutic targets for inhibitors such as antibody drugs, peptide drugs or chemical drugs.

Definition

Unless defined otherwise, all technical and scientific terms used herein have the same meaning as is commonly understood by one of ordinary skill in the art to which this invention belongs. All patents, patent applications (published or unpublished), and other publications cited herein are incorporated by reference in their entireties. If a definition set forth in this section is contrary to or otherwise inconsistent with a definition set forth in the patents, applications, published applications and other publications that are incorporated herein by reference, the definition set forth in this section prevails over the definition that is incorporated herein by reference.

Viruses described herein include viruses that can trigger an inflammatory response, especially an excessive/severe inflammatory response (inflammatory factor storm) in an infected organism, including but not limited to Coronaviridae (e.g., coronaviruses, including COVID-19, SARS or MERS virus); Orthomyxoviridae (e.g., influenza viruses, such as Influenza A Virus); Other viruses of the minus-strand RNA virus order (e.g., Ebola virus, Lassa virus, Marburg virus, Crimean-Congo hemorrhagic fever virus); Retroviridae (e.g., human immunodeficiency viruses, such as HIV-1 (also referred to as HTLV-III, LAV or HTLV-III/LAV or HIV-III); and other isolates, such as HIV-LP; Picornaviridae (e.g., polio viruses, hepatitis A virus; enteroviruses, human coxsackieviruses, rhinoviruses, echoviruses); Calciviridae (e.g., strains that cause gastroenteritis); Togaviridae (e.g., equine encephalitis virus, rubella virus); Flaviridae (e.g., Zika virus, West Nile virus, Dengue fever virus, Hanta virus and the like); Rhabdoviridae (e.g., vesicular stomatitis virus, rabies virus); Filoviridae (e.g., Ebola virus); Paramyxoviridae (e.g., parainfluenza virus, mumps virus, measles virus, respiratory syncytial virus); Bimaviridae (e.g., bunga virus, phleboviruses and Nairo virus); Nephriviridae (hemorrhagic fever virus); Reoviridae (e.g., rotavirus); Bimaviridae; Hepeviridae (Hepatitis B virus); Parvoviridae (parvovirus); Papillomaviridae (papilloma virus, polyoma virus); Adenoviridae (most adenoviruses); Herpesviridae (herpes simplex virus (HSV) 1 and 2, varicella zoster virus, cytomegalovirus (CMV), herpes virus); Poxviridae (variola virus, vaccinia virus, pox virus); and Iridoviridae (e.g., African swine fever virus); Hepatitis C virus; and unclassified viruses (e.g., the agent of delta hepatitis (which is considered to be a defective satellite of hepatitis B virus); Norwalk and related viruses, and astroviruses).

As used herein, the term "biological sample" refers to a sample containing cell secretions derived from an individual infected with virus, including but not limited to blood, plasma, serum, cerebrospinal fluid, alveolar lavage fluid, urine, sweat, feces and the like.

As used herein, the term "individual" is not limited to a specific species or sample type. For example, the term "individual" can refer to a patient, and usually to a human patient. However, the term is not limited to human and therefore includes a variety of non-human animals or mammalian species. The term "mammal" refers to any mammalian species. Generally, the term "mammal" as used herein refers to a human, a human subject, or a human patient. The term "mammal" also refers to any non-human mammal species, such as experimental, companion, or economic non-human mammals. Exemplary non-human mammals include mice, rats, rabbits, cats, dogs, pigs, cows, sheep, goats, horses, monkeys, gorillas and chimpanzees.

As used herein, the term "therapeutically effective amount" or "effective amount" refers to an amount of a therapeutic agent that when administered alone or in combination with an additional therapeutic agent to a cell, tissue, or subject is effective to prevent or ameliorate a disease or disorder associated with abnormally high level of IFP35 and/or NMI in a subject. A therapeutically effective dose further refers to that amount of the therapeutic agent sufficient to result in amelioration of symptoms, e.g., treatment, healing, prevention or amelioration of the relevant medical condition, or an increase in rate of treatment, healing, prevention or amelioration of such conditions. When applied to an individual active ingredient administered alone, a therapeutically effective dose refers to that ingredient alone. When applied to a combination, a therapeutically effective dose refers to combined amounts of the active ingredients that result in the therapeutic effect, whether administered in combination, serially or simultaneously. In some embodiment, "an effective amount of a compound for treating a particular disease" is an amount that is sufficient to ameliorate, or in some manner reduce the symptoms associated with the disease. Such amount may be administered as a single dosage or may be administered according to a regimen, whereby it is effective. The amount may cure the disease but, typically, is administered in order to ameliorate the symptoms of the disease. Repeated administration may be required to achieve the desired amelioration of symptoms.

As used herein, the term "pharmaceutically acceptable carrier" is intended to include any and all solvents, dispersion media, coatings, isotonic and absorption delaying agents, and the like, compatible with pharmaceutical administration. The use of such media and agents for pharmaceutically active substances is well known in the art. See, e.g., Remington. The Science and Practice of Pharmacy. 20th ed., (Lippincott, Williams & Wilkins 2003). Except insofar as any conventional media or agent is incompatible with the active compound, such use in the compositions is contemplated.

As used herein, the term "inhibitor" refers to any molecules that can negatively affect the biological effects of IFP35 and/or NMI, for example, by interfering with the interaction of IFP35 and/or NMI with another molecule (for example, a substrate of IFP35 and/or NMI), or by reducing the level of the IFP35 and/or NMI protein, for example, by reducing the expression of genes encoding the IFP35 and/or NMI protein. The inhibitor can be a "direct inhibitor" that interacts with IFP35 and/or NMI or the nucleic acids encoding the IFP35 and/or NMI, or an "indirect inhibitor" that does not interact with IFP35 and/or NMI or the nucleic acids encoding the IFP35 and/or NMI but interacts with the upstream or downstream substances of IFP35 and/or NMI in the regulatory pathway. The inhibitor may be a specific inhibitor. Those skilled in the art can understand that although a specific inhibitor is ideal, multifunctional or universal protein inhibitors are also appropriate according to a specific condition. As discussed above, the inhibitor can be an expression inhibitor, a functional inhibitor, or an inhibitor that can inhibit both expression and function for example of IFP35 and/or NMI. In some embodiments, the inhibitor can act on the transcription and/or translation level of IFP35 and/or NMI to reduce an amount of the produced functional IFP35 and/or NMI. In some related embodiments, the inhibitor includes, but is not limited to, dsRNA, microRNA, siRNA, shRNA, antisense RNA or ribozymes. It is well-known for those skilled in the art to employ RNA interference/silencing technology, antisense nucleic acid technology or ribozyme technology to reduce the expression level of a target protein. It can also be readily implemented by those skilled in the art to design, prepare and test a suitable dsRNA, microRNA, siRNA, shRNA, antisense RNA or ribozyme molecule according to the sequence structure of a target protein (for example, IFP35 and/or NMI). In some embodiments, the inhibitor is capable of inhibiting the function/activity of IFP35 and/or NMI. In some related embodiments, the inhibitor includes, but is not limited to, an antibody or antigen-binding fragments thereof against IFP35 and/or NMI, and a small molecule compound. The antibody that can be used in the present application can include a polyclonal antibody or a monoclonal antibody. In addition, the antibody may be an entire immunoglobulin from natural or recombinant source. Antibodies can exist in various forms, including, for example, as whole antibodies, or as antibody fragments, or their other immunologically active fragments such as complementarity determining regions. Similarly, antibodies can exist as antibody fragments with functional antigen-binding domains, namely heavy and light chain variable domains. Similarly, antibody fragments can be selected from but not limited to the following forms: Fv, Fab, F(ab)2, scFv (single-chain Fv), dAb (single domain antibody), bispecific antibody, diabody, and three chain antibody.

In another aspect, provided herein is a method for diagnosing or evaluating the degree of an inflammatory response in an individual infected with a virus, comprising determining an amount of interferon-induced protein 35 kD (IFP35) and/or N-Myc interacting protein (NMI) in a biological sample from the individual.

In some embodiments, the method is used to diagnose or assist in diagnosing severe or critical diseased individual.

In some embodiments, the virus is a Coronaviridae virus, such as novel coronavirus (COVID-19), SARS virus, MERS virus; or a Orthomyxoviridae virus, for example Influenza Virus (such as Influenza A Virus).

In some embodiments, determining the amount of IFP35 and/or NMI in the biological sample comprises determining an amount of IFP35 and/or NMI protein in the biological sample, or determining an expression level of IFP35 and/or NMI nucleic acid in the biological sample, such as an amount of mRNA.

In some embodiments, the individual is a mammal, such as human.

In some embodiments, the biological sample is blood, plasma, serum, cerebrospinal fluid, or alveolar lavage fluid.

In another aspect, provided herein is a kit for diagnosing or evaluating the degree of an inflammatory response in an individual infected with a virus, comprising a reagent for determining an amount of interferon-induced protein 35 kD (IFP35) and/or N-Myc interacting protein (NMI) in a biological sample from the individual.

In some embodiments, the kit is used for diagnosing or assisting in diagnosing a severe or critical diseased individual.

In some embodiments, the virus is a Coronaviridae virus, such as novel coronavirus (COVID-19), SARS virus, MERS virus; or a Orthomyxoviridae virus, for example Influenza Virus (such as Influenza A Virus).

In some embodiments, determining the amount of IFP35 and/or NMI in the biological sample comprises determining an amount of IFP35 and/or NMI protein in the biological sample, and wherein the reagent includes for example an antibody specifically binding to IFP35 and/or NMI.

In some embodiments, determining the amount of IFP35 and/or NMI in the biological sample comprises determining an expression level of IFP35 and/or NMI nucleic acid in the biological sample, such as an amount of mRNA, and wherein the reagent includes for example primers for specific amplification of a cDNA sequence of IFP35 and/or NMI.

In some embodiments, the individual is a mammal, such as human.

In some embodiments, the reagent comprises a reagent for processing the biological sample to extract a protein or nucleic acid substance, and wherein the biological sample is for example blood, plasma, serum, cerebrospinal fluid or alveolar lavage fluid.

In another aspect, provided herein is a method for treating or alleviating an inflammatory response in an individual infected with a virus, comprising administering to the individual a therapeutically effective amount of an inhibitor of interferon-induced protein 35 kD (IFP35) and/or of N-Myc interacting protein (NMI).

In some embodiments, the individual is a severe or critical diseased individual.

In some embodiments, the virus is a Coronaviridae virus, such as novel coronavirus (COVID-19), SARS virus, MERS virus; or a Orthomyxoviridae virus, for example Influenza Virus (such as Influenza A Virus).

In some embodiments, the inhibitor of IFP35 and/or NMI is a functional inhibitor or an expression inhibitor of IFP35 and/or NMI.

In some embodiments, the functional inhibitor of IFP35 and/or NMI is an antibody or an antigen-binding fragment thereof for IFP35 and/or NMI, or a small molecule compound.

In some embodiments, the expression inhibitor of IFP35 and/or NMI is an inhibitor being capable of acting on the transcription and/or translation level of IFP35 and/or NMI to reduce an amount of the produced functional IFP35 and/or NMI, such as dsRNA, microRNA, siRNA, shRNA, antisense RNA or ribozyme.

In some embodiments, the individual is a mammal, such as human.

In another aspect, provided herein is a pharmaceutical composition for treating or alleviating an inflammatory response in an individual infected with a virus, comprising a therapeutically effective amount of an inhibitor of interferon-induced protein 35 kD (IFP35) and/or of N-Myc interacting protein (NMI), and a pharmaceutically acceptable carrier.

In some embodiments, the individual is a severe or critical diseased individual.

In some embodiments, the virus is a Coronaviridae virus, such as novel coronavirus (COVID-19), SARS virus, MERS virus; or a Orthomyxoviridae virus, for example Influenza Virus (such as Influenza A Virus).

In some embodiments, the inhibitor of IFP35 and/or NMI is a functional inhibitor or an expression inhibitor of IFP35 and/or NMI.

In some embodiments, the functional inhibitor of IFP35 and/or NMI is an antibody or an antigen-binding fragment thereof for IFP35 and/or NMI, or a small molecule compound.

In some embodiments, the expression inhibitor of IFP35 and/or NMI is an inhibitor being capable of acting on the transcription and/or translation level of IFP35 and/or NMI to reduce an amount of the produced functional IFP35 and/or NMI, such as dsRNA, microRNA, siRNA, shRNA, antisense RNA or ribozyme.

In some embodiments, the individual is a mammal, such as human.

It should be understood that the above detailed description is only to enable those skilled in the art to understand the

EXAMPLES

The following examples are provided only to illustrate some embodiments of the present application, without purpose or nature of any limitations.

Example 1: Treatment of MS in Mice with an Antibody

Figure 7:
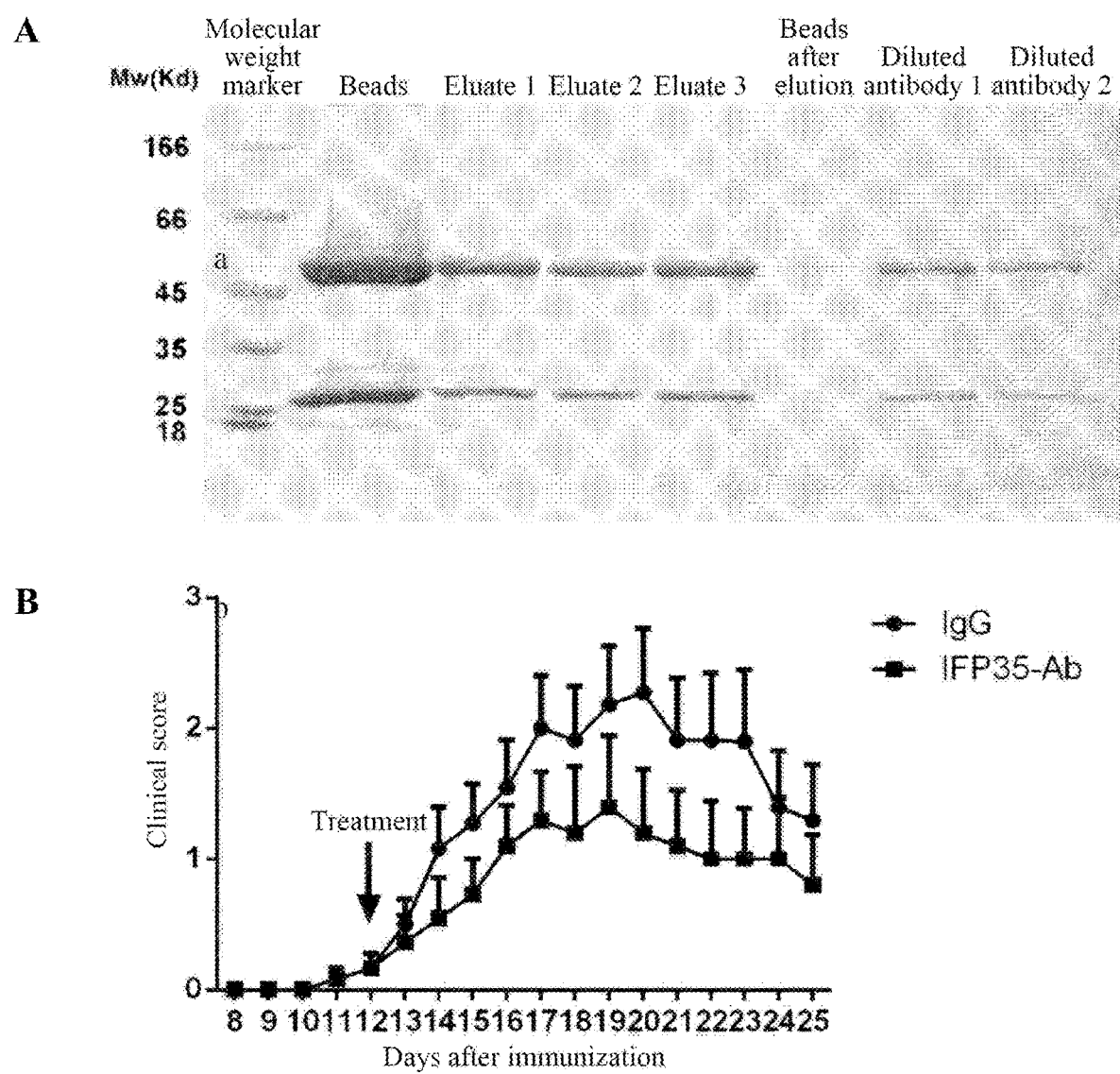
FIGS. 7A-7B show that an antibody for IFP35 can alleviate the symptoms of MS in mice. (A) Purified antibody for IFP35, where the band of 55 kD represents the heavy chain of the antibody, and the band of 25 kD represents the light chain of the antibody; (B) Intravenous injection of 100 μg (5 mg/kg) of IFP35 antibody for 10 days (Day 12-22) can alleviate the symptoms of MS in mice.

A mouse MS model was established, and then treated with an antibody for IFP35. The result is shown in FIGS. 7A-7B. After treatment with the antibody for IFP35, the symptoms of MS in mice were significantly ameliorated.

Example 2: Treatment of MS in Mice with Nucleic Acid Drugs

The NMI gene was knocked out in mice. The symptoms of MS in mice with the knockout of NMI gene were then observed. The results are shown in FIGS. 6A-6E and 8A-8B. After knocking out NMI gene, the symptoms of MS in mice were alleviated.

Example 3: Detection of MS in Mice with IFP35/NMI as Markers in the Serum or Body Fluid (Such as Cerebrospinal Fluid and the Like)

Cell experiments showed that compared with normal cells, the expression level of IFP35/NMI in the macrophages induced by LPS, MOG and H37Ra (similar to MS animal models) increased significantly, and IFP35/NMI was secreted to the outside the cell. Therefore, the increased amount of IFP35/NMI can be detected in the serum. At the same time, it was found that the expression levels of other inflammatory cytokines and their amounts in serum were also increased, for example the mRNA expression levels of the markers of M1 type microglia TNF, iNOS, and IL1β were increased under the stimulation of LPS and NMI along with iNOS, HMGB1, TNF, iNOS and IL1β, as shown in FIGS. 1, 2A-2B and 3A-3B.

Figure 4:
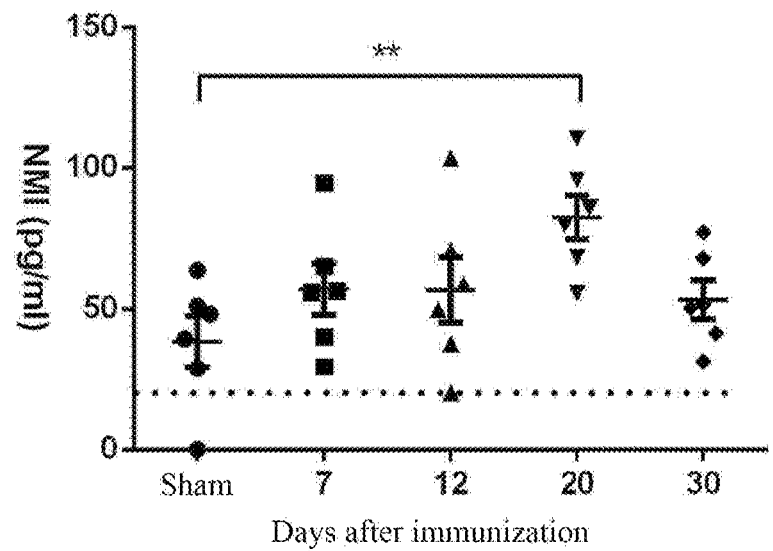
FIG. 4 shows the secretory expression of NMI in mice at different times after EAE modeling. The expression of NMI in sham treated mice and in EAE mice at the pre-onset phase (7 days), initial onset phase (12 days), peak onset phase (20 days) and disease remission phase (30 days) were detected. It shows that the expression level of NMI in each phase of the onset of MS in mice is closely related to the degree of MS.
Figure 5:
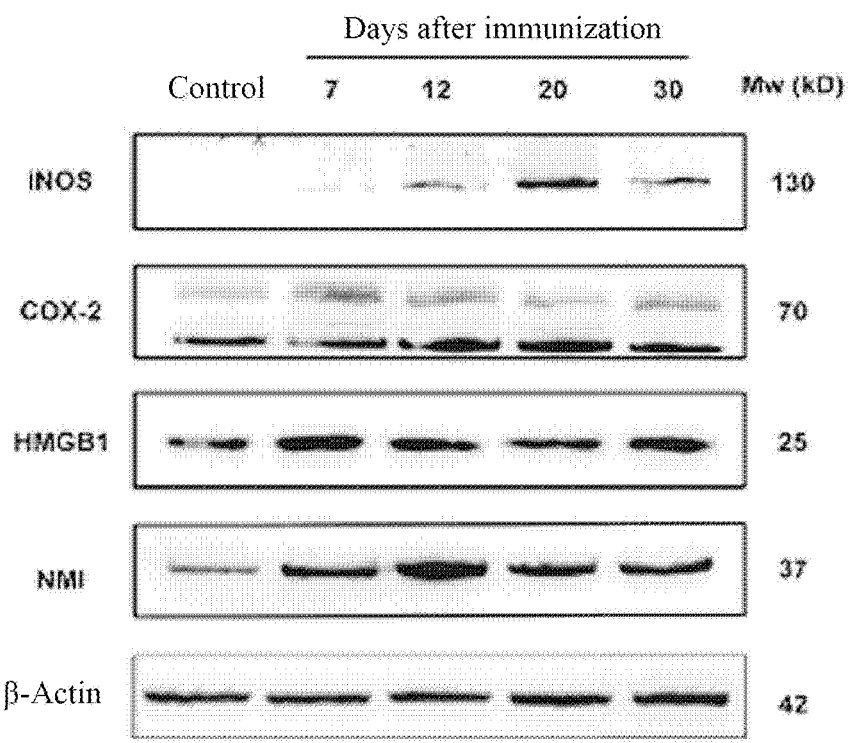
FIG. 5 shows the expressions of NMI and other inflammatory factors in mouse spinal cord tissue after EAE modeling. The expression levels of NMI and the main inflammatory factors iNOS, COX2, HMGB1 in the mouse spinal cord tissue at different times after EAE modeling were detected. INOS was almost undetectable in the spinal cord of normal mice. As MS reached the peak phase, the expression level of iNOS reaches the highest level. The expression levels of COX2 and HMGB1 increased with the onset of MS. The normal expression level of NMI was low, and the expression level of NMI was highest with the onset of MS. It shows that the expression levels of NMI and other inflammatory factors increase with the onset of MS, and NMI is one of the factors that are up-regulated at an early stage.
Figure 6:
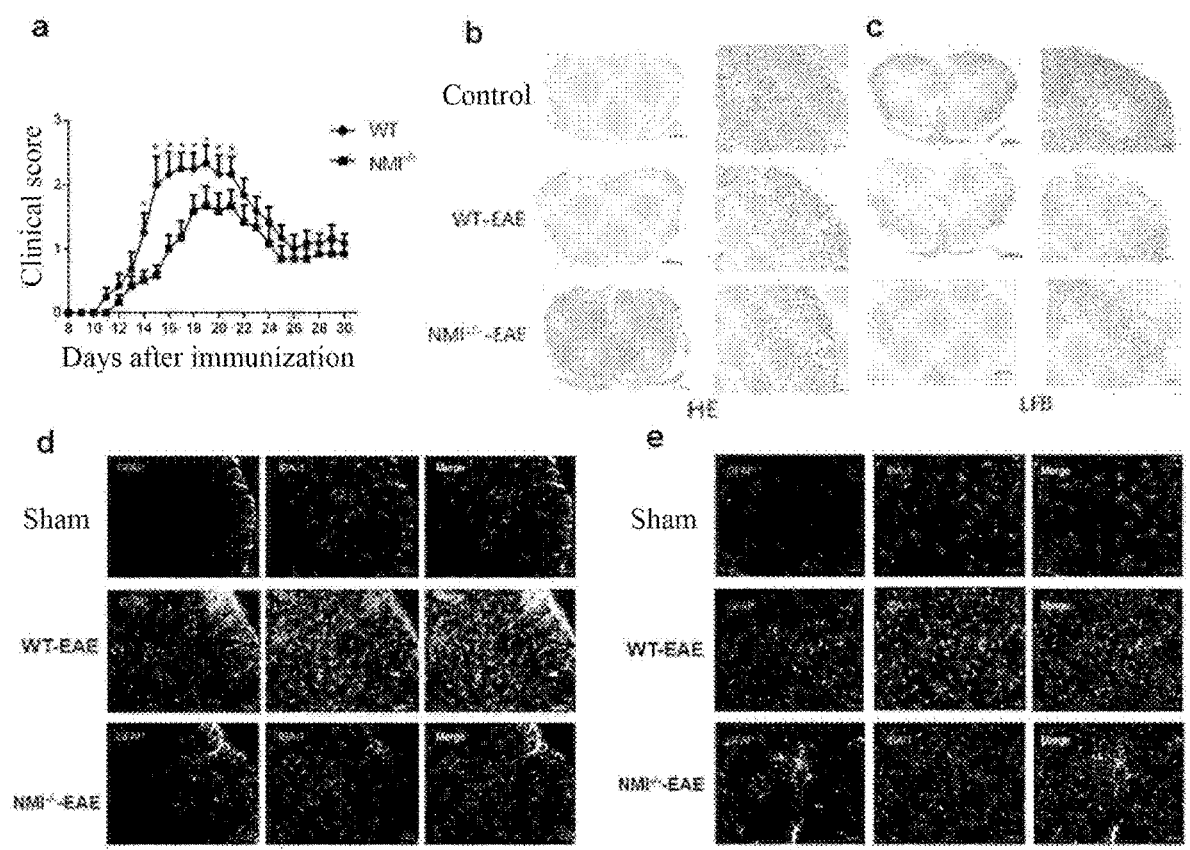
FIGS. 6A-6E showthat the knockout of NMI gene ameliorates the clinical symptoms of MS in mice. (A) the knockout of NMI gene decreases the MS clinical score of the mice; (B) the knockout of NMI gene reduces spinal cord inflammatory cell infiltration; (C) the knockout of NMI gene ameliorates spinal cord demyelination symptoms in mice; the knockout of NMI gene reduces the activation of spinal cord astrocytes and microglia in white matter (D) and gray matter (E) in mice. It shows that NMI can promote neuroinflammation and aggravate the clinical symptoms of MS. After knocking out NMI, the symptoms of MS in mice are alleviated.

MS animal model experiments showed (see experimental methods) that compared with normal mice, the expression level of IFP35/NMI in the MS mouse model was significantly increased, and IFP35/NMI was secreted into the serum. The high expression level and release of IFP35/NMI, as an inflammatory factor, were consistent with those of other MS characteristic inflammatory factors such as TNF, iNOS, and IL1β in the MS mouse model. It indicates that IFP35/NMI may be used as a characteristic biomarker and detection indicator of MS in serum or body fluid, as shown in FIGS. 4 and 5. The results were consistent with the results of LPS-induced animal models and influenza virus-induced animal models. These acute and chronic inflammatory diseases all lead to the secretion of IFP35 and NMI, as shown in FIGS. 9A-9D and 10A-10D. But PCT exhibited differently in this regard. The amount of PCT in serum generally does not increase in the case of virus infection.

Therefore, it is possible to detect whether the expression level of IFP35/NMI in the spinal cord tissue of mice is significantly increased, or whether IFP35/NMI is secreted into the blood or body fluids (such as cerebrospinal fluid) of the mice and the correlation of the increased amount of IFP35/NMI secreted into the blood or body fluids to assist in diagnosing whether the mice may have MS and determining the inflammatory factors that cause the disease. If the expression level of IFP35/NMI in the tissue of mice is abnormally increased, IFP35/NMI is abnormally secreted into the blood or body fluid of mice (such as cerebrospinal fluid), or the increased expression level of IFP35/NMI is consistent with the expression levels of other inflammatory factors (such as interferon, TNF, IL1, IL6 and the like) and their secretion into blood in mice, which causes obvious external symptoms such as changes in the gait and paralysis of the limbs in mice, the mice can be substantially diagnosed with MS.

Experimental Methods

BMDM Culture:

The mice were sacrificed by cervical dislocation. Two hind legs of the mice were taken and soaked in 70% ethanol for 1 minute, and the muscles on the hind leg bones were removed as much as possible. The PBS containing penicillin and streptomycin was sucked into the syringe to flush the bone marrow cavity. After centrifuging at 400 g for 10 minutes, the supernatant was removed. 1 ml red blood cell lysis buffer was used to lyse the red blood cells for 30 seconds, and then 10 ml PBS was added to neutralize the red blood cell lysis buffer. After centrifuging at 400 g for 10 minutes, the cells were cultured in an incubator at 37° C., 5% $CO_2$ with DMEM (Gibico) complete culture medium containing 10% FBS (Gibco), 1% penicillin and streptomycin, 1% L-glutamine and MCSF (peprotech) at a final concentration of 20 ng/ml.

Raw264.7 Cell Culture:

The cells were cultured in an incubator at 37° C., 5% $CO_2$ with DMEM (Gibico) complete culture medium containing 10% FBS (Gibco), 1% penicillin and streptomycin and 1% L-glutamine.

Thp1 Cell Culture:

The cells were cultured in an incubator at 37° C., 5% $CO_2$ with 1640 (Gibico) complete culture medium containing 10% FBS (Gibco), 1% penicillin and streptomycin and 1% L-glutamine.

BV2 Cell Culture:

The cells were cultured in an incubator at 37° C., 5% $CO_2$ with DMEM (Gibico) complete culture medium containing 10% FBS (Gibco), 1% penicillin and streptomycin and 1% L-glutamine.

Stimulation of Cells with MOG and H37Ra:

MOG and H37Ra were added to the above-mentioned cells at a final concentration of 100 ng/ml to stimulate for 8 h.

Stimulation of BV2 Cells with mNMI:

The mouse recombinant protein mNMI was expressed and used to stimulate mouse primary microglia in vitro. Cells were adjusted to the concentration of $2\times10^6$ and incubated with 5 µg/ml mNMI for 6 h, and then the polarization markers of macrophages were detected by QPCR.

Total RNA Extraction from Cells:

RNA extraction kit (Cat No. CW 0597, CoWin Biosciences) was used for total RNA extraction for BMDM cells. Trizol (invitrogen) was used for total RNA extraction for BV2 cells.

Reverse Transcription of mRNA into cDNA:

PrimeScript™ II 1st Strand cDNA Synthesis Kit (Cat. No. 6210A) and SYBR® Premix Ex Taq™ (Tli RNaseH Plus), ROX plus Q-PCR kit (Cat. NO. RR42LR) were all purchased from TAKARA Bio company.

Establishment of MS Mouse Model (EAE):

The mice selected for the experiments were female C57BL/6 mice aged 8-12 weeks, which were purchased from Vital River Laboratory Animal Technology Co., Ltd. The oligodendrocyte protein MOG35-55 and Freund's complete adjuvant CFA were used for emulsification. Each mouse was injected subcutaneously with 0.2 mg MOG35-55 and 0.2 mg CFA, combined with pertussis toxin PTX. Each mouse was injected intraperitoneally with 500 ng PTX, and the injection was repeated once after 48 h. The sham treatment group used the same treatment except that PBS was given instead of MOG35-55. The disease and life status of the mice were observed and recorded every day. The mice were scored after the onset of the disease, and the scoring standards were as follows: 0, no clinical symptoms; 1. paralysis of the tail of the mouse; 2. paralysis of one hind limb or weakness of both hind limbs of the mouse; 3. paralysis of both hind limbs of the mouse; 4. paralysis of both hind limbs and the affected forelimbs of the mouse; 5. the mouse is dying. The diseased mice were scored and evaluated according to the scoring standards.

Extraction of Whole Proteins from Mouse Spinal Cord Tissue:

100 mg of perfused mouse spinal cord tissue was obtained, and lysed for 30 minutes on ice after adding RIPA (Proteinase inhibitor cocktail, Roche). The lysate was centrifuged at 12,000 rpm and 4° C. for 10 minutes, and 5×SDS-PAGE loading buffer was added to the pellet and kept at 95° C. for 5 minutes.

Detection of Secreted NMI/IFP35 in the Serum of Mouse Infected with Influenza Virus C57BL/6 WT, IF135$^{-/-}$ and NMI$^{-/-}$ mice were infected with A/PR8 strain at a dose of 300 pfu as the challenge experimental groups, and wild-type C57BL/6 mice were inoculated with the same dose of PBS as a negative control group. Whether the protein levels of IFP35 and NMI in the serum of mice change was detected on day 3 post the virus infection, and the amounts of TNF and IL6 in the serum were detected.

Preparation of a Neutralizing Antibody Against IFP35:

Mice were injected intraperitoneally with monoclonal hybridoma cells for IFP35. The mouse ascites was collected 7-10 days after injection.

The antibodies in the ascites were purified by Protein G Agrose beads (GE):

(1) adding 1 ml Protein G Agrose beads slurry to the packed Column for protein purification;
(2) washing the matrix in the purification column with 10 ml phosphate buffer; (3) adding 1 ml ascites to 5 ml phosphate buffer, and then adding the mixture to the purification column, which was incubated at 4° C. for 2 hours;
(4) washing: washing the column with 20 ml phosphate buffer;
(5) eluting: eluting the antibody with an appropriate amount of 0.1M Glycine (pH=2.5-3.0) buffer, and the elution solution was neutralized with 1M Tris-HCl buffer (pH=10.0) which was added in advance to the elution tube;

The antibody was concentrated with an ultrafiltration tube, and the concentration of the antibody was determined.

Treatment of Mice with MS Using an Antibody Against IFP35:

The mouse EAE models were established and divided into the treatment group with the antibody against IFP35 and the control group with an IgG antibody. The antibodies were administered to the mice from 12 days after modeling. Each mouse was injected intravenously with 100 µg (5 mg/kg)

antibody every day for 10 consecutive days. Clinical symptoms of the two groups of mice were compared.

ELISA Assay:
(1) The plates were taken out and returned to room temperature. The diluted standards and samples were added to the plates with 100 ml per well and incubated for 2 h at room temperature. Standards and samples were diluted with 1% BSA in PBST (0.05% Tween-20).
(2) The wells were washed with PBST (0.05% Tween-20) for 3 times and deionized water for 2 times.
(3) The detection antibodies were added to the wells with 100 ml per well and incubated for 2 h at room temperature. The detection antibodies were diluted with 1% BSA in PBST (0.05% Tween-20).
(4) The substrate was added to the wells for color development, with 100 µl TMB per well. The plates were shaken on a shaker for decolorizing for 10-20 minutes in the dark.
(5) 50 ml 2 mol/L $H_2SO_4$ was added to each well to stop the reaction.

The OD values were measured at 450 nm using a microplate reader.

A method for obtaining the gene knock-out mice: 8-12 weeks old C57BL/6 mice were used. All mice used were sacrificed by cervical dislocation. The wild-type C57BL/6 mice (000664) were purchased from Vital River Laboratory Animal Technology Co., Ltd. CRISPR-Cas9 technology was used to generate NMI and Ifp35 gene knock-out mice. The fertilized eggs were collected from the fallopian tubes of the mice having superovulation. The female C57BL/6 mice were mated with the male C57BL/6 mice. Cas9 mRNA (150 ng ml-1) was mixed with sgRNA (100 ng ml-1) produced by transcription and the mixture was microinjected into the cells. The cytoplasm of the fertilized egg has a recognized pronucleus in M2 medium (Sigma, M7167-100ML). The sgRNA sequence of NMI is 5'-AAAACAAAGAACTAGACGAGG-3' (SEQ ID NO:26), and the sgRNA sequence of IFP35 is 5'-CAGCTCAAAAGGGAGCGCACAGG-3' (SEQ ID NO:27). The frameshift mutation of NMI and Ifp35 genes produced by CRISPR technology resulted in the failure to produce NMI and IFP35 proteins. A corresponding sgRNA was injected into about 100-250 fertilized eggs, and then the fertilized eggs were transferred into the uteruses of surrogate ICR female mice to obtain F1 generation mice.

Results:
1. MOG and H37Ra Induced NMI Release from Mouse Macrophages.

Figure 1:
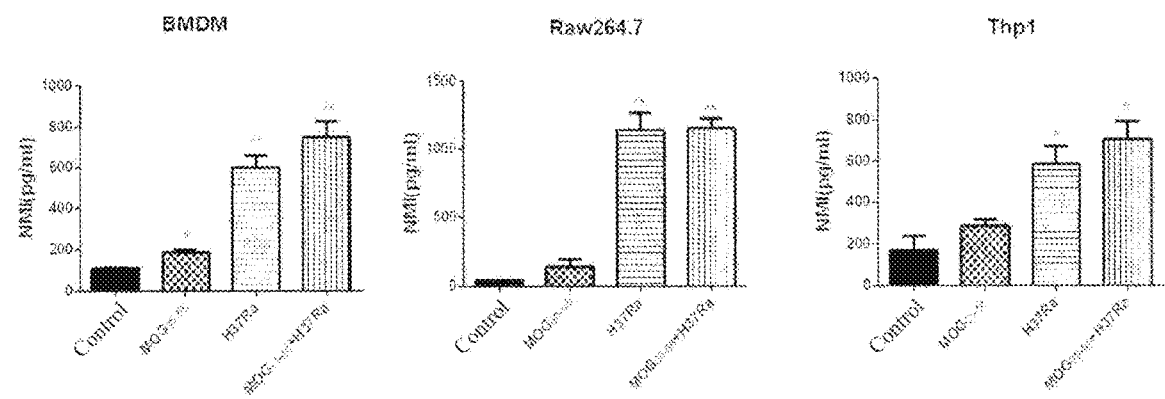
FIG. 1 shows MOG and H37Ra induced NMI release from mouse macrophages. In the detection of macrophages (three macrophage cell lines of BMDM, Raw264.7 and Thp1) stimulated by MOG35-55 and H37Ra in vitro, the cells were adjusted to $10^6$ cells per milliliter, and incubated with 50 ng/ml MOG and/or 100 ng/ml H37Ra for 8 h, and then the secretion of NMI in the cell supernatant was detected. It shows that the combination of MOG35-55 and H37Ra can induce the secretion of NMI from mouse macrophages, and H37Ra plays a major role.

A method involved in FIG. 1 comprises: adjusting the concentration of BMDM, RAW267.4 and Thp1 cells to $10^6$ cells per milliliter, inducing mouse macrophages with $MOG_{35-55}$ (50 ng/ml) and H37Ra (100 ng/ml) and incubating them for 8 h, and then detecting the amount of NMI secreted into the cell supernatant. The error bars in FIG. 1 represent three repeated experiments ±s.e.m. The significant differences were detected by unpaired t-test, with * $P<0.05$, ** $P<0.01$.

FIG. 1 shows the following results: $MOG_{35-55}$ and H37Ra are the main reagents used to induce MS in mice. $MOG_{35-55}$ is a surface glycoprotein of oligodendrocytes and was used to cause immune cells to attack self-antigens. H37Ra is an inactivated tuberculosis Bacillus and was used to activate and amplify the immune response. Secretion of NMI in large quantities was detected by stimulating mouse peripheral macrophages with a combination of $MOG_{35-55}$ and H37Ra, in which H37Ra plays a main role. The inducing effect of H37Ra was much stronger than that of $MOG_{35-55}$, indicating that H37Ra activates macrophages and is the main promoter of inflammation. The inducing effect of $MOG_{35-55}$ on macrophages was weaker than that of H37Ra. The combined stimulating effect of $MOG_{35-55}$ and H37Ra was stronger than that of each alone. It shows that agents that induce the onset of MS in mice can induce the release of NMI from macrophages to the outside of the cells. This experiment can prove that in the induced macrophage activation model, the expression level of NMI increases and it is released to the outside of the cells.

2. LPS Induced the Release of NMI from Microglia BV2.

Figure 2:
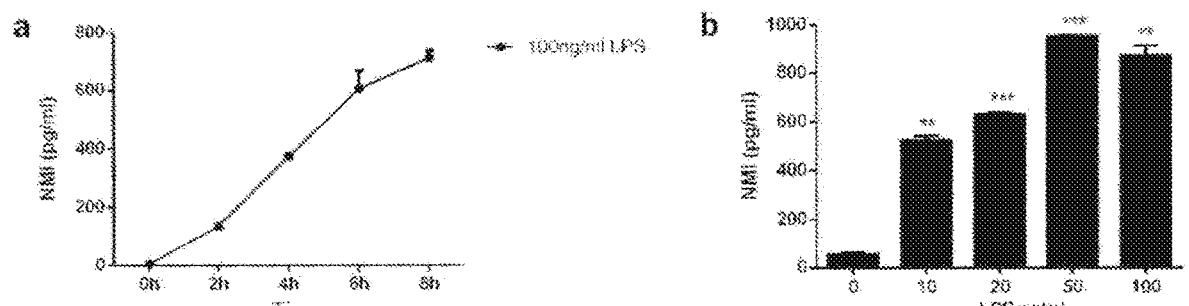
FIGS. 2A-2B show LPS induced NMI release from microglia BV2. (A) BV2 cells were co-cultured with 100 ng/ml LPS to detect the secretory expression of NMI at 0, 2, 4, 6, and 8 h; (B) The expression of NMI in the cell supernatant was detected after BV2 cells were stimulated by 0, 10, 20, 50, 100 ng/ml LPS for 8 h. It shows that NMI can also be secreted when the central nervous system is inflamed, and microglia is activated.

A method involved in FIGS. 2A-2B comprise: a. using 100 ng/ml LPS to induce microglia BV2, and detecting the amounts of NMI secreted into the supernatant at 0, 2, 4, 6, and 8 hours; b. using different concentrations of LPS (0, 10, 20, 50 and 100 ng/ml) to stimulate BV2 cells for 8 hours, and detecting the amounts of NMI in the supernatant. The error bars in FIGS. 2A-2B represent three repeated experiments ±s.e.m. The significant differences were detected by unpaired t-test, with * $P<0.05$,  $P<0.01$ and  * $P<0.001$.

FIGS. 2A-2B show the following results: microglia are the main immune cells of the central nervous system and are involved in the occurrence and development of central nervous system inflammatory diseases including MS. LPS (lipopolysaccharide or endotoxin) can induce an activation of microglia. Experimental results show that there was a large amount of NMI secretion after the activation of microglia induced by LPS, and the amount of secretion was positively correlated with the time and strength of LPS stimulation, indicating that NMI may serve as a DAMP that plays a role in the pathogenesis of MS. NMI was released after central macrophages was activated.

3. mNMI Protein Induced M1 Polarization of Mouse Microglia.

Figure 3:
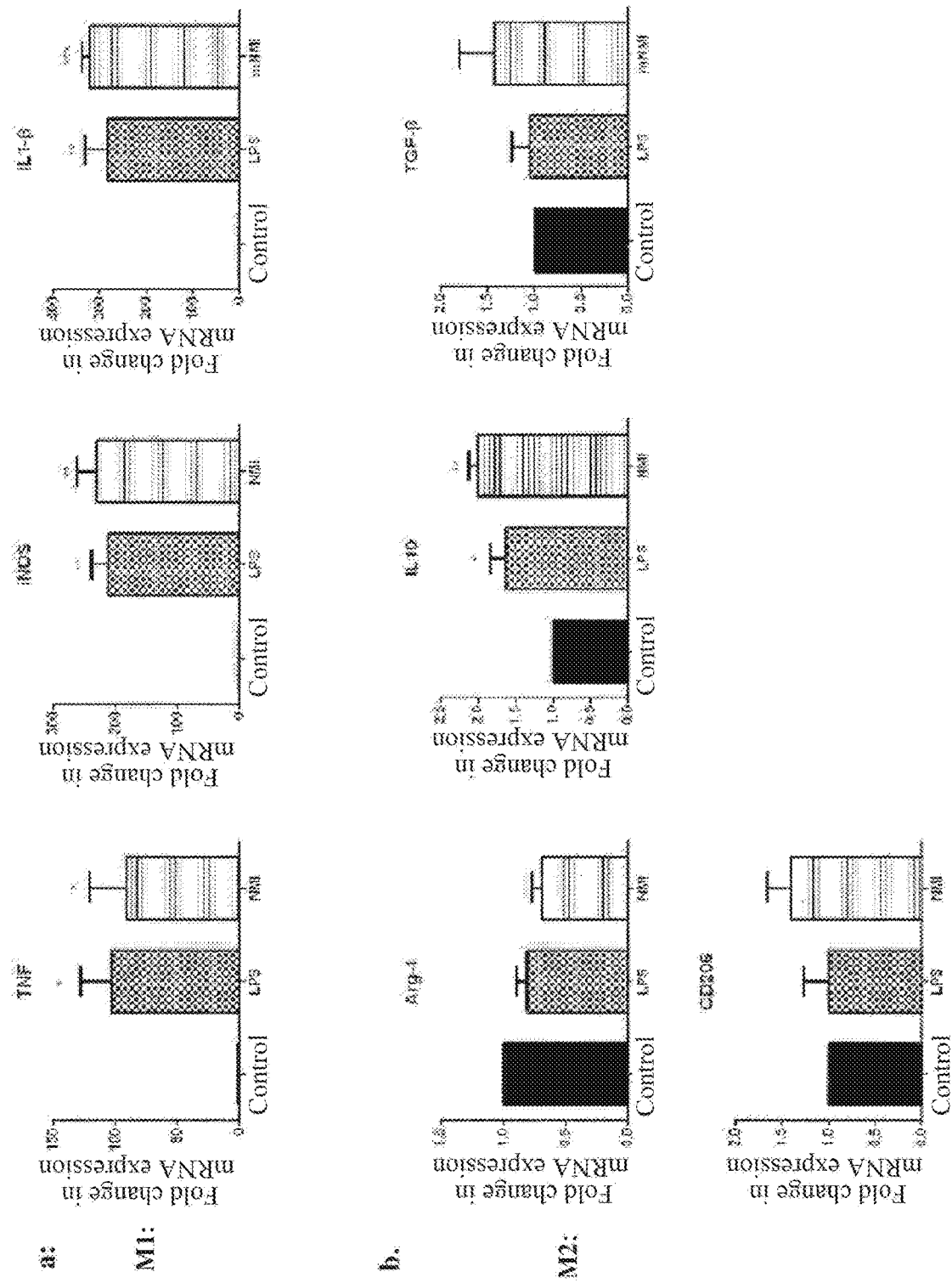
FIGS. 3A-3B showmNMI protein induced M1 type polarization of mouse microglia. (A) The mRNA expressions of TNF, iNOS and IL1β, which are the markers of M1 type microglia, were increased under the stimulation of LPS and NMI; (B) The mRNA expressions of Arg1, IL10, TGF-β and CD206, which were the markers of M2 type microglia, did not change much under the stimulation of LPS and NMI stimulation. It shows that mNMI can induce microglia to polarize toward the pro-inflammatory M1 type microglia.

A method involved in FIGS. 3A-3B comprises: using the purified murine NMI (mNMI) protein (5 µg/ml) to induce mouse microglia for 6 h, and detecting the change of mRNA of the markers TNF, iNOS and IL1β (a) of M1 type microglia and of markers Arg1, IL10, TGF-β, CD206 (b) of M2 type microglia upon LPS or NMI stimulation. The error bars in FIGS. 3A-3B represent three repeated experiments ±s.e.m. The significant differences were detected by unpaired t-test, with * $P<0.05$,  $P<0.01$ and  * $P<0.001$.

FIGS. 3A-3B show the following results: as one of macrophages, microglia can be polarized into M1 type and M2 type microglia. M1 type microglia are mainly involved in the pro-inflammatory response, mediating phagocytosis, secretion of inflammatory factors and tissue damage. M1 type microglia plays a role in promoting the development of MS. M2 type microglia mediates anti-inflammatory response and participates in the process of tissue repair. The experimental results in FIGS. 3A-3B show that mNMI can induce microglia to polarize toward the pro-inflammatory M1 type microglia, and promote an inflammatory response for MS.

4. The Secretory Expression of NMI in Mice at Different Times after EAE Modeling.

FIG. 4 shows the secretory expression of NMI in mice at different times after EAE modeling. The expression of NMI in sham treatment control mice and in EAE mice at the pre-onset phase (7 days), initial onset phase (12 days), peak onset phase (20 days) and disease remission phase (30 days) were detected. It shows that the expression level of NMI in each phase of the onset of MS in mice is closely related to the degree of MS.

5. The Expressions of NMI and Other Inflammatory Factors in Mouse Spinal Cord Tissue after EAE Modeling.

FIG. 5 shows the expression levels of NMI and the main inflammatory factors iNOS, COX2, HMGB1 in the mouse spinal cord tissue at different times after EAE modeling. INOS was almost undetectable in the spinal cord of normal mice. As MS reached the peak phase, the expression level of iNOS reaches the highest level. The expression levels of COX2 and HMGB1 increased with the onset of MS. The normal expression level of NMI was low, and the expression level of NMI was highest with the onset of MS. It shows that the expression levels of NMI and other inflammatory factors increase with the onset of MS, and NMI is one of the factors that are up-regulated at an early stage. As the cerebrospinal fluid of mice was difficult to obtain, the expressions of NMI and other inflammatory factors in the spinal cord tissue were detected.

A summary of the results shown in FIGS. 4 and 5 comprises: the increased amount of the inflammatory factors in blood was one of the characteristics of immune inflammatory diseases. In order to detect whether NMI can be used as a biomarker of MS and its potential function as a biomarker, the present inventors have detected the expression levels of NMI in the blood (a) and the spinal cord tissue (b) of MS mouse model. The results show that the expression level of NMI in each phase of the onset of MS in mice is closely related to the degree of MS. As MS reached the peak phase (20 days), the expression level of NMI reaches the highest level. iNOS was almost undetectable in the spinal cord of normal mice. As MS reached the peak phase, the expression level of iNOS reaches the highest level. The expression levels of COX2 and HMGB1 increased with the onset of MS. The expression level of NMI in the spinal cord of normal mice was lower, and the expression level of NMI was highest with the onset of MS and was down-regulated at the disease remission phase. It shows that the expression levels of NMI and other inflammatory factors increase with the onset of MS, and NMI is one of the factors that are up-regulated at an early stage.

This experiment can prove that in the animal model with MS, the expression level of NMI increased and NMI was released into the blood, but it cannot prove that NMI promotes the release of other inflammatory factors, as NMI and other inflammatory factors iNOS, COX2 and HMGB1 are detected together. There is no sequential and causal relationship between the expressions of NMI and other inflammatory factors.

6. The Knockout of NMI Gene Ameliorated the Clinical Symptoms of MS in Mice.

A method involved in FIGS. 6A-6E comprises: a. establishing the MS animal models of the mice with the knockout of NMI gene (NMI$^{-/-}$) and the wild-type mice (WT), and comparing their clinical symptoms. The scoring standards were as follows: 0. no clinical symptoms; 1. paralysis of the tail of the mouse; 2. paralysis of one hind limb or weakness of both hind limbs of the mouse; 3. paralysis of both hind limbs of the mouse; 4. paralysis of both hind limbs and the affected forelimbs of the mouse; 5. the mouse is dying. The diseased mice were scored and evaluated according to the scoring standards; b. preparing HE pathological sections of spinal cord tissues of NMI$^{-/-}$ and WT mice; c. preparing LFB pathological sections of spinal cord tissues of NMI$^{-/-}$ and WT mice; performing IF experiment, where labelling astrocytes with GFAP, labelling microglia with IBA1, and comparing the activation of astrocytes and microglia in white matter (d) and gray matter (e) of spinal cord tissues in NMI$^{-/-}$ and WT mice.

FIGS. 6A-6E show the following results: establishing the MS animal models of the mice with the knockout of NMI gene (NMI$^{-/-}$) and the wild-type mice (WT), and comparing their clinical symptoms. a. it shows that although the onset of MS in NMI$^{-/-}$ mice and WT mice was basically at the same time, the MS symptoms of NMI$^{-/-}$ mice were subsequently lighter than those of wild-type mice; b. it was observed that the knockout of NMI gene reduced spinal cord inflammatory cell infiltration from the HE pathological staining sections of spinal cord tissues of NMI$^{-/-}$ and WT mice; c. it shows that the spinal cord demyelination symptoms of NMI$^{-/-}$ mice were alleviated from the LFB pathological staining sections of spinal cord tissue. In the IF experiment, the activation of astrocytes and microglia in the white matter (d) and gray matter (e) of the spinal cord of NMI$^{-/-}$ mice was reduced. Based on the above results, NMI can promote neuroinflammation and aggravate the clinical symptoms of MS. After knocking out NMI gene, the symptoms of MS in mice were alleviated.

7. an Antibody for IFP35 Alleviated the Symptoms of MS in Mice.

FIGS. 7A-7A show that the present inventors used neutralizing antibodies against IFP35 to observe whether the symptoms of MS mice can be alleviated as the knockout of NMI gene can significantly alleviate the symptoms of MS mice. a. It shows the use of purified neutralizing antibody against IFP35 according to the present application to perform SDS-PAGE detection. It can be seen that the band of 55 kD represents the heavy chain of the antibody, and the band of 25 kD represents the light chain of the antibody, indicating that the antibody was well purified. b. The purified antibody against IFP35 (100 μg (5 mg/kg) was injected intravenously for 10 days (after 12-22 days) to observe and score the symptoms of MS mice. It can be found that the antibody can significantly alleviate the symptoms of MS in mice. This result indicates that the monoclonal antibodies that inhibit IFP35 family proteins can be used to treat multiple sclerosis (MS). MS modeling of the mouse adopts recognized evaluation standards, and the scoring standards are as follows: 0, no clinical symptoms; 1. paralysis of the tail of the mouse; 2. paralysis of one hind limb or weakness of both hind limbs of the mouse; 3. paralysis of both hind limbs of the mouse; 4. paralysis of both hind limbs and the affected forelimbs of the mouse; 5. the mouse is dying. The diseased mice were scored and evaluated according to the scoring standards.

The corresponding antibody in this experiment is 35NIDmAb with the light chain variable region being set forth in SEQ ID NO: 10, and the heavy chain variable region being set forth in SEQ ID NO: 9.

The heavy chain variable region comprises CDR1, CDR2 and CDR3, with the sequence of CDR1 consisting of amino acid residues at positions 25-32 of SEQ ID NO: 9 (GYTFTNYG), the sequence of CDR2 consisting of amino acid residues at positions 50-57 of SEQ ID NO: 9 (INTYTGEP), and the sequence of CDR3 consisting of amino acid residues at positions 98-106 of SEQ ID NO: 9 (YGYSWAMDY).

The light chain variable region comprises CDR1, CDR2 and CDR3, with the sequence of CDR1 consisting of amino acid residues at positions 26-31 of SEQ ID NO: 10 (SSSVSY), the sequence of CDR2 consisting of amino acid residues at positions 49-51 of SEQ ID NO: 10 (DTS), and the sequence of CDR3 consisting of amino acid residues at positions 90-96 of SEQ ID NO: 10 (WSSNPPI). The amino acid sequences of CDRs are numbered according to Kabat system.

In MS animal models and the experiments of inducing macrophages by MS-inducing reagents such as MOG and the like, it was found that IFP35/NMI was released into the serum. Therefore, this application is to study the relationship between the released IFP35/NMI and a disease. As IFP35/NMI has been previously proved by the present inventors that once being released into the serum, it will play a role of DAMPs. Therefore, this study actually refers to the role of IFP35/NMI released into the serum in the disease, that is, the function of DAMP.

Figure 8:
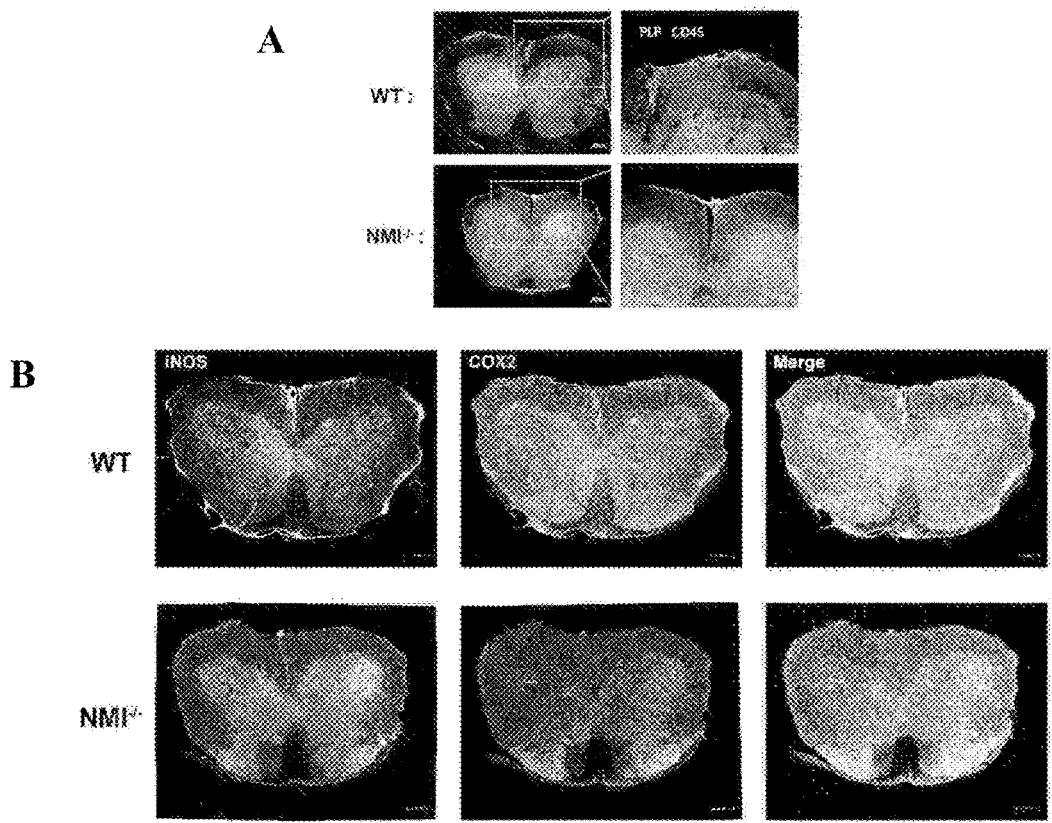
FIGS. 8A-8B show that the knockout of NMI gene can reduce the infiltration of spinal cord leukocytes and inflammation in mice with MS. (A) The knockout of NMI gene reduces the infiltration of CD45-positive leukocytes in spinal cord inflammation; (B) the knockout of NMI gene reduces the expressions of spinal cord inflammatory factors iNOS and COX2.
Figure 9:
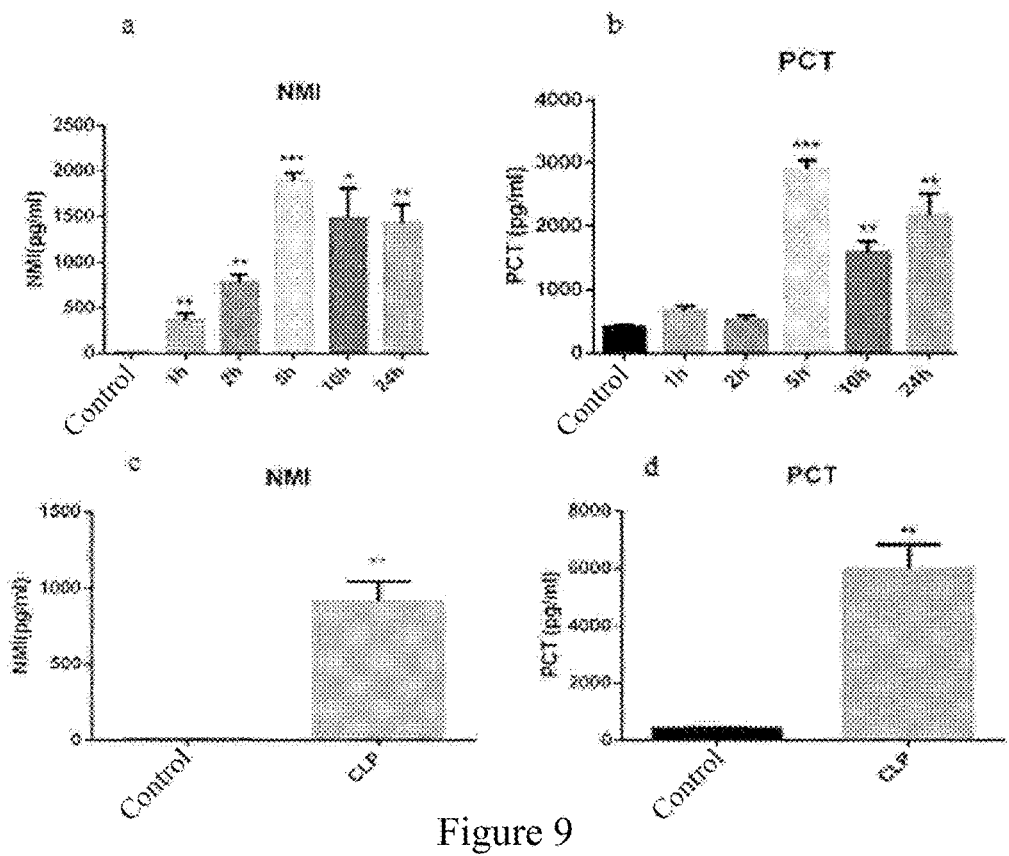
FIGS. 9A-9D showshows comparison of NMI and PCT in mice with LPS-induced inflammation. The changes of NMI (A) and PCT (B) expressions over time after the establishment of LPS-induced inflammation model with LPS (i.p., 10 mg/kg); the amounts of NMI (C) and PCT (D) after 16 h of the establishment of mouse inflammation model with CLP. It shows that NMI can be useful to detect inflammation earlier (1-2 h) compared with PCT, and the background expression of NMI is less than that of PCT, indicating that NMI can be used as a better clinical risk index detection indicator than PCT.
Figure 10:
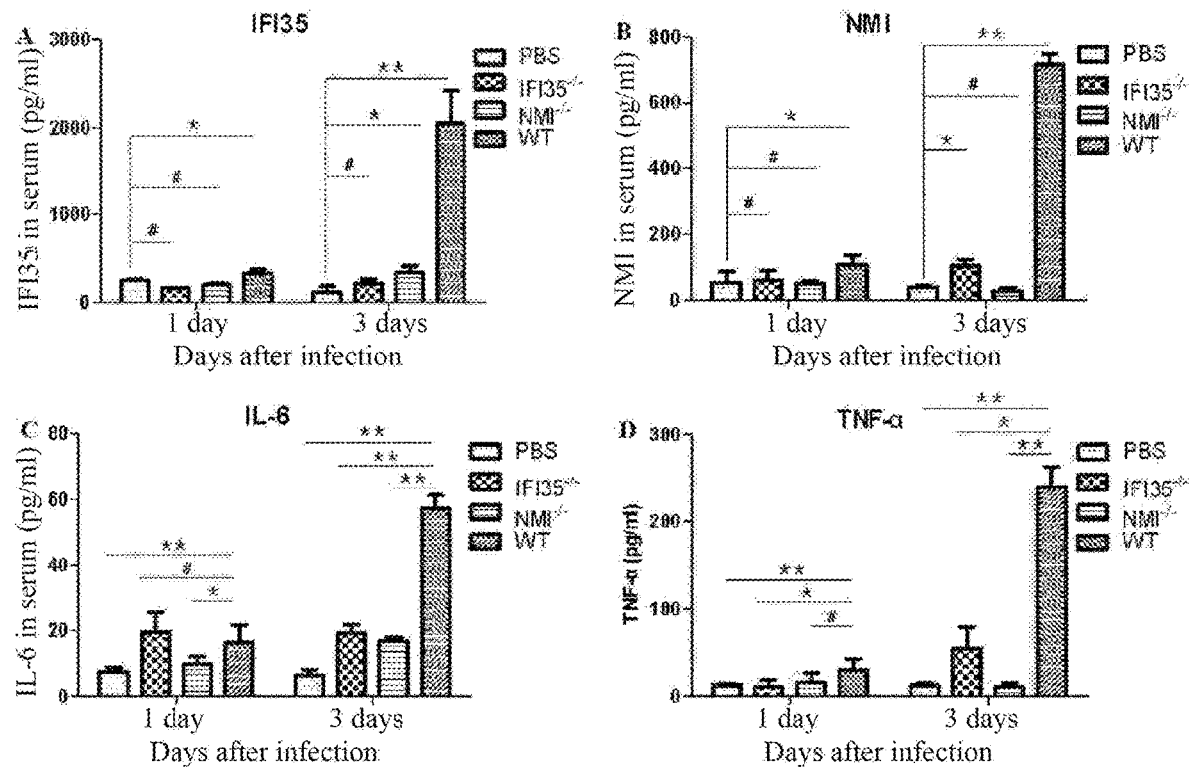
FIGS. 10A-10D show that the secretion of NMI/IFP35 was detected in the serum of mice infected with Influenza A/Puerto Rico/8/1934 (H1N1) virus strain. As shown in panels 10A and 10B, the protein levels of IFP35 (also known as IFI35) and NMI in the serum increased significantly on the third day after virus infection, indicating that influenza virus infection can cause an inflammatory response in wild-type mice. However, the protein levels of IFP35 (also known as IFI35) and NMI in the serum of mice with the knockout of NMI or IFP35 gene did not increase significantly. At the same time, it was found that the protein level of NMI in the serum of mice with the knockout of IFP35 gene (IFI35$^{-/-}$) was also significantly lower than that of WT mice; the protein level of IF135 in the serum of mice with the knockout of NMI gene (NMI$^{-/-}$) was also significantly lower than that of WT mice (Panels A and B). It shows that the secretion between IF135 and NMI is interrelated. At the same time, the present inventors have found that influenza virus infection can increase the secretion of IL-6 and TNF-α in serum (Panels 10C and 10D), while the protein levels of IL-6 and TNF-α in serum of mice with the knockout of NMI or IFP35 gene were significantly lower than those of wild-type mice.

8. The Knockout of NMI Gene Reduced the Infiltration of Spinal Cord Leukocytes and the Inflammation in MS Mice FIGS. 8A-8B show the following results: a. the knockout of NMI gene reduces the infiltration of CD45-positive leukocytes in spinal cord inflammation; b. the knockout of NMI gene reduces the expressions of spinal cord inflammatory factors iNOS and COX2.

9. Comparison of NMI and PCT in Serum of Mice with LPS-Induced Inflammation

FIGS. 9A-9D show the following result: the expressions of NMI (a) and PCT (b) changed over time after the establishment of LPS-induced inflammation model with LPS (ip, 10 mg/kg); similarly, the amounts of NMI (c) and PCT (d) were detected 16 h after the establishment of mouse inflammation model with intestinal ligation CLP. It shows that NMI can be useful to detect inflammation earlier (1-2 h) compared with PCT, and the background expression of NMI is less than that of PCT, indicating that NMI can be used as a better clinical risk index detection indicator than PCT.

10. The Secretion of NMI/IFP35 was Detected in Mouse Serum after the Mice were Infected with Influenza a/Puerto Rico/8/1934 (PR8) Virus Strain.

As a control, the present inventors also compared the secretion of IFP35 and NMI in the case of virus infection. The research method comprises: infecting C57BL/6 WT, IFI35$^{-/-}$ and NMI$^{-/-}$ mice with PR8 strain at a dose of 300 pfu as the challenge experimental groups, and inoculating the wild-type C57BL/6 mice with the same dose of PBS as the negative control group. As shown in panels A and B of FIG. 10, the protein levels of IFP35 (also known as IFI35) and NMI in the serum increased significantly on the third day after virus infection, indicating that influenza virus infection can cause an inflammatory response in wild-type mice. However, the protein levels of IFP35 (also known as IFI35) and NMI in the serum of NMI or IFP35 gene knock-out mice did not increase significantly. At the same time, it was found that the protein level of NMI in the serum of IFP35 gene knock-out (IFI35$^{-/-}$) mice was also significantly lower than that of WT mice; the protein level of IFI35 in the serum of NMI gene knock-out mice (NMI$^{-/-}$) was also significantly lower than that of WT mice (Panels A and B). It shows that the secretion between IFI35 and NMI is interrelated. At the same time, the present inventors have found that influenza virus infection can increase the secretion of IL-6 and TNF-α in serum (Panels C and D), while the protein levels of IL-6 and TNF-α in serum of NMI or IFP35 gene knock-out mice was significantly lower than those of wild-type mice. It further shows that inflammation response and infection can lead to the secretion of NMI and IFP35, and inhibition (gene knockout) of IFP35 or NMI can reduce inflammation. This result is different from the effect of PCT, the amount of which generally did not increase in serum in the case of virus infection. The above results suggest that viruses, bacteria, or chronic inflammatory diseases can all cause the secretion of IFP35 and NMI into body fluids (including blood). Therefore, IFP35 and NMI can be used as the detection indicators for chronic inflammatory diseases and the like.

Example 4: Improvement of an Antibody

I. The Humanization of an Antibody:
1. Experimental Method

Mutations were introduced into the DNA sequence of specific amino acid residues of the mouse antibody by PCR site-directed mutagenesis to modify some amino acids of the mouse antibody and transform it into a humanized antibody, realizing the humanization of the antibody. Then the engineered antibody gene was cloned into the corresponding antibody expression vector, such as pCDNA3.1, pCDNA3.4 and so on. The expression vector was transformed into human kidney cell line eExpi293F or HEK293T cells for expression, and then the expressed antibody secreted to the outside of the cells was purified. The purified engineered antibody and the antigen IFP35 were detected for their binding affinity. The equipment used is BiACo or ITC and so on. The ELISA method can also be used to detect the binding ability of the humanized antibody to the antigen. The antigen is the human IFP35 protein.

The sequences of the mouse antibody (35NIDmAb) before and after engineering are as follows:

The sequence of the light chain constant region of AE001VL (the mouse antibody before engineering (35NIDmAb) is set forth in SEQ ID NO: 24; the sequences of the light chain constant regions of the humanized mouse antibodies AE001L1, AE001L2 and AE001L3 after engineering are respectively set forth in SEQ ID NO: 3, SEQ ID NO: 7 and SEQ ID NO:12.

The sequence of the heavy chain constant region of AE001VH (the mouse antibody before engineering (35NIDmAb) is set forth in SEQ ID NO: 25; the sequences of the heavy chain constant regions of the humanized mouse antibodies AE001H1, AE001H2 and AE001H3 after engineering are respectively set forth in SEQ ID NO: 1, SEQ ID NO: 5 and SEQ ID NO:11.

Figure 11:
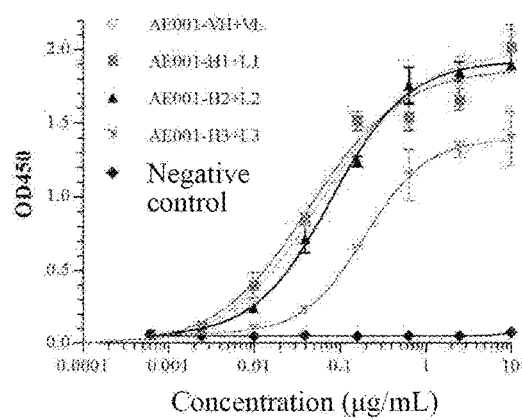
FIG. 11 shows the test results of the antigen binding ability of the starting murine antibody AE001-VH+VL (35NIDmAb) and the humanized antibodies AE001-H1+L1, AE001-H2+L2 and AE001-H3+L3.

The experimental results are shown in FIG. 11. AE001-VH+VL (35NIDmAb) is the original mouse antibody. AE001-H1+L1, AE001-H2+L2 and AE001-H3+L3 are three humanized antibodies, respectively. It can be seen that all of the humanized antibodies can bind to antigen. As AE001-H3+L3 was more similar to a human antibody and was selected for the following antibody affinity maturity modification. The results showed that the improvement in the degree of humanization of the amino acid sequence of the murine antibody resulted in the antibody more similar to a human antibody in their sequences. This experiment also shows that the antibodies can be further humanized based on the differences between murine antibodies and human antibodies. However, a backbone sequence of the antibody responsible for recognizing, such as a sequence of a variable region of the antibody, is the main segment that recognizes the antigen. The more critical regions are the CDR regions in variable regions of the antibody, which is more critical for antigen recognition. The core regions of these sequences determine the specificity of antigen recognition.

II. The Engineering of the Antibody Affinity Maturation
1. Experimental Method

The experiment adopted a universal method for mutant plasmid construction and a method for protein antibody expression. Firstly, random mutations were introduced into the DNA sequence of the CDR regions of a humanized antibody AE001-H3+L3 by PCR random mutation method, thereby changing the CDR sequences of the humanized antibody. Then the engineered antibody sequence was cloned into the corresponding antibody expression vector, such as pCDNA3.1, pCDNA3.4 and so on. A random mutant antibody library was established. The library plasmids were transferred into human kidney cell line 293T or Expi293F cells for expression, and then the expressed antibodies secreted to the outside of the cells were purified. The purified engineered antibody and the in vitro purified antigen IFP35 or NMI or IFP35/NMI complex were detected for their binding affinity. The equipment used is BiACo or ITC and so on. The ELISA method can also be used to detect the ability of the antibody to bind to the antigen after the CDR regions has been modified.

2. Results

1) The preliminary screening results of detecting affinity of a random mutant antibody by ELISA method:

TABLE 1 the preliminary screening of the random mutant antibody AE001H3 + L3

Antigen
AE001-bio(2 µg/ml), room temperature, 1 h
Block
2% MPBS, room temperature, 2 h
Sample
The cell samples expressing the random mutation antibody AE001- H3 + L3

|   | 1 | 2 | 3 | 4 | 5 | 6 | 7 | 8 | 9 | 10 | 11 | 12 |
|---|---|---|---|---|---|---|---|---|---|----|----|----|
| A | 0.2488 | 0.1232 | 0.1617 | 0.2786 | 0.1487 | 0.2955 | 0.1672 | 0.1193 | 0.2639 | 0.2213 | 0.2195 | 0.2451 |
| B | 0.1684 | 0.2336 | 0.178 | 0.2487 | 0.3215 | 0.252 | 0.2602 | 0.1315 | 0.2295 | 0.258 | 0.3118 | 0.2648 |
| C | 0.2473 | 0.198 | 0.323 | 0.2212 | 0.2003 | 0.2105 | 0.1746 | 0.1714 | 0.1745 | 0.2208 | 0.257 | 0.1827 |
| D | 0.2656 | 0.2543 | 0.2113 | 0.2343 | 0.1948 | 0.2887 | 0.1469 | 0.0806 | 0.1886 | 0.2384 | 0.2397 | 0.271 |
| E | 0.2899 | 0.1644 | 0.23 | 0.4359 | 0.2324 | 0.43 | 0.0924 | 0.2081 | 0.2477 | 0.2833 | 0.2262 | 0.2488 |
| F | 0.2702 | 0.2388 | 0.2431 | 0.1882 | 0.18 | 0.1914 | 0.0817 | 0.1235 | 0.1961 | 0.1818 | 0.1689 | 0.1767 |
| G | 0.3287 | 0.2274 | 0.2396 | 0.3342 | 0.2444 | 0.2955 | 0.2068 | 0.1165 | 0.0941 | 0.116 | 0.1931 | 0.1989 |
| H | 0.2247 | 0.2264 | 0.2279 | 0.2273 | 0.1784 | 0.2193 | 0.153 | 0.1673 | 0.1948 | 0.225 | 0.1815 | 0.1717 |

The secondary antibody: Anti-human Kappa + Lambda chain HRP(1:4000), room temperature, 1 h
color development: TMB for color development, room temperature, 10 min
termination: 2M hydrochloric acid Five antibodies with better binding ability (antibodies underlined above) were selected based on the above results, which were numbered as AE001-5, AE001-6, AE001-7, AE001-8, AE001-9, respectively. The details of the antibodies are as follows.

2) The pairing of the heavy and light chains of the mutant antibodies in the preliminary screening:

| The numberings of antibodies | The pairings of antibodies | The subtype of antibodies |
|---|---|---|
| AE001-5 | AE001-5Hc + Lc | Human IgG1 |
| AE001-6 | AE001-6Hc + Lc | Human IgG1 |
| AE001-7 | AE001-6Hc + 7Lc | Human IgG1 |
| AE001-8 | AE001-6Hc + 8Lc | Human IgG1 |
| AE001-9 | AE001-6Hc + 9Lc | Human IgG1 |

Figure 12:
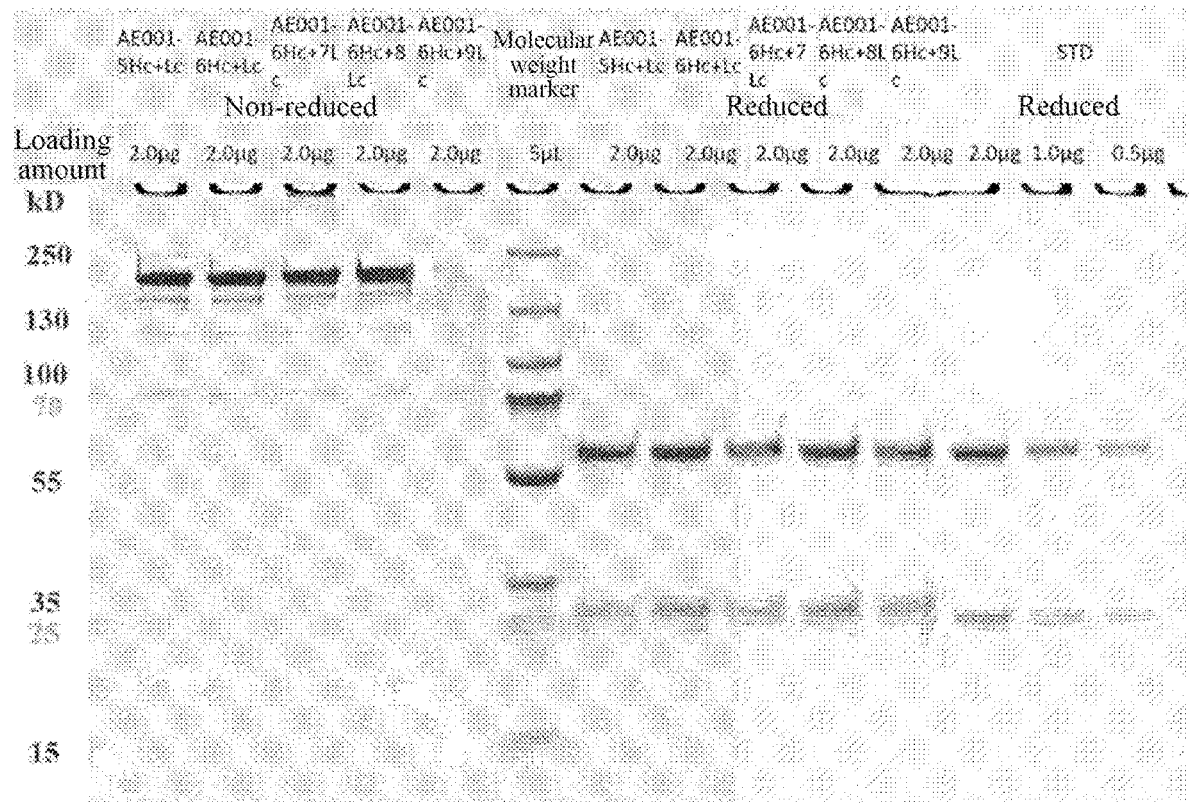
FIG. 12 shows the expression and purification results of various engineered antibodies.
Figure 13:
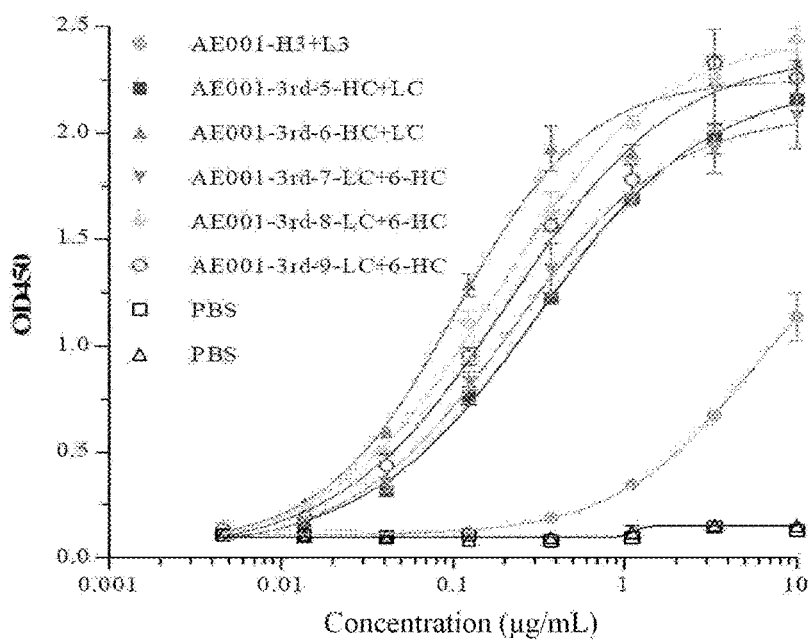
FIG. 13 shows the test results of the antigen binding ability of various engineered antibodies.
Figure 14:
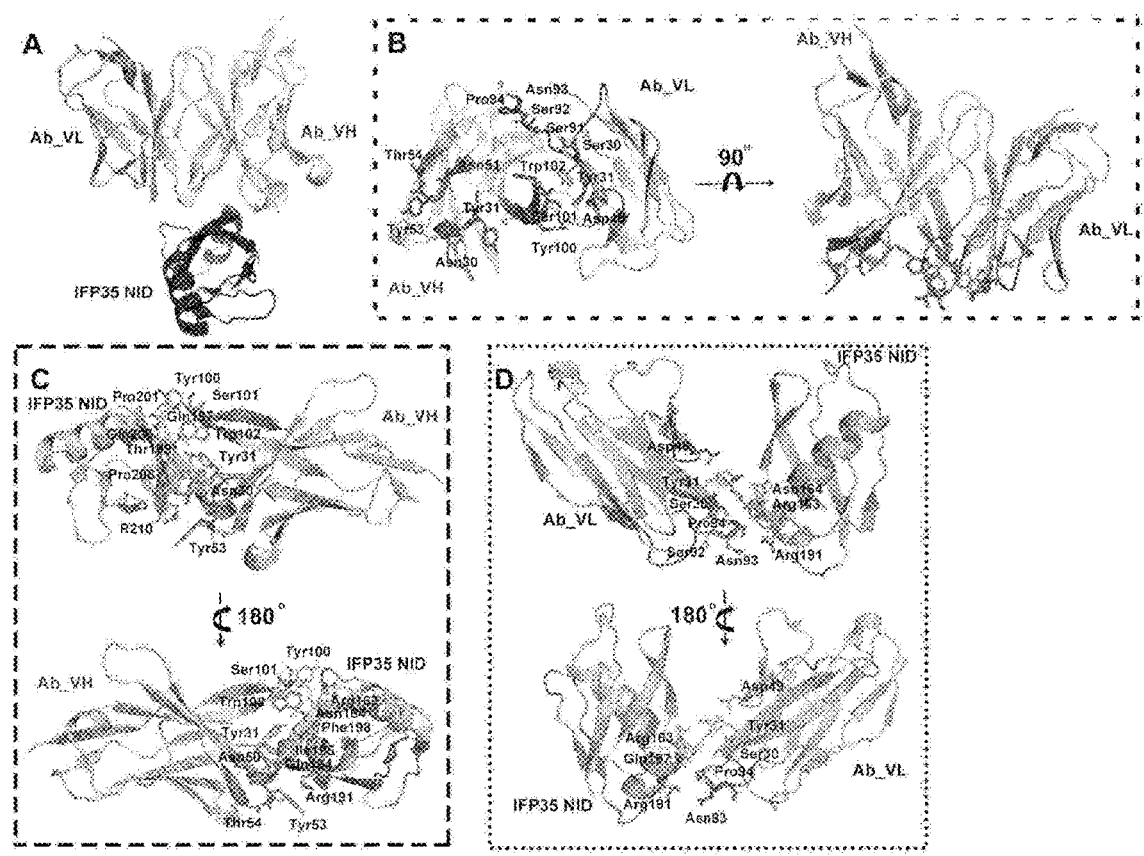
FIGS. 14A-14D show the structure of the complex of antigen IFP35 NID and the Fab of neutralizing antibody 35NIDmAb. 14A. It shows the structures of the complete antibody and antigen. The heavy chain of the antibody (Ab-VH) is in light blue, and the light chain of the antibody (Ab-VL) is in green. The antigen (IFP35 NID) is in purple. 14B. It shows a structural diagram of the antibody itself viewed from two directions, in which the residues that interact with the antigen are represented by sticks. The key residues are marked on the diagram. The heavy chain of the antibody (Ab-VH) is in light blue, and the light chain of the antibody (Ab-VL) is in green. 14C. It shows a schematic diagram of the interaction between the heavy chain of the antibody and the antigen. The key residues are represented by short sticks. 14D. It shows a schematic diagram of the interaction between the light chain of the antibody and the antigen. The key residues are represented by short sticks.

3) The antibody expression and purification are shown in FIG. 12.
4) The results of the detection of the binding affinity between the engineered antibodies and the antigen IFP35 are shown in FIG. 13.
5) The measured data of the binding affinity between the 5 groups of engineered antibodies and the antigen:

| Loading Sample ID | KD (M) | kon(1/Ms) | kdis(1/s) | Full R^2 |
|---|---|---|---|---|
| AE001-H3 + L3 | 1.39E−08 | 1.45E+05 | 2.01E−03 | 0.9953 |
| AE001-6HC + LC | 3.35E−09 | 1.52E+05 | 5.08E−04 | 0.9982 |
| AE001-6HC + 8LC | 2.99E−09 | 1.47E+05 | 4.40E−04 | 0.9985 |
| AE001-6HC + 9LC | 3.04E−09 | 1.49E+05 | 4.54E−04 | 0.9986 |
| AE001-6HC + 7LC | 3.46E−09 | 1.51E+05 | 5.24E−04 | 0.9980 |
| AE001-5HC + LC | 5.47E−09 | 1.69E+05 | 9.22E−04 | 0.9964 |

Conclusion: The 5 preferred antibodies (numbered as 5-9) obtained have different degrees of affinity improvement. The results of affinity kinetics determination (fortebio) shows that each antibody has a 2.5-4.6-fold increase in affinity; the increase in affinity is mainly due to the great improvement of Koff, and the clone affinity of AE001-6HC+8LC (the antibody AE001-8) shows the best improvement.

Changes in the Heavy Chain Sequences:

| | The CDR sequences of the heavy chain | | | |
|---|---|---|---|---|
| | The original sequence (SEQ ID NO: 9) | CDR1(25-32) GYTFTNYG (SEQ ID NO: 13) | CDR2(50-57) INTYTGEP (SEQ ID NO: 14) | CDR3(98-106) YGYSWAMDY (SEQ ID NO: 15) |
| AE001-5Hc + Lc | AE001-5 | GYTFPNYG | unchanged | unchanged |
| AE001-6Hc + Lc | AE001-6 | unchanged | unchanged | unchanged |
| AE001-6Hc + 7Lc | AE001-7 | unchanged | unchanged | unchanged |
| AE001-6Hc + 8Lc | AE001-8 | unchanged | unchanged | unchanged |
| AE001-6Hc + 9Lc | AE001-9 | unchanged | unchanged | unchanged |

| The CDR sequences of the light chain The original sequence (SEQ ID NO: 10) | CDR1(26-31) SSSVSY (SEQ ID NO: 16) | CDR2(49-51) DTS (SEQ ID NO: 17) | CDR3(90-96) WSSNPPI (SEQ ID NO: 18) |
|---|---|---|---|
| AE001-5Hc + Lc | AE001-5 | unchanged | unchanged | unchanged |
| AE001-6Hc + Lc | AE001-6 | unchanged | unchanged | WSPYPPI |
| AE001-6Hc + 7Lc | AE001-7 | unchanged | unchanged | WSSNSWS |
| AE001-6Hc + 8Lc | AE001-8 | unchanged | unchanged | WSPLPPI |
| AE001-6Hc + 9Lc | AE001-9 | unchanged | unchanged | WSPRPPI |

Note:
the cyan-labeled residues are antigen-binding residues.

Conclusion

The antibodies with optimized antigen-antibody binding capacity and the better neutralizing activity can be obtained by modifying some amino acid residues of the CDR sequences of the originally screened antibodies. It can be seen from the above tables that some antibodies that can bind to the antigen IFP35 were screened and obtained by modifying a part of CDR sequences of the original antibodies. Modifying some amino acid sequences of the above mentioned CDRs will be useful to obtain antibodies with better activity. Modifying a part of CDR sequences is an important method commonly used internationally to obtain more optimized antibodies. Therefore, an antibody that comprises the CDR sequences having 50% or more identity (the amino acids are at the same CDR positions and have the same sequence numberings) to the CDR sequences of the antibodies disclosed in the present application and binds to IFP35 shall fall into the scope of the present application.

Example 5: The Fine Three-Dimensional Crystal Structure of the Complex of the Neutralizing Antibody and the Antigen IFP35 Reveals the Key Residues for the Antibody to Recognize the Antigen and the Characteristics of the Amino Acid Residues of the IFP35 Antigenic Epitope The mice were immunized using the NID domain of IFP35 (a fragment consisting of amino acids at positions 124-220) as an immunogen. A monoclonal antibody against IFP35 was screened and obtained from the mouse spleen, which was named as 35NIDmAb.

The monoclonal antibody 35NIDmAb is a monoclonal antibody targeting IFP35 NID (a fragment consisting of amino acids at positions 124-220) with neutralizing activity. The 35NIDmAb targeting IFP35 NID binds strongly to IFP35 NID (Kd=28-10$^{-9}$ M). In vitro purification experiments show that after 35NIDmAb and IFP35 NID were mixed and purified by gel filtration chromatography, they still bind to each other. These results indicate that the 35NIDmAb targeting IFP35 NID can bind to IFP35 NID strongly, and has a neutralizing activity. The aforementioned experiments have proved that the monoclonal antibody can protect mice and ameliorate multiple sclerosis (MS) symptoms of mice.

In order to clarify the structural basis for the neutralizing activity of 35NIDmAb on IFP35 NID, based on the high affinity binding of 35NIDmAb and IFP35 NID, the present inventors analyzed the crystal structures of the 35NIDmAb Fab and IFP35 NID complex and the IFP35 NID with a resolution of 2.9 angstroms. In the structure of 35NIDmAb Fab-IFP35 NID, IFP35 exists as a monomer. However, in the structure of IFP35 NID alone, IFP35 NID exists as a dimer. In addition, the structures of a single IFP35 NID in these two structures are similar. In the structure of 35NIDmAb Fab-IFP35 NID, there are four 35NIDmAb Fab-IFP35 NID complexes in an asymmetric unit. Each 35NIDmAb Fab is composed of a heavy chain (Ab_VH) and a light chain (Ab_VL), and interacts with one IFP35 NID. The 35NIDmAb Fab mainly recognizes and binds to the C-terminal of IFP35 NID. In this interaction interface, the main amino acid residues of IFP35 NID involved are at positions Arg163, Asn164, Arg191, Gln194, Ile195, Gln197, Phe198, Thr199, Pro201, Gln206, Pro208 and Arg210.

In addition, the present inventors can reveal the key antibody amino acid residues that interact with the antigen based on the structure. The details of the key antibody amino acid residues are as follows.

In the CDR1 sequence of the heavy chain variable region of the antibody (25 GYTFTNYG 32 (SEQ ID NO: 13)), the main amino acid residues that bind to an antigen are the two amino acid residues Asn30 and Tyr31. In the CDR2 sequence of the heavy chain variable region of the antibody (50 INTYTGEP 57 (SEQ ID NO: 14)), the main amino acid residues that bind to an antigen are the three amino acid residues Asn51, Tyr53 and Thr54.

In the CDR3 sequence of the heavy chain variable region of the antibody (98 YGYSWAMDY 106 (SEQ ID NO: 15)), the main amino acid residues that bind to an antigen are the two amino acid residues Tyr100 and Trp102.

In the CDR1 sequence of the light chain variable region of the antibody (26 SSSVSY 31 (SEQ ID NO: 16)), the main amino acid residues that bind to an antigen are Ser30 and Tyr31. In the CDR2 sequence of the light chain variable region of the antibody (49 DTS 51 (SEQ ID NO: 17)), the main amino acid residue that binds to an antigen is Asp49.

In the CDR3 sequence of the light chain variable region of the antibody (90 WSSNPPI 96 (SEQ ID NO: 18)), the main amino acid residues that bind to an antigen are Ser92 and Asn93.

FIGS. 14A-14D show the structure of the complex of antigen IFP35 NID and neutralizing antibody 35NIDmAb Fab. A. It shows the structures of the complete antibody and antigen. The heavy chain of the antibody (Ab-VH) is in light blue, and the light chain of the antibody (Ab-VL) is in green. The antigen (IFP35 NID) is in purple. B. It shows a structural diagram of the antibody itself viewed from two directions, in which the residues that interact with the antigen are represented by sticks. The key residues are marked on the diagram. The heavy chain of the antibody (Ab-VH) is in light blue, and the light chain of the antibody (Ab-VL) is in green. C. It shows a schematic diagram of the interaction between the heavy chain of the antibody and the antigen. The key residues are represented by short sticks. D. It shows a schematic diagram of the interaction between the light chain of the antibody and the antigen. The key residues are represented by short sticks.

The Structure of NMI NID

In addition to the structures of IFP35 NID and the 35NIDmAb Fab and IFP35 NID complex, the present inventors also analyzed the structure of NMI NID. The overall structure of NMI NID is similar to that of IFP35 NID. The amino acid residues at the corresponding positions of NMI NID are different from those of IFP35 NID compared with the amino acid residues in IFP35 NID involved in the interaction of 35NIDmAb Fab and IFP35 NID (see the sequence alignment diagram below), and the corresponding residues are Arg185, Asn186, Lys215, Lys218, Lys219, Glu221, Tyr222, Pro223, Tyr225, Cys230, Arg232 and Thr234, respectively. These amino acid residues may affect the interaction of NMI NID and 35NIDmAb. These NMI amino acid residues represent an antibody binding epitope of NMI, which is helpful for screening and obtaining neutralizing antibodies.

Alignment of the Antibody Binding Site Sequence of IFP35 with the Sequence of the Homologous Segment of NMI:

```
IFP35_human 156
                                                   (SEQ ID NO: 28)
EIFFGKTRNGGGDVDVREL--LPGSVMLGFARDGVAQRLCQIGQFTVPLGGQQVPLRV   211

NMI_human 178
                                                   (SEQ ID NO: 29)
ELSFSKSRNGGGEVDRVDYDRQSGSAVITFVEIGVADKILKKKEYPLYINQTCHRVTV   235
```

Experimental Methods (1) Expression and Purification of IFP35 NID and NMI NID

The gene fragment encoding IFP35 NID (residues at positions 124 to 220) was cloned into pGEX-6p-1 and expressed in *E. coli*. The plasmid for encoding IFP35 NID was transformed into BL21 (DE3) cells. 100 mg/L ampicillin was added to LB medium, and the bacteria were cultured at 37° C. When the OD600 reached 0.8 to 1.0, isopropyl-o-D-thioglactosidase at the final concentration of 0.5 mM was added to induce the expression of IFP35 NID in bacteria at 16° C. for 20 h. Then the bacteria were collected by centrifugation at 4000 rpm for 15 minutes. The bacteria were resuspended in lysis buffer (20 Mm Tris at pH 8.0, 400 mM NaCl, 5% Glycerol), subjected to sonication in an ultrasonic apparatus, and then centrifuged at the high speed of 16000 rpm for 30 minutes. The supernatant obtained after centrifugation was added to the GST affinity column for binding for 1 hour, and then the GST affinity column was washed. The recombinant protein was eluted with elution buffer (20 mM Tris at pH 8.0, 150 mM NaCl, 30 mM Glutathione). The eluted protein was digested with PPase, and further purified using an ion exchange column (high salt buffer: 20 mM Tris at pH 8.0, 1M NaCl, 5% Glycerol; low salt buffer: 20 mM Tris at pH 8.0, 100 mM NaCl, 5% Glycerol) and the gel filtration chromatography column Superdex 200 (buffer: 20 mM Tris at pH 8.0, 150 mM NaCl). SDS-PAGE protein gel and Coomassie brilliant blue staining were used to verify the purity and integrity of the recombinant protein.

The methods of expression and purification of NMI NID (residues at positions 155 to 240) were the same as those of IFP35 NID.

(2) Production and Purification of 35NIDmAb Fab

The 35NIDmAb hybridoma cells and 35NIDmAb antibodies were produced using the methods reported previously. 1 mM EDTA and 1 mM cysteine were added to PBS, and the resultant buffer was used to dissolve papain. The purified 35 NIDmAb was cleaved with papain at a mass ratio of 100:1 (35 NIDmAb: papain) at 37° C. for 6-8 hours to obtain 35NIDmAb Fab.

(3) Crystallization and Structure Analysis

During the crystallization process, 35NIDmAb Fab and IFP35 NID were mixed at a ratio of 1:1, and then separated and purified by gel filtration chromatography using superdex 200. The hanging drop method was used for crystal screening. The crystals were dropped at 16° C. with a mixture of 0.2 μl protein (10 mg/ml)+0.2 μl reservoir solution. The crystals of 35NIDmAb Fab and IFP35 NID were grown in the reservoir solution containing 0.1 M Tris (pH 8.5), 0.2M $MgCl_2$, and 18% PEG 3350. 15% DMSO was added to the crystallization solution to protect the crystals at low temperature. The crystals were subjected to crystal diffraction on the beamline BL17U and BL18U of the Shanghai Synchrotron Radiation Facility. HKL3000 was used to process the diffraction data.

The structures of IFP35 NID and NMI NID were solved by the single-wavelength anomalous dispersion method. SHELX C/D, Phenix.Autosol and Phenix.Autobuild were used to obtain their initial structure models. Coot and phenix were used to correct the structures. The structure of 35NIDmAb Fab-IFP35 NID complex was solved by molecular replacement method using the structures of neutralizing monoclonal antibody YZ23 (PDB code 3CLF) against HIV and IFP35 NID as models. The initial model of the structure was established with Phenix.Autobuild. Coot and phenix were used to correct the structure.

The study on COVID-19 and influenza virus infection is shown below.

Materials and Methods

A Method for Detecting IFP35 and/or NMI in the Serum of Human (Patient or Healthy Normal Person)

(1) Collection of the sample: 4 mL of venous blood was drawn from a fasting subject and placed in a disposable vacuum blood collection tube without anticoagulants, and centrifuged at 3000 r/min for 15 min. After the serum was separated, the serum sample tube was placed in a water bath at 56° C. for at least half an hour to inactivate viruses. Then the sample tube was stored in a refrigerator at −20° C. or −80° C. for further testing, avoiding repeated freezing and thawing.

(2) Detection of the sample: the concentrations of IFP35 and/or NMI in the serum were detected by the enzyme-linked immunosorbent assay (ELISA). The detection steps were as follows:

2.1 Preparation of reagents, a sample and a standard: the sample was slowly dissolved in reagents at a room temperature (18-25° C.). The standard was serially diluted to 5000 μg/mL, 2500 μg/mL, 1250 μg/mL, 625 μg/mL, 312 μg/mL, 156 μg/mL, and 78 μg/mL. The diluent of standard (0 μg/mL) was directly used as a blank control. The control sample for each test should be prepared for immediate use in order to ensure the validity of the test results.

2.2 Detection: the wells of standard, the wells of sample to be tested and the wells of blank control were set, respectively. The plate was covered with a film and incubated at 37° C. for 2 hours. The liquid in the wells was discarded and the plate was spun dry. The working solution A to be tested was added to the wells, and the plate was covered with a film and incubated at 37° C. for 1 hour. The liquid in the wells was discarded. The plate was spun dry and washed for 5 times. The working solution B to be tested was added to the wells and incubated at 37° C. for 1 hour. The liquid in the wells was discarded. The plate was spun dry and washed for 5 times. 90 μL of the substrate solution was added to each well. The plate was covered with a film, and incubated at 37° C. in the dark for development (the reaction time was 15-25 minutes, when the first 3-4 wells of the standard wells had a clear gradient of blue and the last 3-4 wells did not have a clear gradient of blue, the reaction was stopped). 50 μL of stop solution was added to each well to stop the reaction. The order of adding the stop solution should be the same as that of adding the substrate solution. If the color is uneven, the plate was gently shaken to make the solution as homogeneous as possible. The optical density of each well was measured using a microplate reader after ensuring that there are no water droplets at the bottom of the plate and no bubbles in the wells.

2.3 Processing of the results: the concentrations of IFP35 and/or NMI in the serum were calculated through the standard curve. SPSS statistical software was used to process the data. The results were expressed as mean±standard deviation. T test was used to analyze the data of the sample and control groups. $P<0.05$ indicates a difference statistical significance.

Cell Lines and Virus Strains

HEK293T (ATCC, CRL-11268), A549 (ATCC, CRM-CRL-185) and MDCK (NBL-2) (ATCC CCL-34TM) cell lines were cultured in DMEM medium supplemented with 10% fetal bovine serum (Gibco). THP1 cells (ATCC, TIB-202TM) and RAW264.7 cells (ATCCTIB-71TM) were cultured in RPMI1640 medium (Gibco, C1875500BT). The 9-day-old chicken embryos free of specific pathogens (SPF) were purchased from Guangdong Wens Dahuanong Biotechnology Co., Ltd. The influenza A virus A/Puerto Rico/ 8/1934 (H1N1) (PR8) strain was propagated in SPF chicken embryos and purified by sucrose density gradient centrifugation. The virus titer was measured with MOCK cells.

Antibodies and Reagents

The monoclonal antibody against IFP35 (H00003430-M01) was purchased from Abnova. The antibody against NMI (ab183724) was purchased from abcam. The NS1 antibody against Influenza A virus (sc-130568) was purchased from Santa Cruz. Anti-influenza A virus nucleoprotein antibody (ab128193) was purchased from abcam. E6446 (dihydrochloride) (HY-12756A) (an inhibitor of TLR7/9) and CU-CPT-9b (HY-112051) (an inhibitor of TLR8) were purchased from Med ChemExpress (MCE, USA). An dsRNA inhibitor of TLR3 (614310) was purchased from Millipore. Resatorvid (TAK-242) was purchased from Selleck (USA).

Mouse

C57BL/6 (B6) wild-type mice were purchased from Guangdong Medical Laboratory Animal Center (GDM-LAC). The C57BL/6 mouse model was used to establish $NMI^{-/-}$ or $IFP35^{-/-}$ homozygous gene knockout mice according to previously published literatures. All mice used in the experiment were 8 to 12 weeks old and gender matched. The mice are kept in an environment free of specific pathogens. The breeding conditions met the standards of the Institutional Animal Care and Use Committee (IACUC) of Sun Yat-sen University.

Plasmid Construction and Transfection

All vectors were verified by sequencing. Cells were transfected for transient expression in the presence of the ExFect2000 transfection reagent (Vazyme, T202-1). Briefly, 293T cells were transiently transfected with each of plasmids 24 h before virus infection, and then the 5MOI PR8 virus was inoculated into cells in a 6-well plate. After incubated for 1 hour, the cells were washed once with PBS and replaced with normal DMEM medium without FBS. Then the supernatant was collected for the determination of the virus titer, and samples at different time points were collected and analyzed by Western blot electrophoresis.

Real-Time-Fluorescence Quantitative PCR

A TRIzol LS reagent (USA) was used to extract total RNA from cells or lung tissues. Then the viral genomic RNA (1 μg) was reversely transcribed using specific primer U12A: AGCAAAAGAGG (SEQ ID NO: 30). The PrimeScript II first-strand cDNA synthesis kit (Takara) was used to configure the reverse transcription system. Viral mRNA was first purified with an mRNA isolation kit (China Yesen Biotechnology Co., Ltd.), and then was subjected to reverse transcription reaction using oligo (d T) 18 as a primer. The cDNA product, as a template, was amplified by qPCR with SYBR Green Mix (Applied Biosystems). Quantitative PCR reaction was carried out on the Quant Studio5 (Applied Biosystems, Thermo Fisher Scientific). The standard curve method was used to analyze the data.

Enzyme-Linked Immunosorbent Assay

Murine mIFP35 (E10460m) ELISA kit was purchased from EIAab company. Human IFP35 ELISA kit (OKEH02088) was purchased from AVIVA SYSTEM BIOLOGY. Human hNMI (CSB-EL015 893HU) and murine mNMI (CSB-EL015893MO) ELISA kits were purchased from CUSABIO. The ELISA assays were performed according to the instruction manual. Briefly: 100 μl serially diluted standards, test samples, negative and blank controls were respectively added to the corresponding ELISA plates in duplicate. The plates were incubated at 37° C. for 2 hours after covered with the films. The films were removed and the liquids in the wells were discarded. The plates were placed upside down on a paper towel and tapped to discard the remaining liquids. 100 μl of biotin-labeled (1×) detection antibody was added to each well, and the plates were covered with the films and incubated at 37° C. for 1 hour. The films were removed and the liquids in the wells were discarded. The plates were placed upside down on a paper towel and tapped to discard the remaining liquids. The plates were washed for 3 times with 1× wash buffer. The plates were covered with the films and incubated at 37° C. for 1 hour after adding 100 μl of HRP-labeled detection secondary antibody to each well. The films were removed and the liquids in the wells were discarded.

The plates were placed upside down on a paper towel and tapped to discard the remaining liquids. The plates were washed for 5 times with 1× wash buffer. 90 μl TMB substrate was added to each well and incubated at 37° C. in the dark for 15-30 minutes. 50 μl of stop solution was added to each well, and the OD450 absorbance value was read with an ELISA plate reader.

Histopathology of Lung

The lung tissues of all the mice were fixed in 4% paraformaldehyde, embedded in paraffin, and sliced into 4 μm sections. Then all the sections were stained with hematoxylin and eosin (H&E), and were detected under a microscope for the tissue damage, necrosis, and inflammatory cell infiltration. Different areas randomly selected were photographed.

Serum Sample of Patient

In the influenza virus study, patient blood and normal volunteer control samples were obtained from Zhongshan School of Medicine in Sun Yat-sen University, the Sixth Affiliated Hospital of Sun Yat-sen University, the First Affiliated Hospital of Sun Yat-sen University, the First Affiliated Hospital of Guangzhou Medical University, Guangdong Maternity and Child Health Hospital and so on. The serums were stored at −80° C. after separation. All the participants signed the informed consent for testing their serum samples and were approved by the human research ethics committee of the relevant hospital (201701093).
Ethical Description The animal experiments were carried out in accordance with the "Regulations on Administration of Laboratory Animal Affairs" approved by the State Council of the People's Republic of China. The animal experiments had been approved by the Institutional Animal Care and Use Committee (IACUC) of Sun Yat-sen University with the license number of SYXK2016-0112. All operations involving influenza viruses were completed in the third-level biosafety laboratory.
Analysis of Data Quantitative data were expressed as mean±SD, and unpaired Student's t-test was used to determine whether the differences between groups were statistically significant. Log-rank test was used to analyze whether there were significant differences in the survival rates of mice with different treatments. P value less than 0.05 is considered to be statistically different. P value less than 0.001 is considered to be significantly different (#, P>0.05; *, P<0.05; , P<0.01; *, P<0.001).

Figure 15:
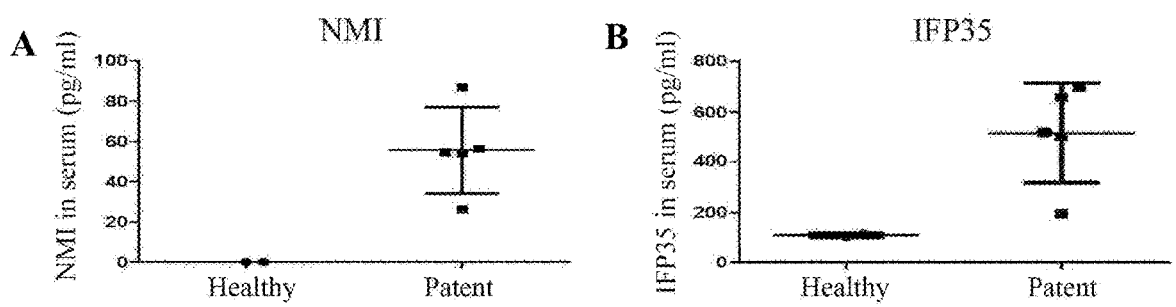
FIGS. 15A-15B show a dot plot of the determination of IFP35 (15B) and NMI (15A) levels in the serum of healthy controls and confirmed patients with novel coronavirus (COVID-19) infection, where each dot indicates the serum sample of a healthy person or a patient.

Example 6: Identification of IFP35 and/or NMI as Serological Indicators of Novel Coronavirus (COVID-19) Pneumonia The present inventors detected the plasma samples of 5 severe/critical diseased patients with novel coronavirus infection collected from designated hospitals for novel coronavirus pneumonia, and have found that the levels of IFP35 and NMI of all patients were significantly increased. Similarly, the same results were obtained by further analysis using more (tens of) patient serum samples. Noteworthily, combined with the clinical manifestations and prognosis of patients, the levels of IFP35 and NMI were highly correlated with the novel coronavirus infection, that is, the higher the levels of IFP35 and NMI, the more severe the patient's clinical manifestations are, and the worse the prognosis is (patients with the highest levels of IFP35 and NMI in this study eventually died). FIGS. 15A-15B show the results of IFP35 and NMI in the serum of 5 patients. The amount of IFP35 in some samples had reached 500-700 μg/mL, which is close to the fatal level (approximately 700 μg/mL) which caused the death of the patients with sepsis previously discovered by the present inventors, indicating that IFP35 and/or NMI are related to the inflammatory response of the novel coronavirus infection. In particular, the amount of IFP35 and/or NMI significantly increased in severe/critical diseased patients, and thus can be used as the detection markers in blood of the patients with a COVID-19 infection to help medical staff judge the severity and prognosis of the inflammatory disease in patients.

Other studies of the present inventors had proved (for example, see the following influenza virus research) that inhibiting these inflammatory factors can reduce the degree of inflammatory response, the severity of diseases and death caused by virus infection as the increased amounts of such inflammatory factors in the serum activate the inflammatory response, trigger excessive inflammatory response and so on. It can be inferred from this that the use of drugs (antibody drugs or chemical drugs) to inhibit IFP35 and/or NMI in the blood can inhibit the occurrence of excessive inflammatory response caused by the novel coronavirus COVID-19 infection.

Example 7: Identification of IFP35 and/or NMI as Serological Indicators of Influenza Virus Infection Preliminary studies of the present inventors indicated that LPS stimulation induced expression and release of NMI from macrophages. In this study, LPS was used as a positive control, and PBS was used as a negative control.

Figure 16:
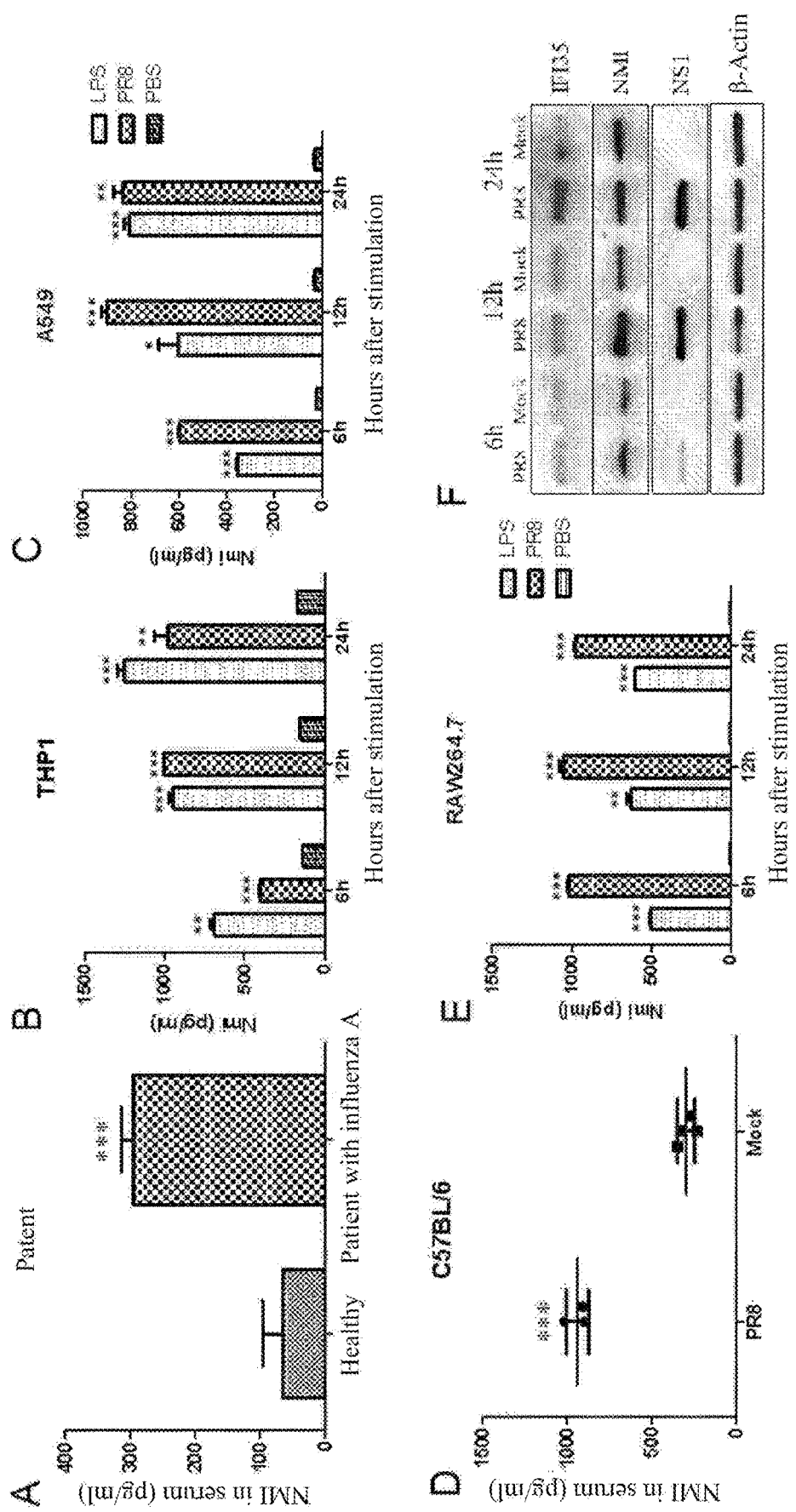
FIGS. 16A-16F show the verification of production of NMI caused by the influenza virus in vivo and in vitro. (16A) The amount of NMI in the serum of patients infected with the influenza virus; (16B) the amount of NMI in the supernatant of THP1 cells stimulated by the influenza virus; (16C) the amount of NMI in the supernatant of A549 cells stimulated by the influenza virus; (16D) the amount of NMI in the serum of C57BL/6 wild-type mice infected with influenza virus strain PR8 or Mock; (16E) the amount of NMI in the supernatant of RAW264.7 cells stimulated by the influenza virus; (F) the protein expression level of NMI/IFP35 in A549 cells infected with influenza virus strain PR8 or Mock. (* represents $P<0.05$,  represents $P<0.01$, and * represents $P<0.001$).

For NMI, the amount of NMI in serum of patients infected with influenza A virus is higher than that of healthy donors (Panel A of FIG. 16). Influenza virus PR8 stimulated human monocytes (THP1), epithelial cells (A549), and RAW264.7 cells to release NMI into the culture medium (Panels B, C and E of FIG. 16). In C57BL/6 mice infected with PR8, the amount of NMI in serum was significantly higher than that of the control group (Panel D of FIG. 16). The amounts of NMI and IFP35 in cells gradually increased after PR8 infection and they showed different abundances in A549 cells (Panel F of FIG. 16).

Figure 17:
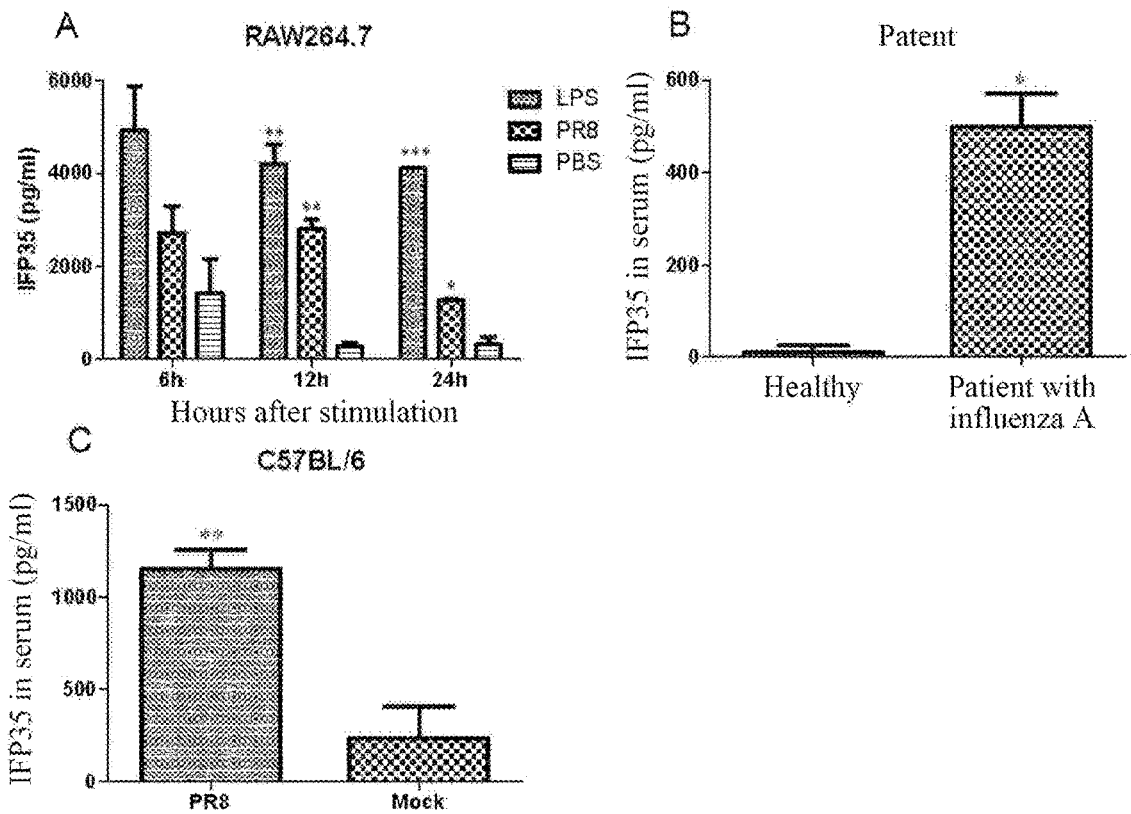
FIGS. 17A-17C show the verification of the production of IFP35 caused by the influenza virus in vivo and in vitro. (17A) The amount of IFP35 in the supernatant of RAW264.7 cells stimulated by the influenza virus; (17B) the amount of IFP35 in the serum of patients infected with the influenza virus; (17C) the amount of IFP35 in the serum of C57BL/6 wild-type mice infected with PR8 or Mock. * represents $P<0.05$,  represents $P<0.01$, and * represents $P<0.001$.

The results observed for IFP35 were similar to those of NMI. The amount of IFP35 in serum of patients infected with influenza A virus is higher than that of healthy donors (Panel B of FIG. 17). Influenza virus PR8 stimulated RAW264.7 cells to release IFP35 into the culture medium (Panel A of FIG. 17). In C57BL/6 mice infected with PR8, the amount of IFP35 in serum was significantly higher than that of the control group (Panel C of FIG. 17).

Figure 18:
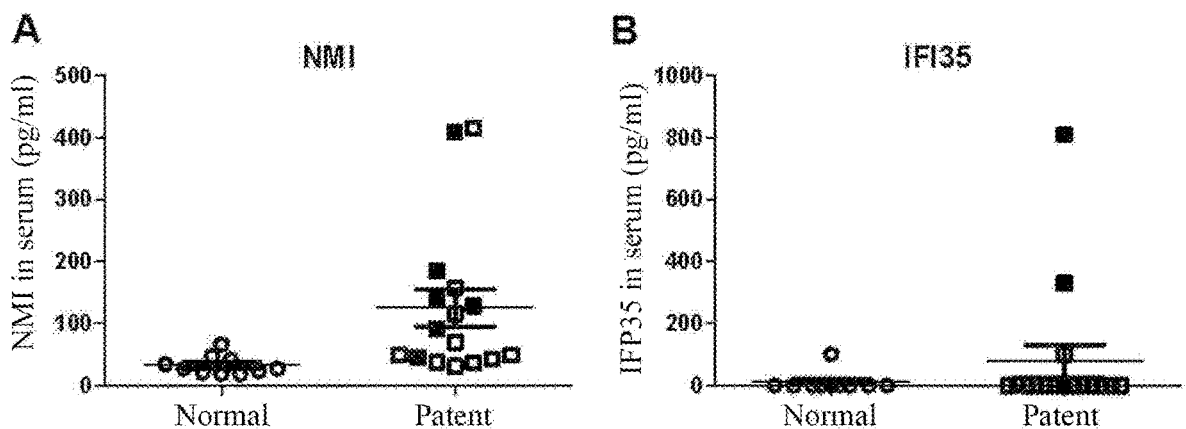
FIGS. 18A-18B show the amounts of NMI (18A) and IFP35 (18B) in the serum of 16 patients with influenza and 10 healthy controls. Patients in the intensive care unit (ICU) who developed into severe pneumonia are indicated with solid squares.

FIGS. 18A-18B show the amounts of NMI and IFP35 in the serum of 16 patients with influenza and 10 healthy controls. The amounts of NMI and IFP35 in the serum of patients with influenza were much higher than those of healthy controls, and those of the patients in the intensive care unit (ICU) who developed into severe pneumonia (indicated with solid squares) were particularly high.

All these results indicate that influenza virus infection can lead to the production of NMI/IFP35 in vitro and in vivo.

Figure 19:
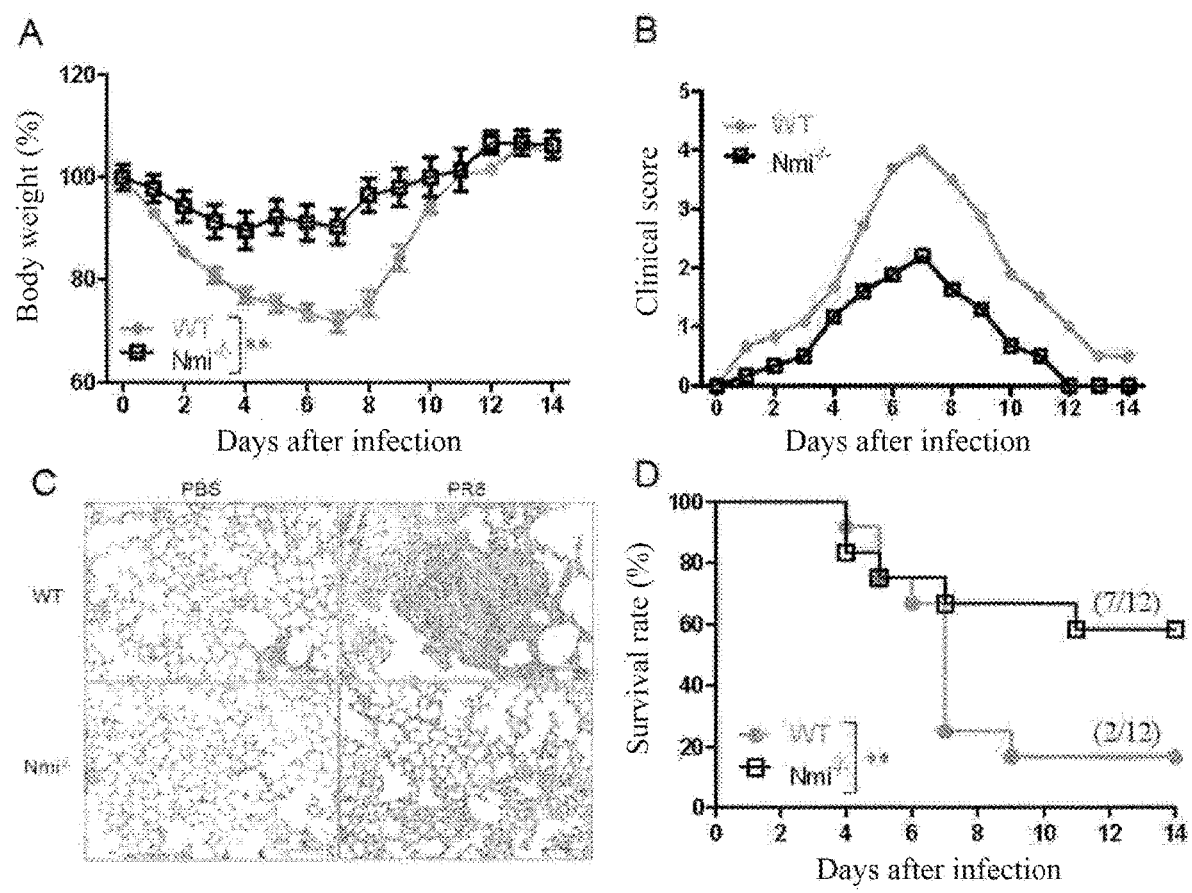
FIGS. 19A-19D show various indicators of mice with the knockout of NMI gene and wild-type mice after being infected with influenza virus strain PR8. (19A) Changes in body weight (%); (19B) clinical score, in which mice were monitored for sleepiness, creeping, wrinkled fur, hunched back, rapid shallow breathing, and audible rales, (healthy) 0 score 5 (dying); (19C) H&E staining of lung tissue, with a scale of 100 μm; (19D) survival rate (%). The mice were infected with $2\times10^6$ pfu PR8 virus. Log-rank test was used to analyze whether there were significant differences in the survival rate of mice with different treatments. ** represents $P<0.01$.

Example 8: Verification of the Protective Effect of NMI and IFP35 Deletion on Influenza Virus Infection $NMI^{-/-}$ gene knockout mice were established using the C57BL/6 mouse model. A group of C57BL/6 wild-type or $NMI^{-/-}$ gene knockout mice were tested with $2 \times 10^6$ pfu of PR8 virus, which can kill 90% of the infected mice. All mice were monitored daily to determine whether or not they were alive, had weight loss, and had clinical symptoms of the disease (for example, lethargy, hair loss, wrinkled fur, hunched posture, rapid shallow breathing or audible Rales). The daily clinical score of each mouse ranges from 0 (asymptomatic) to 5 (dying). As shown in panels A and B of FIG. 19, $NMI^{-/-}$ mice showed mild clinical symptoms and weight loss (%). In contrast, wild-type mice had a much higher clinical score, and their body weight had lost nearly 30%. H&E staining results (Panel C of FIG. 19) shows that: the lung tissues of wild-type mice infected with PR8 were damaged, with inflammatory exudate and alveolar space filled by blood. The lung tissues of $NMI^{-/-}$ mice remained basically intact without obvious lesions, similar to those of control mice treated with PBS. At the end of the experiment, compared with wild-type mice, $NNMI^{-/-}$ mice were largely protected from lethal PR8 infection ($LD_{90}$) (Panel D of FIG. 19).

Figure 20:
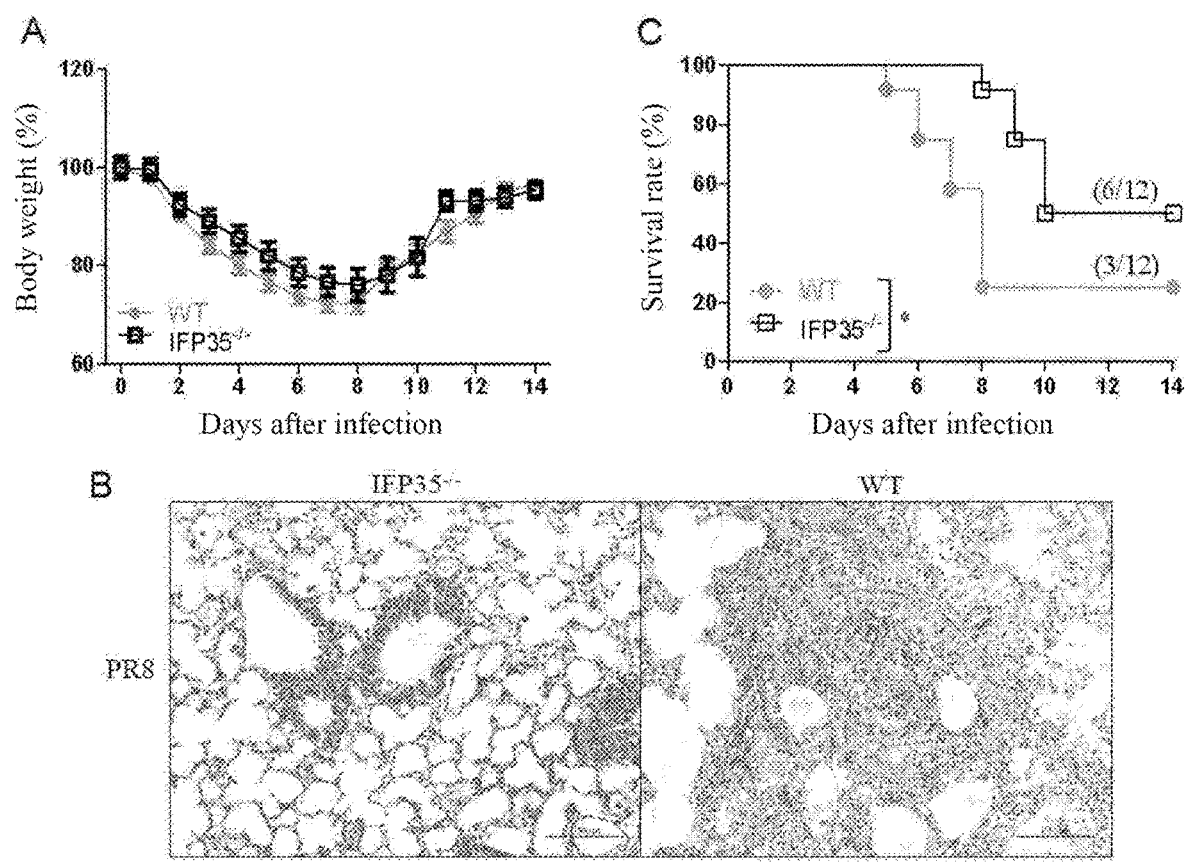
FIGS. 20A-20C show various indicators of mice with the knockout of IFP35 gene and wild-type mice after being infected with influenza virus strain PR8. (20A) Changes in body weight (%); (20B) H&E staining of lung tissue, with a scale of 100 μm; (20C) survival rate (%). The mice were infected with $2\times10^6$ pfu PR8 virus. Log-rank test was used to analyze whether there were significant differences in the survival rate of mice with different treatments. ** represents $P<0.01$.

In order to study the homologous protein IFP35, CRISPR Cas9 technology was used to knock out the IFP35 gene in C57BL/6 mice. C57BL/6 wild-type or IFP35$^{-/-}$ mice were infected with LD$_{90}$ dose of PR8 virus respectively for experiments. As shown in FIG. 20, IFP35$^{-/-}$ gene knockout mice had no obvious lung injury (Panel B). Compared with wild-type mice, the survival rate (%) of IFP35$^{-/-}$ gene knockout mice was slightly increased (Panel C). Interestingly, the change of body weight (%) of IFP35$^{-/-}$ gene knockout mice was not significantly different from that of the control group (Panel A).

The above evidences show that reducing the in vivo levels of NMI and/or IFP35 has a protective effect on influenza virus infection.

Example 9: Verification of the Protective Effect of Exogenous Inhibitors on Influenza Virus Infection In order to verify whether exogenous inhibition of IFP35 can achieve similar protection, a neutralizing antibody against IFP35 was used as a drug to treat 12 C57BL/6 wild-type mice 1 day before virus infection. At the same time, the same amount of mouse IgG was used to treat another group of C57BL/6 wild-type mice as a negative control. Each mouse was injected intravenously with 200 μg antibody for 5 consecutive days, and then all mice were inoculated with LD$_{90}$ dose of PR8 virus on day 0. Each mouse was weighed and monitored for wrinkled fur, lethargy, creeping, hunched back, shortness of breath, and audible rales. The clinical symptoms were scored daily for 2 weeks. A schematic diagram of the experimental protocol was shown in Panel A of FIG. 21.

Figure 21:
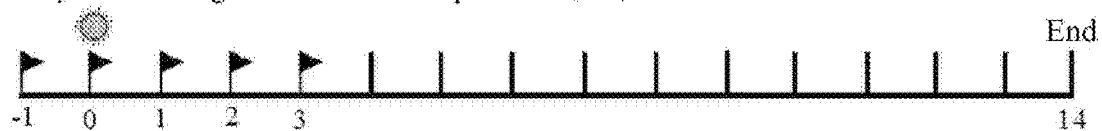
FIGS. 21A-21D show the therapeutic effects of the neutralizing antibodies for IFP35. (21A) Experimental protocols; (21B) changes in body weight (%); (21C) clinical score; (21D) survival rate (%). The mice were infected with $2\times10^6$ pfu PR8 virus. Log-rank test was used to analyze whether there were significant differences in the survival rate of mice with different treatments. ** represents $P<0.01$.
Figure 21:
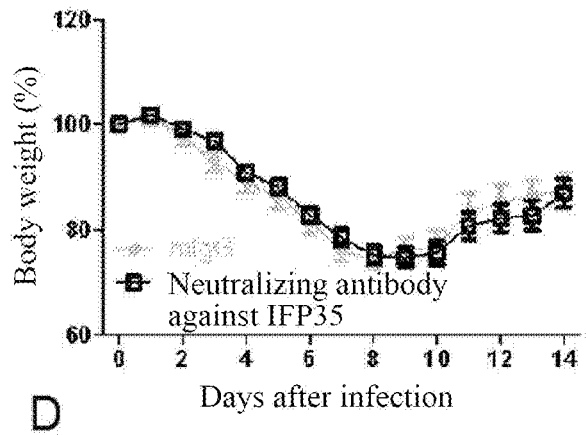
Figure 21:
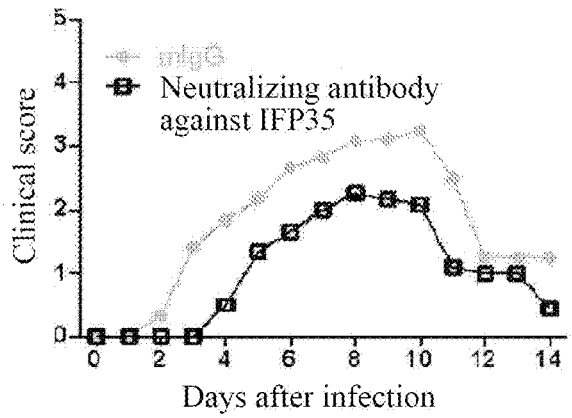
Figure 21:
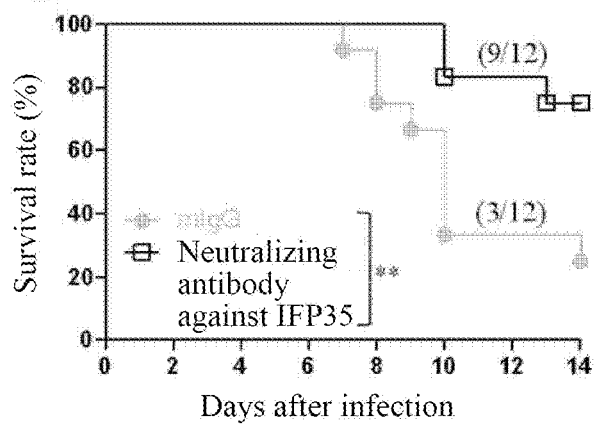

The results showed that: the mice treated with the neutralizing antibody against IFP35 could significantly protect them from the lethal PR8 infection (LD$_{90}$ dose), while most of the mice given mIgG died (Panel D of FIG. 21). The clinical scores were consistent with the survival rate results (Panel C of FIG. 21). However, there was no significant difference in body weight change (Panel B of FIG. 21), which was consistent with the results in panel A of FIG. 21. Further research is needed to determine the mechanism. In general, the neutralizing antibody against IFP35 alleviated clinical symptoms and protected mice from lethal influenza virus infection.

Influenza viruses, such as the pandemic H1N1, highly pathogenic H5N1 and novel recombinant H7N9, can directly infect humans and cause severe acute lung injury, acute respiratory distress syndrome, and ultimately respiratory failure. This usually leads to secondary bacterial infections, a variety of infectious pneumonia, encephalitis, myocarditis, and eventually multiple organ failure.

The influenza virus research of this application supports the following conclusions: influenza virus infection can lead to an increase in the amounts of IFP35 and/or NMI in the blood of infected individuals. This result can be used as a characteristic indicator for detecting influenza virus infection clinically. At the same time, exogenous administration of antibody drugs and chemical drugs for inhibiting IFP35 and/or NMI can be used for the treatment of influenza virus infection.

Without departing from the spirit and scope of the disclosure of the present application, various modifications and equivalent substitutions can be made to the various embodiments disclosed in the present application. Unless the context indicates otherwise, any features, steps, or embodiments of the present disclosure can be used in combination with any other features, steps, or embodiments.

What is claimed is:

1. A method for treating and/or alleviating multiple sclerosis, or an inflammatory response in an individual infected with influenza A, comprising administering to the individual a therapeutically effective amount of an antibody or an antigen-binding fragment thereof which specifically binds to interferon-induced protein 35 kD (IFP351 and/or N-myc interacting protein (NMI), wherein the antibody or antigen binding fragment thereof comprises:
variable heavy chain CDRs as set forth in SEQ ID NOs: 13, 14, and 15, respectively, and variable light chain CDRs as set forth in SEQ ID NOs: 16, DTS, and 18, respectively;
variable heavy chain CDRs as set forth in SEQ ID NOs: 19, 14, and 15, respectively, and variable light chain CDRs as set forth in SEQ ID NOs: 16, DTS, and 18, respectively;
variable heavy chain CDRs as set forth in SEQ ID NOs: 13, 14, and 15, respectively, and variable light chain CDRs as set forth in SEQ ID NOs: 16, DTS, and 20, respectively;
variable heavy chain CDRs as set forth in SEQ ID NOs: 13, 14, and 15, respectively, and variable light chain CDRs as set forth in SEQ ID NOs: 16, DTS, and 21, respectively;
variable heavy chain CDRs as set forth in SEQ ID NOs: 13, 14, and 15, respectively, and variable light chain CDRs as set forth in SEQ ID NOs: 16, DTS, and 22, respectively; or
variable heavy chain CDRs as set forth in 13, 14, and 15, respectively, and variable light chain CDRs as set forth in SEQ ID NOs: 16, DTS, and 23, respectively,
wherein the antibody or antigen binding fragment thereof further comprises:
a heavy chain constant region as set forth in SEQ ID NO: 25 and a light chain constant region as set forth in SEQ ID NO: 24;
a heavy chain constant region as set forth in SEQ ID NO: 1 and a light chain constant region as set forth in SEQ ID NO: 3;
a heavy chain constant region as set forth in SEQ ID NO: 5 and a light chain constant region as set forth in SEQ ID NO: 7; or a heavy chain constant region as set forth in SEQ ID NO: 11 and a light chain constant region as set forth in SEQ ID NO: 12.

2. The method according to claim 1, wherein the antibody comprises variable heavy chain CDRs as set forth in SEQ ID NOs: 13, 14, and 15, respectively, and variable light chain CDRs as set forth in SEQ ID NOs: 16, DTS and 18, respectively.

3. The method according to claim 2, wherein the sequence of the heavy chain variable region of the antibody re set forth in SEQ ID NO: 9, and the sequence of the light chain variable region of the antibody are set forth in SEQ ID NO: 10.

4. The method according to claim 1, wherein the antibody comprises:

a heavy chain constant region of the antibody as set forth in SEQ ID NO: 25, and a light chain constant region of the antibody as set forth in SEQ ID NO: 24.

5. The method according to claim 1, wherein the individual infected with influenza A is a severe or critically diseased individual.

6. The method according to claim 1, wherein the individual is a human.

\* \* \* \* \*

SEQUENCE LISTING

```
<160> NUMBER OF SEQ ID NOS: 30

<210> SEQ ID NO 1
<211> LENGTH: 118
<212> TYPE: PRT
<213> ORGANISM: Artificial Sequence
<220> FEATURE:
<223> OTHER INFORMATION: Synthetic construct

<400> SEQUENCE: 1

Gln Val Gln Leu Val Glu Ser Gly Ala Glu Val Lys Lys Pro Gly Ala
1               5                   10                  15

Ser Val Lys Ile Ser Cys Lys Ala Ser Gly Tyr Thr Phe Thr Asn Tyr
            20                  25                  30

Gly Met Asn Trp Val Lys Gln Ala Pro Gly Gln Gly Leu Lys Trp Met
        35                  40                  45

Gly Trp Ile Asn Thr Tyr Thr Gly Glu Pro Thr Phe Ala Gln Asp Phe
    50                  55                  60

Gln Gly Arg Phe Thr Phe Thr Leu Asp Thr Ser Ala Ser Thr Ala Tyr
65                  70                  75                  80

Leu Gln Ile Ser Ser Leu Arg Asn Glu Asp Thr Ala Val Tyr Phe Cys
                85                  90                  95

Ala Arg Tyr Gly Tyr Ser Trp Ala Met Asp Tyr Trp Gly Gln Gly Thr
            100                 105                 110

Ser Val Thr Val Ser Ser
        115
```

<210> SEQ ID NO 2
<211> LENGTH: 286
<212> TYPE: PRT
<213> ORGANISM: Homo sapiens

<400> SEQUENCE: 2

Met Ser Ala Pro Leu Asp Ala Leu His Ala Leu Gln Glu Glu Gln
1               5                   10                  15

Ala Arg Leu Lys Met Arg Leu Trp Asp Leu Gln Gln Leu Arg Lys Glu
                20                  25                  30

Leu Gly Asp Ser Pro Lys Asp Lys Val Pro Phe Ser Val Pro Lys Ile
            35                  40                  45

Pro Leu Val Phe Arg Gly His Thr Gln Gln Asp Pro Glu Val Pro Lys
        50                  55                  60

Ser Leu Val Ser Asn Leu Arg Ile His Cys Pro Leu Leu Ala Gly Ser
65                  70                  75                  80

Ala Leu Ile Thr Phe Asp Asp Pro Lys Val Ala Glu Gln Val Leu Gln
                85                  90                  95

Gln Lys Glu His Thr Ile Asn Met Glu Glu Cys Arg Leu Arg Val Gln
            100                 105                 110

Val Gln Pro Leu Glu Leu Pro Met Val Thr Thr Ile Gln Val Met Ser
        115                 120                 125

Gln Leu Ser Gly Arg Arg Val Leu Val Thr Gly Phe Pro Ala Ser Leu
    130                 135                 140

Arg Leu Ser Glu Glu Glu Leu Leu Asp Lys Leu Glu Ile Phe Phe Gly
145                 150                 155                 160

Lys Thr Arg Asn Gly Gly Gly Asp Val Asp Val Arg Glu Leu Leu Pro
                165                 170                 175

Gly Ser Val Met Leu Gly Phe Ala Arg Asp Gly Val Ala Gln Arg Leu
            180                 185                 190

Cys Gln Ile Gly Gln Phe Thr Val Pro Leu Gly Gly Gln Gln Val Pro
        195                 200                 205

Leu Arg Val Ser Pro Tyr Val Asn Gly Glu Ile Gln Lys Ala Glu Ile
    210                 215                 220

Arg Ser Gln Pro Val Pro Arg Ser Val Leu Val Leu Asn Ile Pro Asp
225                 230                 235                 240

Ile Leu Asp Gly Pro Glu Leu His Asp Val Leu Glu Ile His Phe Gln
                245                 250                 255

Lys Pro Thr Arg Gly Gly Gly Glu Val Glu Ala Leu Thr Val Val Pro
            260                 265                 270

Gln Gly Gln Gln Gly Leu Ala Val Phe Thr Ser Glu Ser Gly
        275                 280                 285

<210> SEQ ID NO 3
<211> LENGTH: 107
<212> TYPE: PRT
<213> ORGANISM: Artificial Sequence
<220> FEATURE:
<223> OTHER INFORMATION: Synthetic construct

<400> SEQUENCE: 3

Asp Ile Gln Met Thr Gln Ser Pro Ser Ser Met Ser Ala Ser Val Gly
1               5                   10                  15

Asp Arg Val Thr Met Thr Cys Gln Ala Ser Ser Ser Val Ser Tyr Met
                20                  25                  30

His Trp Tyr Gln Gln Lys Pro Gly Lys Ser Pro Lys Arg Trp Ile Tyr

```
                35                  40                  45
Asp Thr Ser Lys Leu Ala Ser Gly Val Pro Ser Arg Phe Ser Gly Ser
             50                  55                  60

Gly Ser Gly Thr Asp Tyr Thr Leu Thr Ile Ser Ser Met Gln Pro Glu
 65                  70                  75                  80

Asp Ile Ala Thr Tyr Tyr Cys Gln Gln Trp Ser Ser Asn Pro Pro Ile
                 85                  90                  95

Thr Phe Gly Ala Gly Thr Lys Leu Glu Ile Lys
            100                 105
```

<210> SEQ ID NO 4
<211> LENGTH: 286
<212> TYPE: PRT
<213> ORGANISM: Mus musculus

<400> SEQUENCE: 4

```
Met Ser Val Thr Leu Gln Thr Val Leu Tyr Ser Leu Gln Glu Glu Gln
 1               5                  10                  15

Ala Arg Leu Lys Met Arg Leu Gln Glu Leu Gln Gln Leu Lys Arg Glu
                 20                  25                  30

Arg Thr Gly Ser Pro Gly Ala Lys Ile Pro Phe Ser Val Pro Glu Val
             35                  40                  45

Pro Leu Val Phe Gln Gly Gln Thr Lys Gln Gly Arg Gln Val Pro Lys
 50                  55                  60

Phe Val Val Ser Asn Leu Lys Val Cys Cys Pro Leu Pro Glu Gly Ser
 65                  70                  75                  80

Ala Leu Val Thr Phe Glu Asp Pro Lys Val Val Asp Arg Leu Leu Gln
                 85                  90                  95

Gln Lys Glu His Arg Val Asn Leu Glu Asp Cys Trp Leu Arg Val Gln
            100                 105                 110

Val Gln Pro Leu Glu Leu Pro Val Val Thr Asn Ile Gln Val Ser Ser
        115                 120                 125

Gln Pro Asp Asn His Arg Val Leu Val Ser Gly Phe Pro Ala Gly Leu
130                 135                 140

Arg Leu Ser Glu Glu Leu Leu Asp Lys Leu Glu Ile Phe Phe Gly
145                 150                 155                 160

Lys Ala Lys Asn Gly Gly Gly Asp Val Glu Thr Arg Glu Met Leu Gln
                165                 170                 175

Gly Thr Val Met Leu Gly Phe Ala Asp Glu Glu Val Ala Gln His Leu
            180                 185                 190

Cys Gln Ile Gly Gln Phe Arg Val Pro Leu Asp Arg Gln Gln Val Leu
        195                 200                 205

Leu Arg Val Ser Pro Tyr Val Ser Gly Glu Ile Gln Lys Ala Glu Ile
    210                 215                 220

Lys Phe Gln Gln Ala Pro His Ser Val Leu Val Thr Asn Ile Pro Asp
225                 230                 235                 240

Val Met Asp Ala Gln Glu Leu His Asp Ile Leu Glu Ile His Phe Gln
                245                 250                 255

Lys Pro Thr Arg Gly Gly Gly Glu Val Glu Ala Leu Thr Val Val Pro
            260                 265                 270

Ser Gly Gln Gln Gly Leu Ala Ile Phe Thr Ser Glu Ser Ser
        275                 280                 285
```

<210> SEQ ID NO 5
<211> LENGTH: 118

```
<212> TYPE: PRT
<213> ORGANISM: Artificial Sequence
<220> FEATURE:
<223> OTHER INFORMATION: Synthetic construct

<400> SEQUENCE: 5

Gln Val Gln Leu Val Gln Ser Gly Ala Glu Val Lys Lys Pro Gly Ala
1               5                   10                  15

Ser Val Lys Ile Ser Cys Lys Ala Ser Gly Tyr Thr Phe Thr Asn Tyr
            20                  25                  30

Gly Met Asn Trp Val Arg Gln Ala Pro Gly Gln Gly Leu Glu Trp Met
        35                  40                  45

Gly Trp Ile Asn Thr Tyr Thr Gly Glu Pro Thr Phe Ala Gln Lys Phe
    50                  55                  60

Gln Gly Arg Phe Thr Phe Thr Leu Asp Thr Ser Thr Ser Thr Ala Tyr
65                  70                  75                  80

Leu Glu Ile Ser Ser Leu Arg Asn Glu Asp Thr Ala Val Tyr Phe Cys
                85                  90                  95

Ala Arg Tyr Gly Tyr Ser Trp Ala Met Asp Tyr Trp Gly Gln Gly Thr
            100                 105                 110

Ser Val Thr Val Ser Ser
        115

<210> SEQ ID NO 6
<211> LENGTH: 314
<212> TYPE: PRT
<213> ORGANISM: Mus musculus

<400> SEQUENCE: 6

Met Asp Ala Asp Lys Asp Asn Ile Lys Gln Ala Cys Asp Glu Arg Ser
1               5                   10                  15

Ala Glu Met Asp Asp Met Arg Gly Glu Gln Ser Met Gly Leu Val His
            20                  25                  30

Glu Ile Met Ser Glu Asn Lys Glu Leu Asp Glu Ile Lys Lys Leu
        35                  40                  45

Glu Ala Glu Leu Gln Ser Asp Ala Arg Glu Phe Gln Ile Lys Glu Asn
    50                  55                  60

Val Pro Glu Lys Lys Leu Lys Leu Thr Ser Val Glu Ser Pro Lys Asp
65                  70                  75                  80

Gly Cys His Phe Ser Asn Ser Cys Ser Phe Gln Val Ser Ser Gln
                85                  90                  95

Ile Leu Tyr Glu Leu Gln Glu Gly Gln Ala Leu Ile Thr Phe Glu Lys
            100                 105                 110

Glu Glu Val Ala Gln Asn Val Ile Ser Met Gly Asn His Val Val Gln
        115                 120                 125

Met Glu Gly Thr Pro Val Lys Val Ser Ala His Pro Val Pro Leu Asn
    130                 135                 140

Thr Gly Val Arg Phe Gln Val His Val Asp Ile Ser Lys Met Lys Ile
145                 150                 155                 160

Asn Val Thr Gly Ile Pro Asp Glu Leu Ser Glu Glu Gln Thr Arg Asp
                165                 170                 175

Lys Leu Glu Leu Ser Phe Cys Lys Ser Arg Asn Gly Gly Gly Glu Val
            180                 185                 190

Glu Ser Val Asp Tyr Asp Arg Lys Ser Arg Ser Ala Val Ile Thr Phe
        195                 200                 205

Val Glu Thr Gly Val Val Asp Lys Ile Leu Lys Lys Lys Thr Tyr Pro
```

```
                    210                 215                 220
Leu Tyr Met Asn Gln Lys Cys His Ser Val Ala Val Ser Pro Cys Ile
225                 230                 235                 240

Glu Arg Cys Leu Glu Lys Tyr Gln Val Phe Ser Ala Val Ser Lys Lys
                245                 250                 255

Thr Val Leu Leu Thr Gly Leu Glu Gly Ile Pro Val Asp Glu Thr
                    260                 265                 270

Gly Glu Asp Leu Leu Asn Ile His Phe Gln Arg Lys Asn Asn Gly Gly
                275                 280                 285

Gly Glu Val Glu Val Val Lys Cys Ser Leu Asp Gln Ser Phe Ala Ala
            290                 295                 300

Tyr Phe Lys Glu Glu Ala Arg Glu Thr Ile
305                 310

<210> SEQ ID NO 7
<211> LENGTH: 107
<212> TYPE: PRT
<213> ORGANISM: Artificial Sequence
<220> FEATURE:
<223> OTHER INFORMATION: Synthetic construct

<400> SEQUENCE: 7

Asp Ile Gln Met Thr Gln Ser Pro Ser Ser Leu Ser Ala Ser Val Gly
1               5                   10                  15

Asp Arg Val Thr Met Thr Cys Gln Ala Ser Ser Ser Val Ser Tyr Met
                20                  25                  30

His Trp Tyr Gln Gln Lys Pro Gly Lys Ala Pro Lys Arg Trp Ile Tyr
            35                  40                  45

Asp Thr Ser Lys Leu Ala Ser Gly Val Pro Ser Arg Phe Ser Gly Ser
        50                  55                  60

Gly Ser Gly Thr Asp Tyr Thr Leu Thr Ile Ser Ser Met Gln Pro Glu
65                  70                  75                  80

Asp Ile Ala Thr Tyr Tyr Cys Gln Gln Trp Ser Ser Asn Pro Pro Ile
                85                  90                  95

Thr Phe Gly Ala Gly Thr Lys Leu Glu Ile Lys
            100                 105

<210> SEQ ID NO 8
<211> LENGTH: 307
<212> TYPE: PRT
<213> ORGANISM: Homo sapiens

<400> SEQUENCE: 8

Met Glu Ala Asp Lys Asp Asp Thr Gln Gln Ile Leu Lys Glu His Ser
1               5                   10                  15

Pro Asp Glu Phe Ile Lys Asp Glu Gln Asn Lys Gly Leu Ile Asp Glu
                20                  25                  30

Ile Thr Lys Lys Asn Ile Gln Leu Lys Lys Glu Ile Gln Lys Leu Glu
            35                  40                  45

Thr Glu Leu Gln Glu Ala Thr Lys Glu Phe Gln Ile Lys Glu Asp Ile
        50                  55                  60

Pro Glu Thr Lys Met Lys Phe Leu Ser Val Glu Thr Pro Glu Asn Asp
65                  70                  75                  80

Ser Gln Leu Ser Asn Ile Ser Cys Ser Phe Gln Val Ser Ser Lys Val
                85                  90                  95

Pro Tyr Glu Ile Gln Lys Gly Gln Ala Leu Ile Thr Phe Glu Lys Glu
                100                 105                 110
```

Glu Val Ala Gln Asn Val Val Ser Met Ser Lys His His Val Gln Ile
            115                 120                 125

Lys Asp Val Asn Leu Glu Val Thr Ala Lys Pro Val Pro Leu Asn Ser
130                 135                 140

Gly Val Arg Phe Gln Val Tyr Val Glu Val Ser Lys Met Lys Ile Asn
145                 150                 155                 160

Val Thr Glu Ile Pro Asp Thr Leu Arg Glu Asp Gln Met Arg Asp Lys
                165                 170                 175

Leu Glu Leu Ser Phe Ser Lys Phe Arg Asn Gly Gly Glu Val Asp
                180                 185                 190

Arg Val Asp Tyr Asp Arg Gln Ser Gly Ser Ala Val Ile Thr Phe Val
                195                 200                 205

Glu Ile Gly Val Ala Asp Lys Ile Leu Lys Lys Lys Glu Tyr Pro Leu
210                 215                 220

Tyr Ile Asn Gln Thr Cys His Arg Val Thr Val Ser Pro Tyr Thr Glu
225                 230                 235                 240

Ile His Leu Lys Lys Tyr Gln Ile Phe Ser Gly Thr Ser Lys Arg Thr
                245                 250                 255

Val Leu Leu Thr Gly Met Glu Gly Ile Gln Met Asp Glu Glu Ile Val
                260                 265                 270

Glu Asp Leu Ile Asn Ile His Phe Gln Arg Ala Lys Asn Gly Gly Gly
                275                 280                 285

Glu Val Asp Val Val Lys Cys Ser Leu Gly Gln Pro His Ile Ala Tyr
                290                 295                 300

Phe Glu Glu
305

<210> SEQ ID NO 9
<211> LENGTH: 120
<212> TYPE: PRT
<213> ORGANISM: Artificial Sequence
<220> FEATURE:
<223> OTHER INFORMATION: Synthetic construct

<400> SEQUENCE: 9

Val Gln Leu Val Glu Ser Gly Pro Glu Leu Lys Lys Pro Gly Glu Thr
1               5                   10                  15

Val Lys Ile Ser Cys Lys Ala Ser Gly Tyr Thr Phe Thr Asn Tyr Gly
                20                  25                  30

Met Asn Trp Val Lys Gln Ala Pro Gly Lys Gly Leu Lys Trp Met Gly
                35                  40                  45

Trp Ile Asn Thr Tyr Thr Gly Glu Pro Thr Phe Ala Asp Asp Phe Lys
50                  55                  60

Gly Arg Phe Ala Phe Ser Leu Glu Thr Ser Ala Ser Thr Ala Tyr Leu
65                  70                  75                  80

Gln Ile Asn Asn Leu Lys Asn Glu Asp Thr Ala Thr Tyr Phe Cys Ala
                85                  90                  95

Arg Tyr Gly Tyr Ser Trp Ala Met Asp Tyr Trp Gly Gln Gly Thr Ser
                100                 105                 110

Val Thr Val Ser Ser Ala Ser Thr
                115                 120

<210> SEQ ID NO 10
<211> LENGTH: 107
<212> TYPE: PRT
<213> ORGANISM: Artificial Sequence

```
<220> FEATURE:
<223> OTHER INFORMATION: Synthetic construct

<400> SEQUENCE: 10

Asp Ile Val Met Thr Gln Ser Pro Ala Ile Met Ser Ala Ser Pro Gly
1               5                   10                  15

Glu Lys Val Thr Met Thr Cys Ser Ala Ser Ser Ser Val Ser Tyr Met
                20                  25                  30

His Trp Tyr Gln Gln Lys Ser Gly Thr Ser Pro Lys Arg Trp Ile Tyr
            35                  40                  45

Asp Thr Ser Lys Leu Ala Ser Gly Val Pro Ala Arg Phe Ser Gly Ser
        50                  55                  60

Gly Ser Gly Thr Ser Tyr Ser Leu Thr Ile Ser Ser Met Glu Ala Glu
65                  70                  75                  80

Asp Ala Ala Thr Tyr Tyr Cys Gln Gln Trp Ser Asn Pro Pro Ile
                85                  90                  95

Thr Phe Gly Ala Gly Thr Lys Leu Glu Ile Lys
            100                 105

<210> SEQ ID NO 11
<211> LENGTH: 118
<212> TYPE: PRT
<213> ORGANISM: Artificial Sequence
<220> FEATURE:
<223> OTHER INFORMATION: Synthetic construct

<400> SEQUENCE: 11

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Asn Tyr
                20                  25                  30

Gly Met Asn Trp Val Arg Gln Ala Pro Gly Gln Gly Leu Glu Trp Met
            35                  40                  45

Gly Trp Ile Asn Thr Tyr Thr Gly Glu Pro Thr Val Ala Gln Lys Phe
        50                  55                  60

Gln Gly Arg Phe Thr Phe Thr Leu Asp Thr Ser Thr Ser Thr Ala Tyr
65                  70                  75                  80

Leu Glu Leu Ser Ser Leu Arg Asn Glu Asp Thr Ala Val Tyr Phe Cys
                85                  90                  95

Ala Arg Tyr Gly Tyr Ser Trp Ala Met Asp Tyr Trp Gly Gln Gly Thr
            100                 105                 110

Ser Val Thr Val Ser Ser
        115

<210> SEQ ID NO 12
<211> LENGTH: 107
<212> TYPE: PRT
<213> ORGANISM: Artificial Sequence
<220> FEATURE:
<223> OTHER INFORMATION: Synthetic construct

<400> SEQUENCE: 12

Asp Ile Gln Met Thr Gln Ser Pro Ser Ser Leu Ser Ala Ser Val Gly
1               5                   10                  15

Asp Arg Val Thr Ile Thr Cys Gln Ala Ser Ser Ser Val Ser Tyr Met
                20                  25                  30

His Trp Tyr Gln Gln Lys Pro Gly Lys Ala Pro Lys Arg Leu Ile Tyr
            35                  40                  45
```

```
Asp Thr Ser Lys Leu Ala Ser Gly Val Pro Ser Arg Phe Ser Gly Ser
     50                  55                  60

Gly Ser Gly Thr Asp Tyr Thr Leu Thr Ile Ser Ser Leu Gln Pro Glu
 65                  70                  75                  80

Asp Ile Ala Thr Tyr Tyr Cys Gln Gln Trp Ser Ser Asn Pro Pro Ile
                 85                  90                  95

Thr Phe Gly Ala Gly Thr Lys Leu Glu Ile Lys
            100                 105
```

```
<210> SEQ ID NO 13
<211> LENGTH: 8
<212> TYPE: PRT
<213> ORGANISM: Artificial Sequence
<220> FEATURE:
<223> OTHER INFORMATION: Synthetic construct

<400> SEQUENCE: 13

Gly Tyr Thr Phe Thr Asn Tyr Gly
1               5

<210> SEQ ID NO 14
<211> LENGTH: 8
<212> TYPE: PRT
<213> ORGANISM: Artificial Sequence
<220> FEATURE:
<223> OTHER INFORMATION: Synthetic construct

<400> SEQUENCE: 14

Ile Asn Thr Tyr Thr Gly Glu Pro
1               5

<210> SEQ ID NO 15
<211> LENGTH: 9
<212> TYPE: PRT
<213> ORGANISM: Artificial Sequence
<220> FEATURE:
<223> OTHER INFORMATION: Synthetic construct

<400> SEQUENCE: 15

Tyr Gly Tyr Ser Trp Ala Met Asp Tyr
1               5

<210> SEQ ID NO 16
<211> LENGTH: 6
<212> TYPE: PRT
<213> ORGANISM: Artificial Sequence
<220> FEATURE:
<223> OTHER INFORMATION: Synthetic construct

<400> SEQUENCE: 16

Ser Ser Ser Val Ser Tyr
1               5

<210> SEQ ID NO 17

<400> SEQUENCE: 17

000

<210> SEQ ID NO 18
<211> LENGTH: 7
<212> TYPE: PRT
<213> ORGANISM: Artificial Sequence
<220> FEATURE:
<223> OTHER INFORMATION: Synthetic construct
```

```
<400> SEQUENCE: 18

Trp Ser Ser Asn Pro Pro Ile
1               5

<210> SEQ ID NO 19
<211> LENGTH: 8
<212> TYPE: PRT
<213> ORGANISM: Artificial Sequence
<220> FEATURE:
<223> OTHER INFORMATION: Synthetic construct

<400> SEQUENCE: 19

Gly Tyr Thr Phe Pro Asn Tyr Gly
1               5

<210> SEQ ID NO 20
<211> LENGTH: 7
<212> TYPE: PRT
<213> ORGANISM: Artificial Sequence
<220> FEATURE:
<223> OTHER INFORMATION: Synthetic construct

<400> SEQUENCE: 20

Trp Ser Pro Tyr Pro Pro Ile
1               5

<210> SEQ ID NO 21
<211> LENGTH: 7
<212> TYPE: PRT
<213> ORGANISM: Artificial Sequence
<220> FEATURE:
<223> OTHER INFORMATION: Synthetic construct

<400> SEQUENCE: 21

Trp Ser Ser Asn Ser Trp Ser
1               5

<210> SEQ ID NO 22
<211> LENGTH: 7
<212> TYPE: PRT
<213> ORGANISM: Artificial Sequence
<220> FEATURE:
<223> OTHER INFORMATION: Synthetic construct

<400> SEQUENCE: 22

Trp Ser Pro Leu Pro Pro Ile
1               5

<210> SEQ ID NO 23
<211> LENGTH: 7
<212> TYPE: PRT
<213> ORGANISM: Artificial Sequence
<220> FEATURE:
<223> OTHER INFORMATION: Synthetic construct

<400> SEQUENCE: 23

Trp Ser Pro Arg Pro Pro Ile
1               5

<210> SEQ ID NO 24
<211> LENGTH: 107
<212> TYPE: PRT
<213> ORGANISM: Artificial Sequence
<220> FEATURE:
<223> OTHER INFORMATION: Synthetic construct

<400> SEQUENCE: 24
```

Asp Ile Val Met Thr Gln Ser Pro Ala Ile Met Ser Ala Ser Pro Gly
1               5                   10                  15

Glu Lys Val Thr Met Thr Cys Ser Ala Ser Ser Ser Val Ser Tyr Met
                20                  25                  30

His Trp Tyr Gln Gln Lys Ser Gly Thr Ser Pro Lys Arg Trp Ile Tyr
            35                  40                  45

Asp Thr Ser Lys Leu Ala Ser Gly Val Pro Ala Arg Phe Ser Gly Ser
        50                  55                  60

Gly Ser Gly Thr Ser Tyr Ser Leu Thr Ile Ser Ser Met Glu Ala Glu
65                  70                  75                  80

Asp Ala Ala Thr Tyr Tyr Cys Gln Gln Trp Ser Asn Pro Pro Ile
                85                  90                  95

Thr Phe Gly Ala Gly Thr Lys Leu Glu Ile Lys
            100                 105

<210> SEQ ID NO 25
<211> LENGTH: 118
<212> TYPE: PRT
<213> ORGANISM: Artificial Sequence
<220> FEATURE:
<223> OTHER INFORMATION: Synthetic construct

<400> SEQUENCE: 25

Gln Val Gln Leu Val Glu Ser Gly Pro Glu Leu Lys Lys Pro Gly Glu
1               5                   10                  15

Thr Val Lys Ile Ser Cys Lys Ala Ser Gly Tyr Thr Phe Thr Asn Tyr
                20                  25                  30

Gly Met Asn Trp Val Lys Gln Ala Pro Gly Lys Gly Leu Lys Trp Met
            35                  40                  45

Gly Trp Ile Asn Thr Tyr Thr Gly Glu Pro Thr Phe Ala Asp Asp Phe
        50                  55                  60

Lys Gly Arg Phe Ala Phe Ser Leu Glu Thr Ser Ala Ser Thr Ala Tyr
65                  70                  75                  80

Leu Gln Ile Asn Asn Leu Lys Asn Glu Asp Thr Ala Thr Tyr Phe Cys
                85                  90                  95

Ala Arg Tyr Gly Tyr Ser Trp Ala Met Asp Tyr Trp Gly Gln Gly Thr
            100                 105                 110

Ser Val Thr Val Ser Ser
        115

<210> SEQ ID NO 26
<211> LENGTH: 21
<212> TYPE: DNA
<213> ORGANISM: Artificial Sequence
<220> FEATURE:
<223> OTHER INFORMATION: Synthetic construct

<400> SEQUENCE: 26
aaaacaaaga actagacgag g                                            21

<210> SEQ ID NO 27
<211> LENGTH: 23
<212> TYPE: DNA
<213> ORGANISM: Artificial Sequence
<220> FEATURE:
<223> OTHER INFORMATION: Synthetic construct

<400> SEQUENCE: 27
cagctcaaaa gggagcgcac agg                                          23

```
<210> SEQ ID NO 28
<211> LENGTH: 56
<212> TYPE: PRT
<213> ORGANISM: Homo sapiens

<400> SEQUENCE: 28

Glu Ile Phe Phe Gly Lys Thr Arg Asn Gly Gly Asp Val Asp Val
1               5                   10                  15

Arg Glu Leu Leu Pro Gly Ser Val Met Leu Gly Phe Ala Arg Asp Gly
            20                  25                  30

Val Ala Gln Arg Leu Cys Gln Ile Gly Gln Phe Thr Val Pro Leu Gly
        35                  40                  45

Gly Gln Gln Val Pro Leu Arg Val
    50                  55

<210> SEQ ID NO 29
<211> LENGTH: 58
<212> TYPE: PRT
<213> ORGANISM: Homo sapiens

<400> SEQUENCE: 29

Glu Leu Ser Phe Ser Lys Ser Arg Asn Gly Gly Glu Val Asp Arg
1               5                   10                  15

Val Asp Tyr Asp Arg Gln Ser Gly Ser Ala Val Ile Thr Phe Val Glu
            20                  25                  30

Ile Gly Val Ala Asp Lys Ile Leu Lys Lys Lys Glu Tyr Pro Leu Tyr
        35                  40                  45

Ile Asn Gln Thr Cys His Arg Val Thr Val
    50                  55

<210> SEQ ID NO 30
<211> LENGTH: 11
<212> TYPE: DNA
<213> ORGANISM: Artificial Sequence
<220> FEATURE:
<223> OTHER INFORMATION: Synthetic construct

<400> SEQUENCE: 30
agcaaaagag g                                                    11
```